US008876586B2

(12) United States Patent
Berman

(10) Patent No.: US 8,876,586 B2
(45) Date of Patent: Nov. 4, 2014

(54) GAMING DEVICES HAVING GAME MODIFIERS USABLE BETWEEN GAMES AND STAGES WITHIN GAMES

(71) Applicant: King Show Games, Inc., Minnetonka, MN (US)

(72) Inventor: Bradley Berman, Minnetonka, MN (US)

( * ) Notice: Subject to any disclaimer, the term of this patent is extended or adjusted under 35 U.S.C. 154(b) by 0 days.

(21) Appl. No.: 13/849,467

(22) Filed: Mar. 22, 2013

(65) Prior Publication Data

US 2014/0148232 A1 May 29, 2014

Related U.S. Application Data

(63) Continuation-in-part of application No. 13/688,023, filed on Nov. 28, 2012.

(51) Int. Cl.
*A63F 9/24* (2006.01)
*A63F 13/00* (2014.01)
*G07F 17/32* (2006.01)

(52) U.S. Cl.
CPC .................................. *G07F 17/3293* (2013.01)
USPC ............................................... 463/13; 463/25

(58) Field of Classification Search
USPC ........................................................... 463/25
See application file for complete search history.

(56) References Cited

U.S. PATENT DOCUMENTS 5,437,451 A 8/1995 Fulton
5,957,774 A 9/1999 Holmes, Jr. et al.
6,206,780 B1 3/2001 Awada
6,334,613 B1 1/2002 Yoseloff
6,443,456 B1 9/2002 Gajor
6,612,927 B1 9/2003 Slomiany et al.
6,705,943 B2 3/2004 Awada
6,877,747 B2 4/2005 Moody
6,913,531 B1 7/2005 Yoseloff
7,037,190 B2 5/2006 Moody et al.
7,247,092 B2 7/2007 Jarvis et al.
7,273,415 B2 9/2007 Cregan et al.
7,419,424 B2 9/2008 Gomez
7,690,976 B2 4/2010 Edidin et al.
8,147,310 B2 4/2012 Jarvis et al.
8,147,319 B2 4/2012 Hornik et al.

(Continued)

FOREIGN PATENT DOCUMENTS

WO 0238234 A 5/2002

OTHER PUBLICATIONS

Ace Invaders Game Description.

(Continued)

*Primary Examiner* — Steven J Hylinski

(57) ABSTRACT

Embodiments of the present invention are directed to the use of game modifiers that are triggered in a first game and are used in game stages in a subsequent second game. According to some embodiments, a gaming device is configured to play a multi-stage game of chance. After each stage is completed in a first game, it is determined whether any of the game stages have triggered modifications of one or more game modifiers that are used in one or more corresponding game stages in a subsequently played game. The altered game modifiers may modify prizes associated with an incremented one of the game stages in the subsequent game so that the altered modifiers move between game stages in multiple games.

17 Claims, 60 Drawing Sheets

(56) References Cited

U.S. PATENT DOCUMENTS

| | | | | |
|---|---|---|---|---|
| 8,152,616 | B2 | 4/2012 | Moody | |
| 8,419,518 | B2 | 4/2013 | Jarvis et al. | |
| 8,439,737 | B1 | 5/2013 | Moody | |
| 2003/0032469 | A1 * | 2/2003 | Moody et al. | 463/13 |
| 2003/0189290 | A1 | 10/2003 | Moody | |
| 2003/0207707 | A1 | 11/2003 | Slomiany et al. | |
| 2004/0102243 | A1 | 5/2004 | Olsen | |
| 2006/0246981 | A1 | 11/2006 | Walker et al. | |
| 2007/0054726 | A1 | 3/2007 | Muir et al. | |
| 2008/0146305 | A1 | 6/2008 | Moody | |
| 2008/0252011 | A1 * | 10/2008 | Bickley et al. | 273/292 |
| 2009/0124317 | A1 | 5/2009 | Dinkla | |
| 2010/0298041 | A1 | 11/2010 | Berman et al. | |
| 2011/0165925 | A1 * | 7/2011 | Moody et al. | 463/13 |
| 2012/0178512 | A1 | 7/2012 | Jarvis et al. | |
| 2013/0029750 | A1 | 1/2013 | Moody | |

OTHER PUBLICATIONS

WMS Winning Streak Poker Game Description; WMS.com; Copyright dated 2013.

* cited by examiner

GAMING DEVICES HAVING GAME MODIFIERS USABLE BETWEEN GAMES AND STAGES WITHIN GAMES

CROSS-REFERENCE TO RELATED APPLICATION

This application is a continuation-in-part of U.S. patent application Ser. No. 13/688,023, filed Nov. 28, 2012, which is incorporated herein by reference in its entirety.

FIELD OF THE INVENTION

This disclosure relates generally to games, and more particularly to apparatuses and methods for wagering games that include game modifiers usable between game rounds and stages of games played on gaming devices.

BACKGROUND

Casino games such as poker, slots, and craps have long been enjoyed as a means of entertainment. Almost any game of chance that can be played using traditional apparatus (e.g., cards, dice) can be simulated on a computer. The popularity of casino gambling with wagering continues to increase, as does recreational gambling such as non-wagering computer game gambling. It is also likely that most new games will be implemented, at least in part, using computerized apparatus.

One reason that casino games are widely implemented on computerized apparatus is that computerized games are highly adaptable, easily configurable and re-configurable, and require minimal supervision to operate. For example, the graphics and sounds included in such games can be easily modified to reflect popular subjects, such as movies and television shows.

Computer gaming devices can also be easily adapted to provide entirely new games of chance that might be difficult to implement using mechanical or discrete electronic circuits. Because of the ubiquity of computerized gaming machines, players have come to expect the availability of an ever wider selection of new games when visiting casinos and other gaming venues. Playing new games adds to the excitement of "gaming." As is well known in the art and as used herein, the term "gaming" and "gaming devices" generally involves some form of wagering, and that players make wagers of value, whether actual currency or something else of value, e.g., token or credit. Wagering-type games usually provide rewards based on random chance as opposed to skill. In some jurisdictions, the absence of skill when determining awards during game play is a requirement.

One poker game that has been developed to enhance player interest is discussed in US Patent Publication 2008/0146305 (hereinafter the '305 application), which is commonly called "Ultimate X" Poker. In this prior application, a poker game is disclosed that includes a multiplier value that can increase between poker games as long as the player achieves a winning hand. For example, in FIGS. 2 and 3 of the '305 application a player in a multi-hand poker game has a multiplier value associated with each level of three-hand poker game. If the player receives a winning hand on one or more of the hands, the multiplier value for that hand level is increased for the next game that the player wagers on. The increased multiplier values continue until the corresponding hand on a particular level does not result in a winning hand. This disclosure is limited in part, however, because most hands are not winning hands. For instance, the excitement of a received multiplier can quickly fade when the next hand is not a winning hand.

The present disclosure describes methods, systems, and apparatus that provide for new and interesting gaming experiences, and that provide other advantages over the prior art.

SUMMARY

To overcome limitations in the prior art described above, and to overcome other limitations that will become apparent upon reading and understanding the present specification, embodiments of the present invention are directed to an apparatus, system, computer readable storage media, and/or method that involve or otherwise facilitate the use of game modifiers between games and game stages within the games as played on gaming devices. In one embodiment, a method of operating a gaming device includes receiving a wager to initiate a first game of chance, displaying a first game stage of the first game, and displaying a second game stage of the first game. The method further includes determining game outcomes for the first and second games stages in the first game, presenting awards when the first or second game stages result in winning outcomes, determining if a first game criterion is satisfied for the first game stage, and determining if a second game criterion is satisfied for the second game stage. When the first game criterion is satisfied, the method further includes altering a game modifier for use with a second game stage of a subsequent game of chance. Additionally, when the second game criterion is satisfied, the method further includes altering a game modifier for use with a first game stage of a subsequent game of chance.

DETAILED DESCRIPTION

Figure 1:
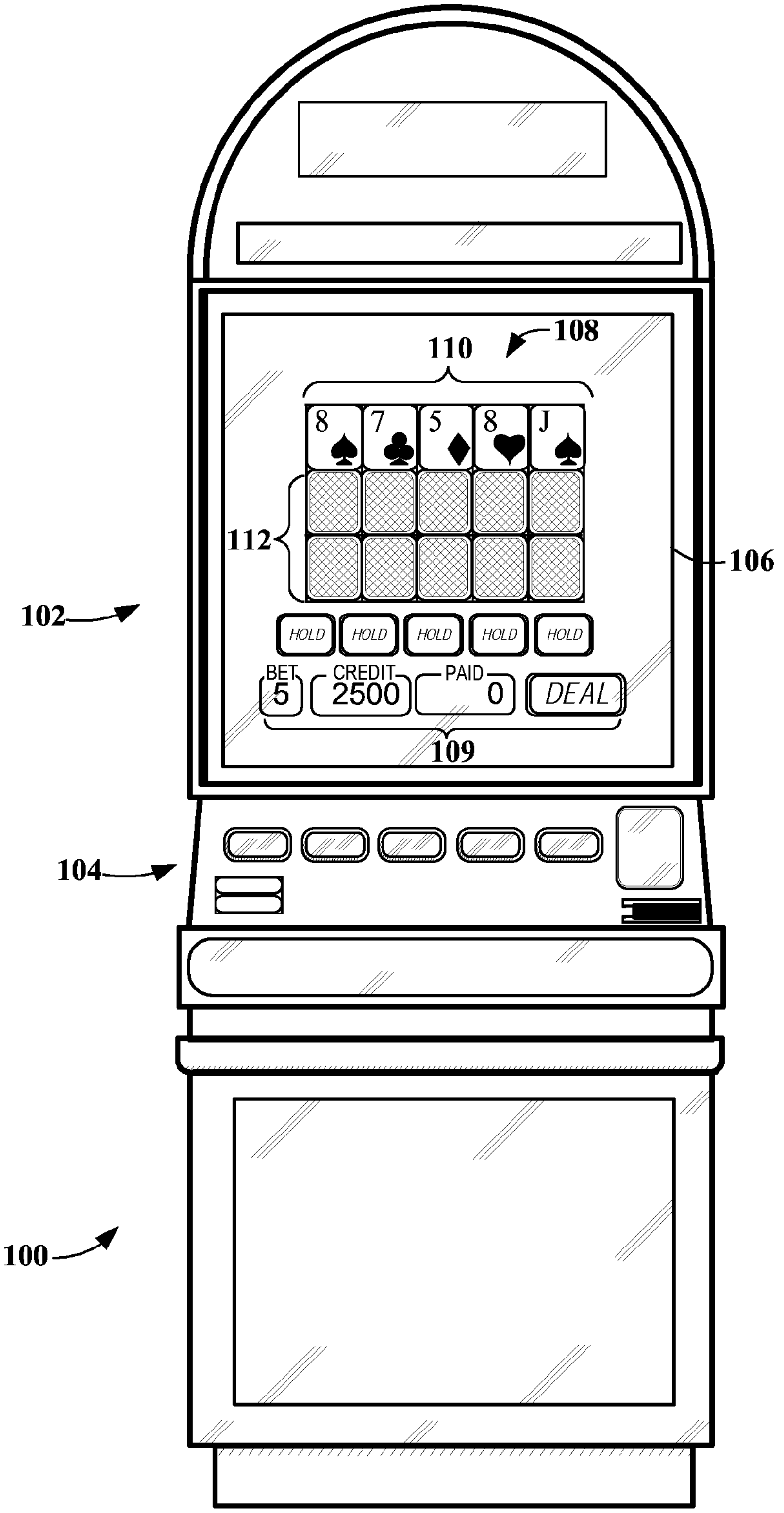
FIG. 1 is a diagram of a gaming machine according to embodiments of the invention.

In the following description of various exemplary embodiments, reference is made to the accompanying drawings that form a part hereof, and in which is shown by way of illustration various embodiments in which the invention may be practiced. It is to be understood that other embodiments may be utilized, as structural and operational changes may be made without departing from the scope of the present invention.

Generally, the present invention relates to a wagering game or game of chance that may incorporate rules of existing turn-based games, e.g., gaming activities such as card games that provide payouts on individual turns or hands. In such a game, various game stages and/or game areas are used to create multiple game outcomes within a single game that is wagered on by a player. Additionally, a game modifier is included that is usable between these game stages and/or game areas so that an outcome or event occurring within one game stage/game area can affect game play in a second game stage/game area. In some embodiments, game modifiers may be triggered in a first game, where the triggered modifiers usable in a subsequent second game. For purposes of this disclosure, the terms "game stages" refers generally to various game events that occur within a single game. That is, after a wager is placed and a game initiated, one or more game stages is completed prior to the end of the game. Additionally, the terms "game rounds" refers generally to separate games that are independently wagered upon. Each game round or game may have multiple game stages.

For example, in one embodiment a method of operating a gaming device having a game display and a player input device is provided where the method includes receiving a wager to play a multi-stage game on the gaming device and displaying an outcome of a first stage of the multi-stage game. Prizes associated with the first stage of the multi-stage game are then determined, and a first game modifier is altered when a trigger condition is met after the outcome of the first stage is displayed. An outcome of a second stage of the multi-stage game is then displayed while the outcome of the first stage is simultaneously shown. Prizes associated with the second stage of the multi-stage game are then displayed and an aspect of the second stage may be modified by the first game modifier. Prizes associated with the outcomes of the first stage and modified second stage are then awarded.

In the description that follows, the term "cards," "decks," and similar mechanically descriptive language may be used to describe various apparatus presentation features, as well as various actions occurring to those object (e.g., "draw," "hold," "bet"). Although the present disclosure may be applicable to both to manual, mechanical, and computerized embodiments, and any combination therebetween, the use of mechanically descriptive terms is not meant to be only applicable to mechanical embodiments. Those skilled in the art will understand that, for purposes of providing gaming experiences to players, mechanical elements such as cards, reels, and the like may be simulated on a display in order to provide a familiar and satisfying experience that emulates the behavior of mechanical objects, as well as emulating actions that occur in the non-computerized games (e.g., holding, drawing, betting). Further, the computerized version may provide the look of mechanical equivalents but may be generally randomized in a different way. Thus, the terms "cards," "decks," "reels," "hands," etc., are intended to describe both physical objects and emulation or simulations of those objects and their behaviors using electronic apparatus.

In various embodiments of the invention, the gaming displays are described in conjunction with the use of data in the form of "symbols." In the context of this disclosure, a "symbol" may generally refer at least to a collection of one or more arbitrary indicia or signs that have some conventional significance. In particular, the symbol represents values that can at least be used to determine whether to award a payout. A symbol may include numbers, letters, shapes, pictures, textures, colors, sounds, etc., and any combination therebetween. A win can be determined by comparing the symbol with another symbol. Generally, such comparisons can be performed via software by mapping numbers (or other data structures such as character strings) to the symbols and performing the comparisons on the numbers/data structures. Other conventions associated with known games (e.g., the numerical value/ordering of face cards and aces in card games) may also be programmatically analyzed to determine winning combinations.

In reference now to FIG. 1, a gaming device or machine 100 is illustrated that provides a gaming experience according to an embodiment of the invention. The illustrated gaming machine 100 may include a computing system (not shown) to carry out operations according described herein. The gaming machine 100 includes a display 102 (also referred to as a gaming display), and a user interface 104, although some or all of the user interface 104 may be provided via the display 102 in touch screen embodiments. The user interface 104 allows the user to control and engage in play of the gaming machine 100. The particular user interface mechanisms included with user interface 104 may be dependent on the type of gaming device. For example, the user interface 104 may include one or more buttons, switches, joysticks, levers, pull-down handles, trackballs, voice-activated input, or any other user input system or mechanism that allows the user to play the particular gaming activity.

The user interface 104 may allow the user or player to enter coins, bills, or otherwise obtain credits through vouchers, tokens, credit cards, tickets, etc. Various mechanisms for entering such vouchers, tokens, credit cards, coins, tickets, etc. are known in the art. For example, coin/symbol input mechanisms, card readers, credit card readers, smart card readers, punch card readers, radio frequency identifier (RFID) readers, and other mechanisms may be used to enter wagers. It is through the user interface 104 that the player can initiate and engage in gaming activities. While the illustrated embodiment depicts various buttons for the user interface 104, it should be recognized that a wide variety of user interface options are available for use in connection with the present invention, including pressing buttons, touching a segment of a touch-screen, entering text, entering voice commands, or other known data entry methodology.

The display device 102 may include one or more of an electronic display, a mechanical display, and a fixed display information, such as paytable information associated with a glass/plastic panel on the gaming machine 100. The symbols or other indicia associated with the play of the game may be presented on an electronic display device or on mechanical devices associated with a mechanical display. Generally, the display 102 devotes the largest portion of viewable area to the primary gaming portion 106. The gaming portion 106 is generally where the visual feedback for any selected game is provided to the user. The gaming portion 106 may render graphical objects such as cards, slot reels, dice, animated characters, and any other gaming visual known in the art. The gaming portion 106 also typically informs players of the outcome of any particular event, including whether the event resulted in a win or loss.

In some the example embodiments illustrated herein, the gaming portion 106 may display a grid 108 (or equivalent arrangement) of playing cards. The grid 108 includes rows (or equivalent arrangements) that each represent a play event. For example, the illustrated gaming portion 106 is dedicated to video poker, so each row of the grid 108 represents a hand of poker. For each hand, the gaming device 100 may deal five cards, allow the user to select which cards to hold, deal replacements for the cards not held, and determine a payout based on the final cards in the hand. The illustration and description of five-card-draw poker is for purposes of example and not of limitation; the present invention may be applicable to numerous other card games, as well as other types of gaming activities and apparatuses, such as slot machines, dice, coins, etc.

In the illustrated grid 108, the hand currently shown in row 110 is a first game stage. Additional rows 112 represent hands that are subsequently played as second and third stages of the wagered-on gaming event. The subsequent game stages in rows 112 may be played from the top of the grid 108 to the bottom of the grid. The illustrated arrangement and order of play is only one possible example; hands may be played from top to bottom, and/or the hands may be arranged as columns, and the subsequent hands played right-to-left or left-to-right. In the latter case, the grid 108 may include five rows so that each column would be able to represent a five card poker hand. Additional details of the operation of the grid 108 will be described further hereinbelow in relation to FIG. 2.

The gaming portion 106 may include other features known in the art that facilitate gaming, such as status and control portion 109. As is generally known in the art, this portion 109 provides information about current bets, current wins, remaining credits, etc. associated with gaming activities of the grid 108. The control portion 109 may also provide touch-screen controls for facilitating game play. The grid 108 may also include touchscreen features, such as facilitating selection of individual cards for holding prior to draw of new cards and/or advancing particular cards to move up to the next hand if conditions are satisfied. The gaming portion 106 of the display 102 may include other features that are not shown, such as paytables, navigation controls, etc.

The game display 102 of FIG. 1 shows multiple poker hands as part of a multi-stage game. These poker hands may be played as stud poker hands, where the player is awarded based on the cards dealt in each hand, or may be played as draw poker hands, where the player may hold and draw cards to complete a final poker hand. Additionally, in some embodiments, some of the game stages may include stud poker hands, while other game stages include draw poker hands. In other embodiments, various other poker or card games may be used as games in each game stage, such as Pai Gow poker, Caribbean stud, blackjack, etc. Additionally, other games of chance may be used as game stages, such as spinning reel games, keno games, or any other type of game where wagers may be placed on an outcome of the game.

Figure 2:
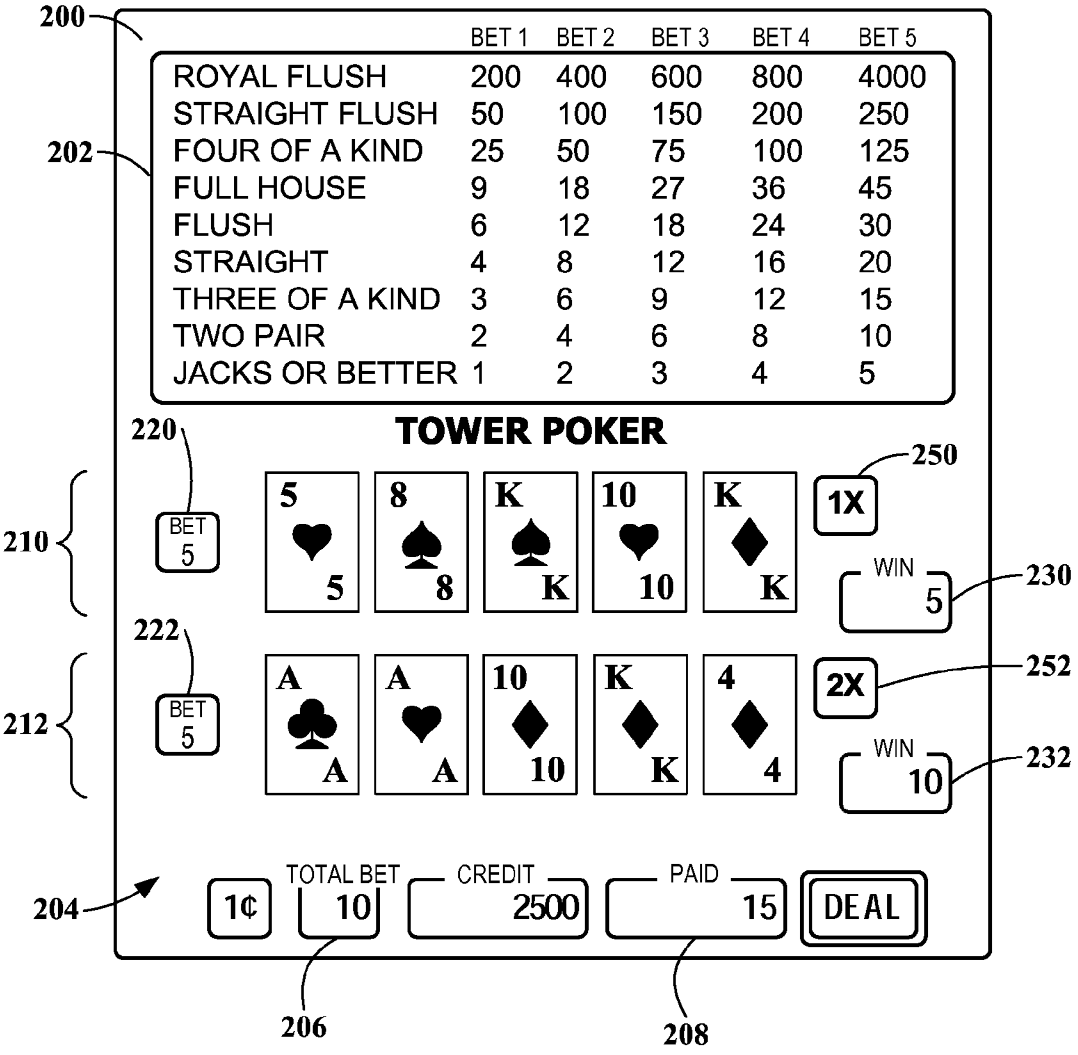
FIG. 2 is a detail diagram of a gaming display showing a game of chance having a modifier usable between game stages according to embodiments of the invention.

An example of how game play may proceed according to one embodiment of the invention is shown in the diagram of FIG. 2. The diagram of FIG. 2 illustrates various game play states or screens that might be seen in a gaming apparatus according to embodiments of the invention. In the particular embodiment shown in FIG. 2, two five card stud poker game stages are shown as part of a wagering game of chance. Referring to FIG. 2, a gaming display 200 shows a paytable portion 202 and a game display portion 204. The paytable portion 202 shows a table of pays or award values associated with outcomes for each of the game stages. As shown in the paytable portion 202, the player may bet between two and ten credits, which accounts for bets of one credit on each stud poker hand in each game stage up to bets of five credits per game stage. Hence, the paytable portion 202 shows award values associated with bets of one to five credits. In other embodiments, wager amounts, paytables, or wager allocation schemes may be used.

The game portion 204 of the game display 200 includes a grid of cards such as grid 108 shown and described in the discussion of FIG. 1. The grid of cards includes a first game stage 210, which shows a dealt hand of five cards used in a five card stud poker game, and a second game stage 212, which shows a second dealt hand of five cards used in a five card stud poker game. Each of the first and second game stages 210, 212 may use a separate 52 card deck (or 54 card deck if Jokers are used, or other sizes/types of card decks used in other games). Hence, as shown, the same card (e.g., King of Diamonds) may appear both hands 210, 212. In other embodiments, only a single deck of cards may be used for both poker hands 210, 212.

In addition to the displayed poker hands, each game stage 210, 212, includes a wager indicator 220, 222, a win indicator 230, 232, and a game modifier 250, 252. The first wager indicator 220 and the second wager indicator 222 may show an allocated split of a total wager placed on the game event. The total wager may be shown in a total wager indicator 206 on the game display 200. As discussed above, the total wager may be automatically allocated between the game stages 210, 212, and the allocation is displayed on the first and second wager indicators 220, 222. In this embodiment, since there are only game stages 210, 212, the total wager may simply be divided by two with each half of the total wager being placed on each game stage 210, 212. As shown in FIG. 2, a total wager of ten credits is placed on the game event, and then allocated as a five-credit bet on the first game stage 210, and a five-credit bet on the second game stage 212. In these embodiments, a player may be limited to placing bets that can be evenly allocated between the two game stages up to a maximum bet amount. In the embodiment shown in FIG. 2, the player may only be able to place total wagers of two credits, four credits, six credits, eight credits, or ten credits. However, in other embodiments the player may be able to place other bet amounts where the total wager is allocated automatically between the game stages 210, 212. For example, if the player placed a wager of three credits, the gaming device may automatically allocate a wager of one credit to each of the first and second stages 210, 212 and then randomly select one of the game stages to place the last wagered credit. Alternatively, the gaming device may always place the extra credit on the first game stage 210 or last game stage 212, or it may alternate placing the extra credit between the game stages. In yet other embodiments, the player may be able to direct how the total wager is allocated between the game stages 210, 212.

Returning to the example shown in FIG. 2, a player has placed a wager of ten credits on a gaming event having two game stages, each game stage being a five card stud poker hand. The total wager shown on the total wager indicator 206 is divided or allocated into a five credit wager on the first game stage 210 (as shown on the first wager indicator 220) and a five credit wager on the second game stage 212 (as shown on the second wager indicator 222). A game modifier 250, 252 is then initialized for the first and second game stages. Here, the game modifier 250, 252 is a multiplier that multiplies any awards associated with the poker hands in the first and second game stages 210, 212. Although the game modifier 250 is shown as a game stage multiplier, various embodiments can use a variety of game modifying techniques as stage or game modifiers. For example, game modifiers may include multipliers, bonus credits, extra cards/symbols/reels/spins used in one or more subsequent game stages, free games or stages, play of a bonus event, or any other type of feature that modifies game play of the wagered upon game event. Some of these variations are discussed in additional detail below with reference to the embodiments shown in FIGS. 3-11.

In this instance, the game modifier 250 is a multiplier that is initialized at a value of "1×" as shown in FIG. 2. This value is then used to modify any awards associated with the outcome from the first game stage 210. Although the game modifier 250 is shown as being initialized to a set value of "1×," the initialization process in other embodiments may select (randomly, sequentially, or otherwise) a value to use as the initial game modifier multiplier value. In other embodiments, the initialization process may also select a type of game modifier to use as well as one or more characteristics of the selected game modifier type, such as initial value, and/or possible ranges of values.

Returning again to the example shown in FIG. 2, the first game stage 210 is determined and displayed. As shown in FIG. 2, the result of this first game stage is a stud poker hand including 5H-8S-KS-10H-KD (for reference purposes, the first number or letter corresponds to the cards value: 2, 3, 4, 5, 6, 7, 8, 9, 10, Jack, Queen, King, Ace; and the second letter represents the card suit: C=Clubs, D=Diamonds, H=Hearts, S=Spades). In this first stage hand 210, a pair of Kings is received (KS-KD). According to the paytable shown in the paytable portion 202, this outcome for the first game stage 210 is associated with an award of five credits since the wager amount for the first stage was five credits for the first stage. This award value is multiplied by the game modifier ("1×") and the result is shown in the first win indicator 230 as an award of five credits.

Next, it is determined if an aspect of the first game stage meets a criterion or trigger condition that allows at least one of the game modifiers 250, 252 to be altered. In some embodiments, meeting the criterion or trigger condition alters the subsequently played game stages, although in other embodiments, the currently played game stage (i.e., the first game stage here) may be modified and the first win amount may be recalculated. In embodiments with more than one subsequent game stage (for example, see FIG. 3A), only the next game stage may have a game modifier altered, or alternatively, all of the subsequent game stages may have an associated game modifier altered. In yet other embodiments, game modifiers associated with the current game stage and/or previous game stages may also be modified. These and other variations will be discussed with additional detail below in embodiments that that have more than two game stages.

The criterion or trigger condition used to determine if the game modifier is altered may be based on a characteristic of the current game stage, or determined at random along with the determined outcome for the current game stage. For example, possible criteria or trigger conditions may include whether a current game stage results in a winning outcome (i.e., an outcome associated with an award), whether a current game stage includes a predetermined card/symbol/reel position, or whether another deterministic features associated with the current game stage occurs. In other embodiments, modifiers associated with one or more subsequent game stage may be determined in part by results, events, or trigger conditions associated with previous game stages. For example, if two consecutive game stages meet a predefined criterion or trigger condition, the modification of a game modifier associated with a subsequent game stage may be different than the modification would have been if a first and third previous game stage met the predefined criterion and a second intervening game stage did not meet the predefined criterion. Alternately, results, events, or trigger conditions associated with previous game stages may be used in determining how a game modifier for a subsequent stage is modified.

How the game modifier 250 is altered may also be dependent on the type of the criterion or trigger condition met. That is, there may be multiple possible criteria or trigger conditions associated with different alteration schemes for the game modifier. For example, if a trigger condition is associated with winning outcomes for a current game stage, the game modifier may be altered in two or more ways depending on the type of winning outcome. Here, for instance, a winning stud poker hand associated with a Jacks or Better Pair, Two Pair, or Three of Kind may be associated with a game modifying multiplier value increase of 1×, while winning stud poker hands above those hands may be associated with a game modifying multiplier value increase of 3×. Hence, depending on the type of outcome in the first game stage 210, the game multiplier may be increased to "2×" or "4×" if a winning outcome is received or maintained at "1×" if a winning outcome is not received for the second game stage 212.

In the current example embodiment, the game modifying multiplier is incremented by a value of 1× when the first stage results in a winning game outcome. Thus, as shown in FIG. 2, the game modifier 252 associated with the second game stage is incremented to a value of "2×" because the first game stage resulted in a winning outcome (e.g., a pair of Kings). A second game stage 212 is now played where a second stud poker hand is determined and displayed. As shown, the second stud poker hand results in an outcome of AC-AH-10D-KD-4D. Here, the poker hand of the second stage 212 includes a pair of Aces, which according to the paytable in the paytable portion 202 is worth five credits for a five credit bet. However, because the game modifier 252 was altered as a result of the outcome in the first game stage 210, this five credit win is multiplied by a value of "2×," which results in a win of ten credits as shown in the second win indicator 232. The wins in the first win indicator 230 and the second win indicator are then summed and a total award of 15 credits is awarded to the player as shown in the award indicator 208 on the game display 200.

Figure 3A:
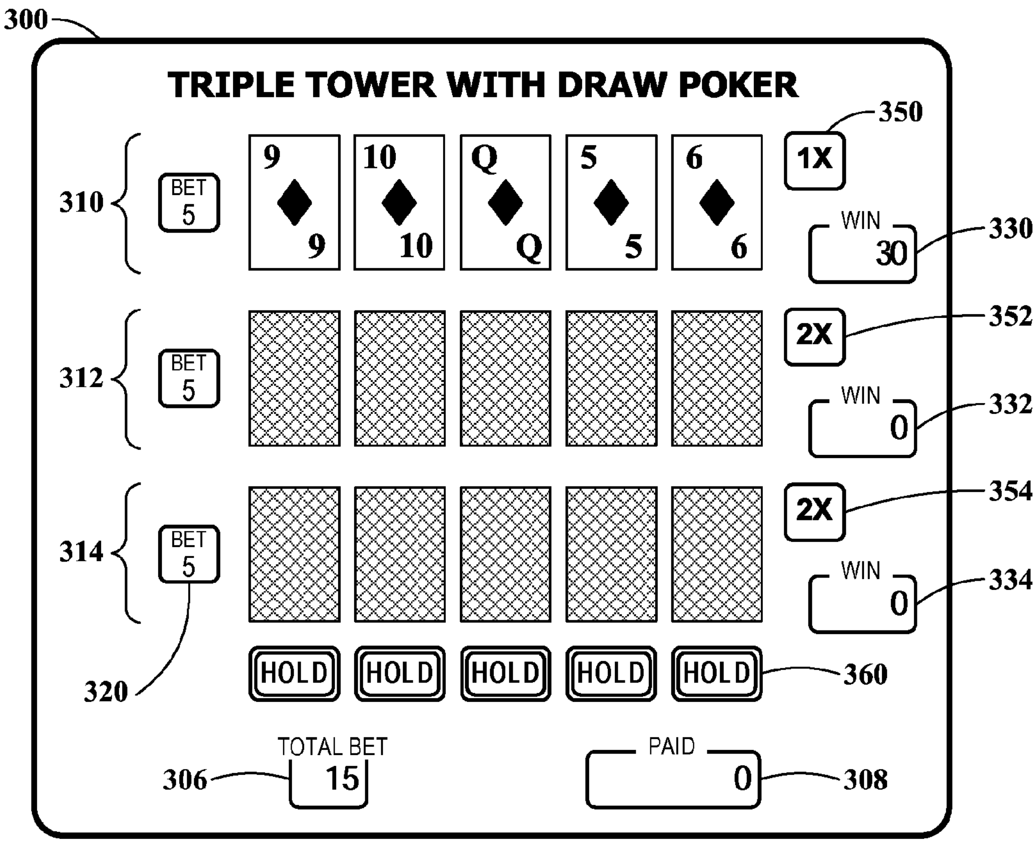
FIGS. 3A, 3B, 3C, and 3D are detail diagrams of a gaming display illustrating a game progression of a game of chance having a modifier usable between game stages according to embodiments of the invention.

As discussed above, the embodiment shown in FIG. 2 is only one example of a gaming device having a game modifier that is usable between game stages. FIGS. 3A-3D illustrate an example progression of game play according to other embodiments of the invention. Referring to FIG. 3A, a game display 300 is configured to display a wagering game of chance that includes three game stages 310, 312, 314. In this embodiment, the first two game stages 310, 312 are five card stud poker games, and the third game stage 314 is a draw poker game. In other embodiments, various other games may be included in a multi-stage gaming event. FIG. 3A represents a point in a wagering gaming event where a player has placed a wager of 15 credits as shown by the total bet indicator 306. The total bet has been automatically allocated between the three games stages 310, 312, 314 as shown by the five credit wagers shown in each of the wager indicators 320.

After the wager has been received and the gaming event initiated, a game modifier 350 is initialized and shown in each of the modifier indicators 350, 352, 354. In this embodiment, game stage multipliers are used as game modifiers and the gaming device sets the game modifier at "1×" at the start of each gaming event. This "1×" is reflected in the three modifier indicators 350, 352, 354 at the start of the gaming event.

As shown in FIG. 3A, a first game stage has already been determined and displayed. The resulting hand in the first game stage is 9D-10D-QD-5D-6D, which results in a diamond flush (e.g., all five cards are of the same suit, and in this case they are all Diamonds). The award associated with a five credit wager for a flush is 30 credits, which is multiplied by the game modifier indicated in the first modifier indicator 350. The result is then displayed in the first win indicator 330.

Additionally, because the poker hand in the first stage resulted in a win, each of the subsequent modifiers is incremented. Hence, as shown, the second modifier indicator 352 and the third modifier indicator 354 are incremented from "1×" to "2×." As discussed above, many different variations of altering the modifiers can be used in other embodiments. Further, if the game modifier is always initialized to "1×," the first modifier indicator associated with the first game stage 310 may be omitted.

Figure 3B:
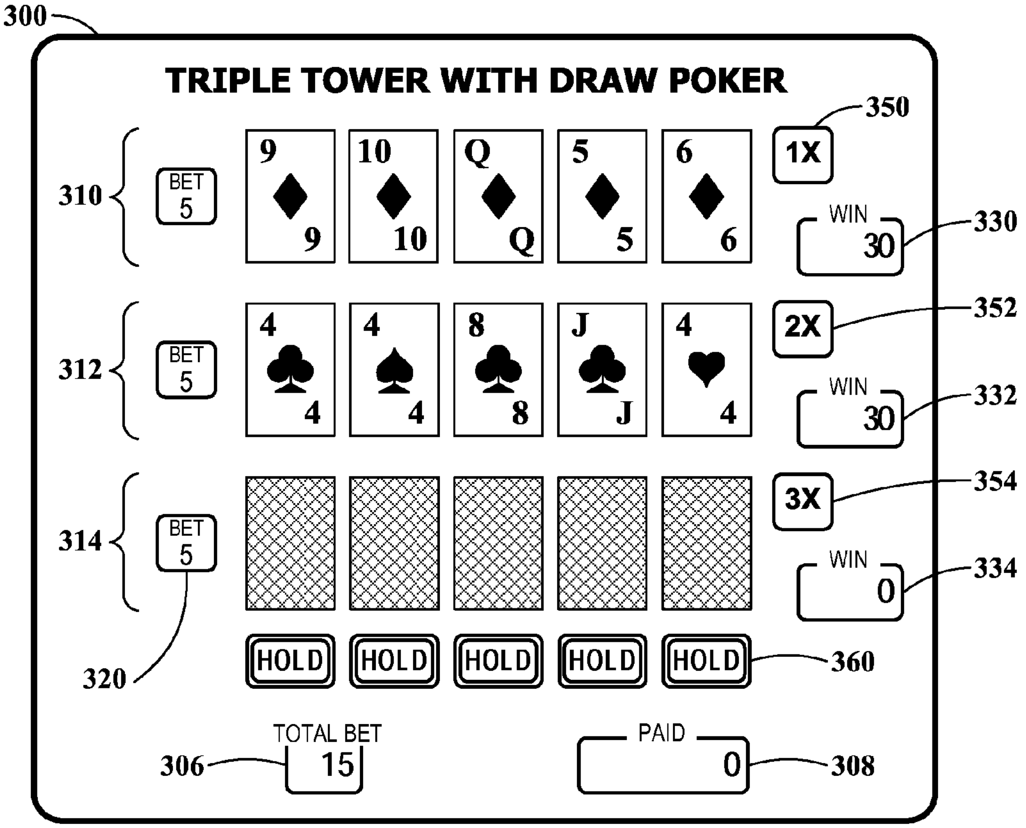

Referring now to FIG. 3B, a second game stage 312 has been played and the resulting hand of 4C-4S-8C-JC-4H has been displayed. This results in a winning hand with 3-of-a-kind (the three 4s), which has a resulting award of 15 credits associated with it. However, because the game modifier 352 was altered based on the result of the first game stage 310, the win amount is multiplied by the amount shown in the second modifier indicator 252, or 15 credits times two for 30 credits. This 30 credit win is shown in the second win indictor 332 associated with the second game stage 312. Additionally, because the hand in the second stage 312 meets a predefined criterion or trigger condition (i.e., it resulted in a winning hand), the subsequent game stages 314 have their win modifiers incremented. Thus, as shown in FIG. 3B, the third modifier indicator 354 has been incremented from "2×" to "3×."

Figure 3C:
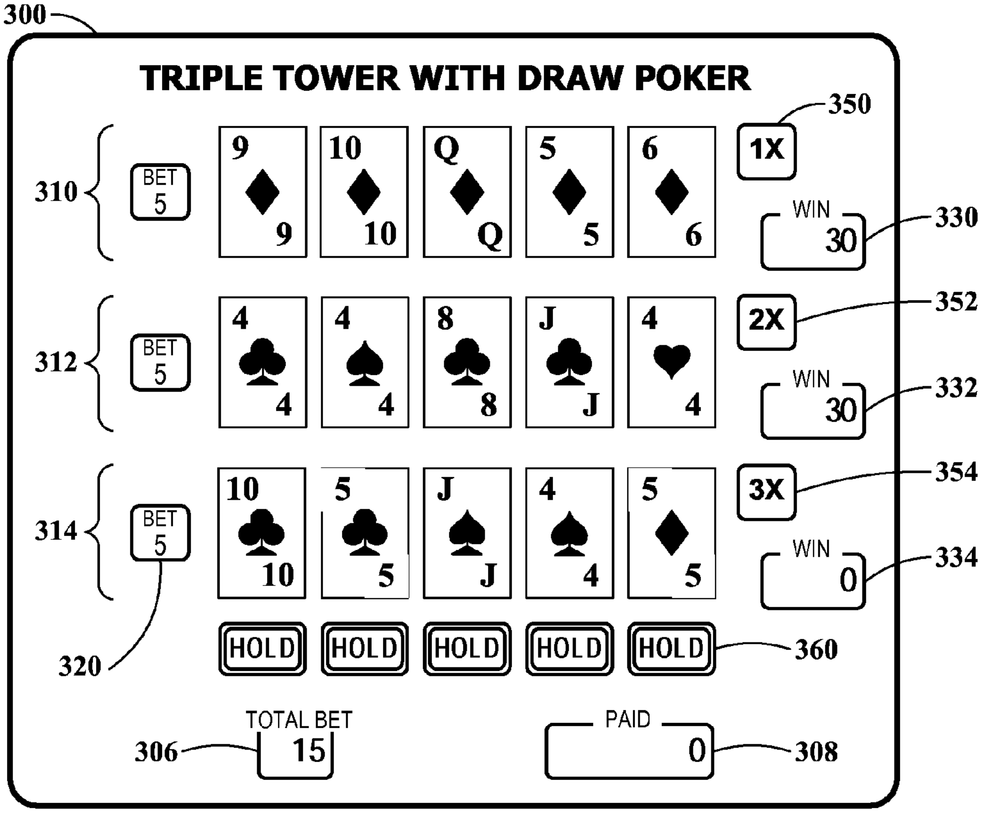

Referring now to FIG. 3C, a third game stage 314 is a draw poker stage having a dealt hand and then allowing a player to hold cards and draw new cards for the non-held cards. In FIG. 3C, the initial hand has been dealt for the third stage 314 which in this embodiment has resulted in the hand of 10C-5C-JS-4S-5D. After this initial hand is dealt, the player may hold none, one, or more of the cards in the third stage 314 by using the virtual buttons 360 associated with the cards on the game display 300. The player may also be able to hold particular cards by using physical buttons on a player interface panel 104 (FIG. 1) or by touching the cards themselves in some embodiments.

Figure 3D:
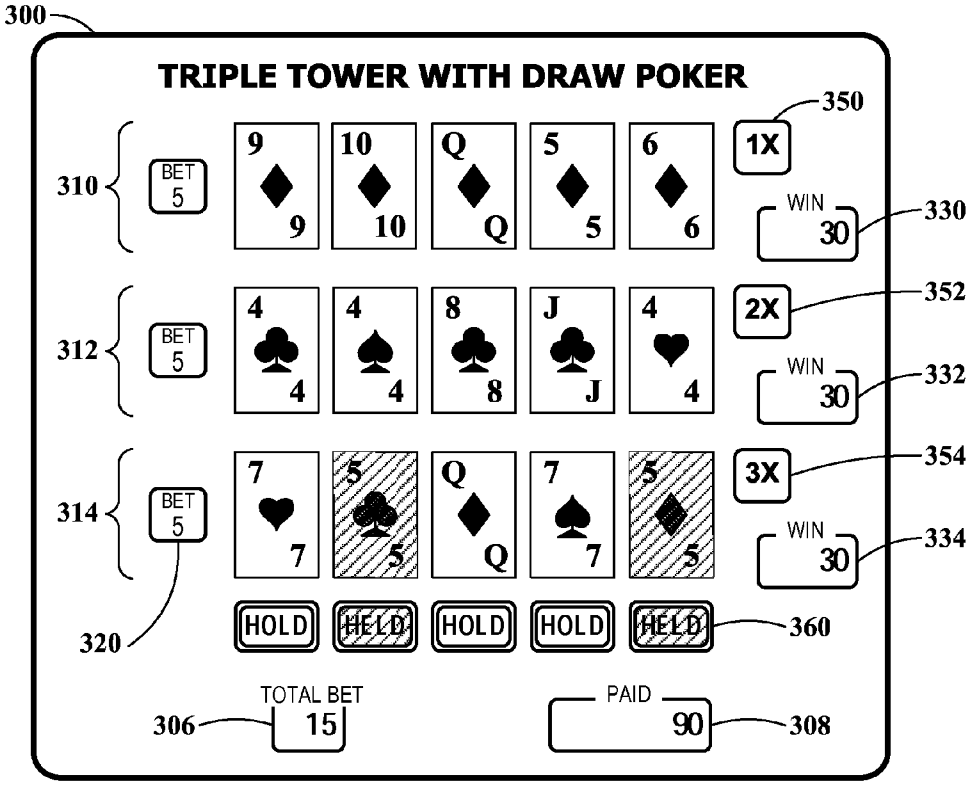

Referring to FIG. 3D, the player has held the 5C and 5D and has drawn new cards for the remaining three card positions in the third stage 314 hand. As shown in FIG. 3D, the player has received new cards 7H, QD, and 7S from the draw. This final hand includes a winning combination of Two Pair (5C-5D and 7H-7S) that has an award of 10 credits associated with it. However, as mentioned above the game modifier 354 has been altered by the previous game stages to be a "3×" multiplier for the third stage 314. Hence, the 10 credit win is multiplied by three, giving a total win for stage three of 30 credits, as shown in the third win indicator 334. Additionally, as all of the stages of this embodiment are complete, the wins from the first stage 310, the second stage 312, and the third stage 314 are summed and awarded to the player. Here, as the first, second, and third win indicators 330, 332, 334 all show wins of 30 credits, the final award paid to the player is 90 credits, which is shown in the total award indicator 308.

Figure 4A:
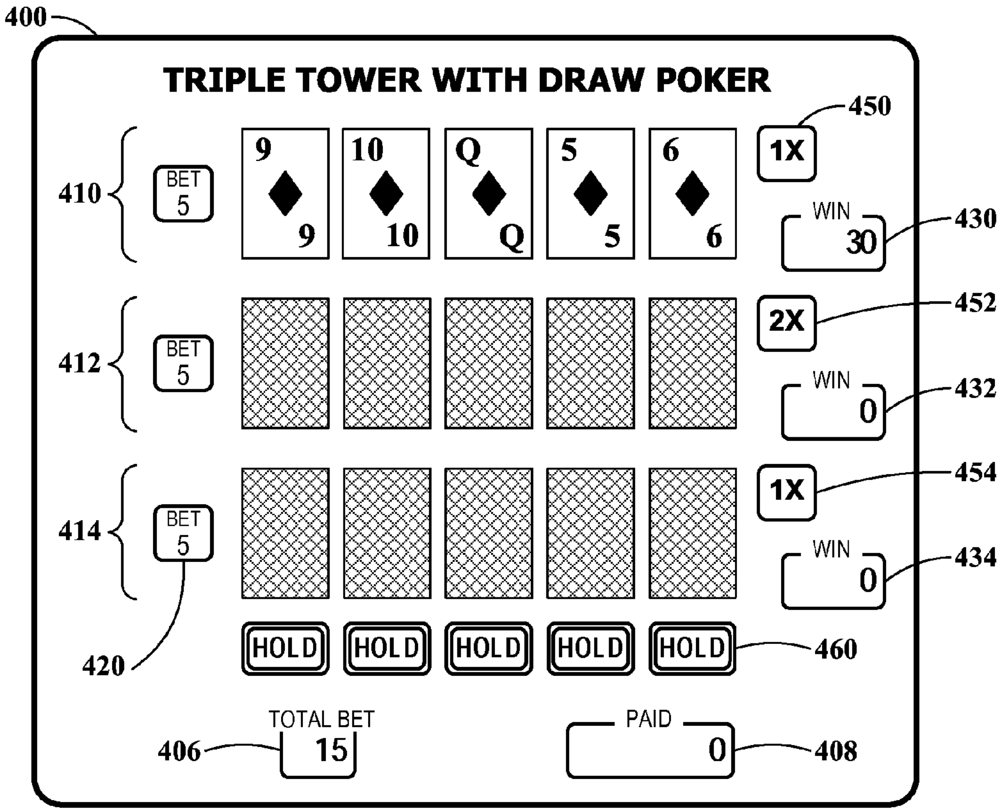
FIGS. 4A, 4B, 4C, and 4D are detail diagrams of a gaming display illustrating a game progression of another game of chance having a modifier usable between game stages according to embodiments of the invention.

FIGS. 4A-4D illustrate another example progression of game play according to other embodiments of the invention. The setup of the game shown in FIGS. 4A-4D is similar to the one shown in FIGS. 3A-3D, but the game play of the game in this embodiment is different for various reasons as illustrated and discussed below. Referring to FIG. 4A, a game display 400 is configured to display a wagering game of chance that includes three game stages 410, 412, 414. Similar to the embodiment shown in FIGS. 3A-3D, the first two game stages 410, 412 of this embodiment are five card stud poker games, while the third game stage 414 is a draw poker game. As discussed above, various other games may be included in a multi-stage gaming event in other embodiments. FIG. 4A again represents a point in a wagering gaming event where a player has placed a wager of 15 credits as shown by the total bet indicator 406. The total bet has been automatically allocated between the three games stages 410, 412, 414 as shown by the five credit wagers shown in each of the wager indicators 420.

After the wager has been received and the gaming event initiated, a game modifier 450 is initialized and shown in each of the modifier indicators 450, 452, 454. In this embodiment, game stage multipliers are used as game modifiers and the gaming device sets the game modifier at "1×" at the start of each gaming event. This "1×" is reflected in the three modifier indicators 450, 452, 454 at the start of the gaming event.

As shown in FIG. 4A, a first game stage has already been determined and displayed. The resulting hand in the first game stage is 9D-10D-QD-5D-6D, which results in a diamond flush (e.g., all five cards are of the same suit, and in this case they are all Diamonds). The award associated with a five credit wager for a flush is 30 credits, which is multiplied by the game modifier indicated in the first modifier indicator 450. The result is then displayed in the first win indicator 430.

Additionally, because the poker hand in the first stage resulted in a win (i.e., met a predefined criterion or trigger condition), subsequent modifiers are altered. However, unlike the embodiments shown in FIGS. 3A-3D where all of the subsequent game modifiers were altered, only the game modifier associated with the next subsequent stage is altered in these embodiments. Hence, as shown, the second modifier indicator 452 is incremented from "1×" to "2×," but the third modifier indicator 454 remains at "1×." As discussed above, many different variations of altering the modifiers can be used in other embodiments. Further, if the game modifier is always initialized to "1×," the first modifier indicator associated with the first game stage 410 may be omitted.

Figure 4B:
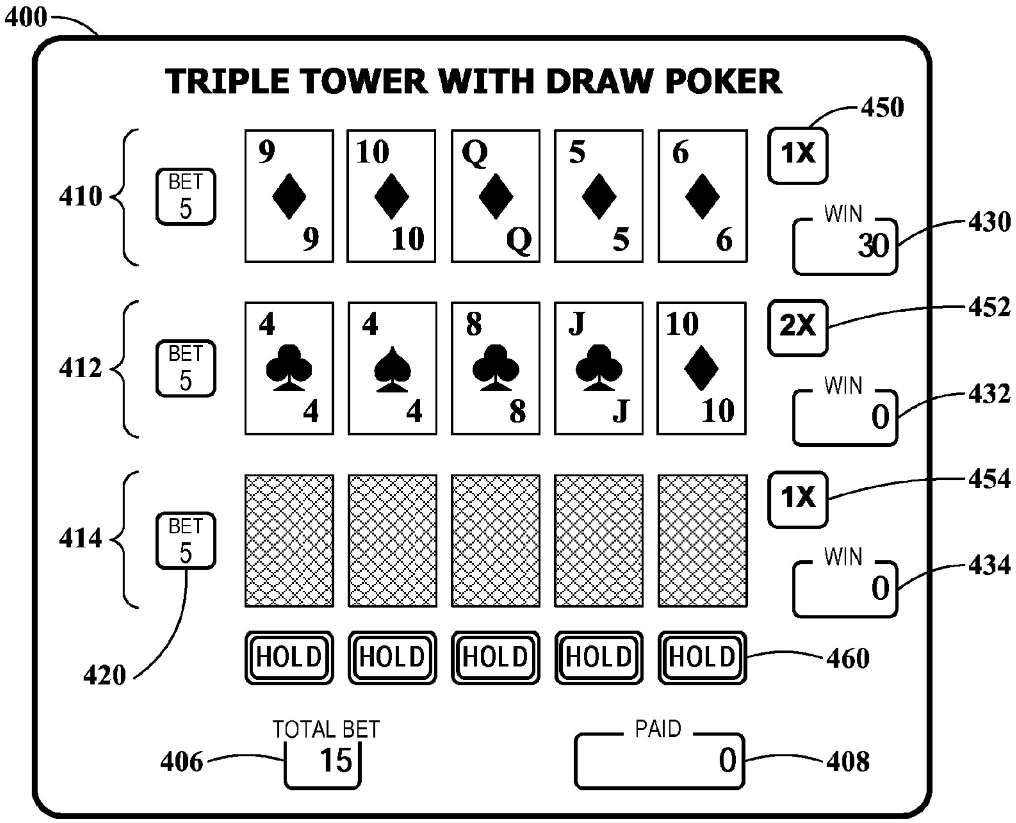

Referring now to FIG. 4B, a second game stage 412 has been played and the resulting hand of 4C-4S-8C-JC-10D has been displayed. This stud poker hand does not result in a winning hand. Hence, no award is shown in the second win indictor 432, even though the game modifier 452 for the second stage had been altered. In embodiments where the game modifier is additional credits, the player may have still won the bonus credit value for stage two 412 even though the second stage did not itself result in a winning hand. Returning to this embodiment, because the outcome of the second stage did not meet a predefined criterion or trigger condition (e.g., a winning hand), the game modifier 454 for the third stage is not altered and remains at "1×."

Figure 4C:
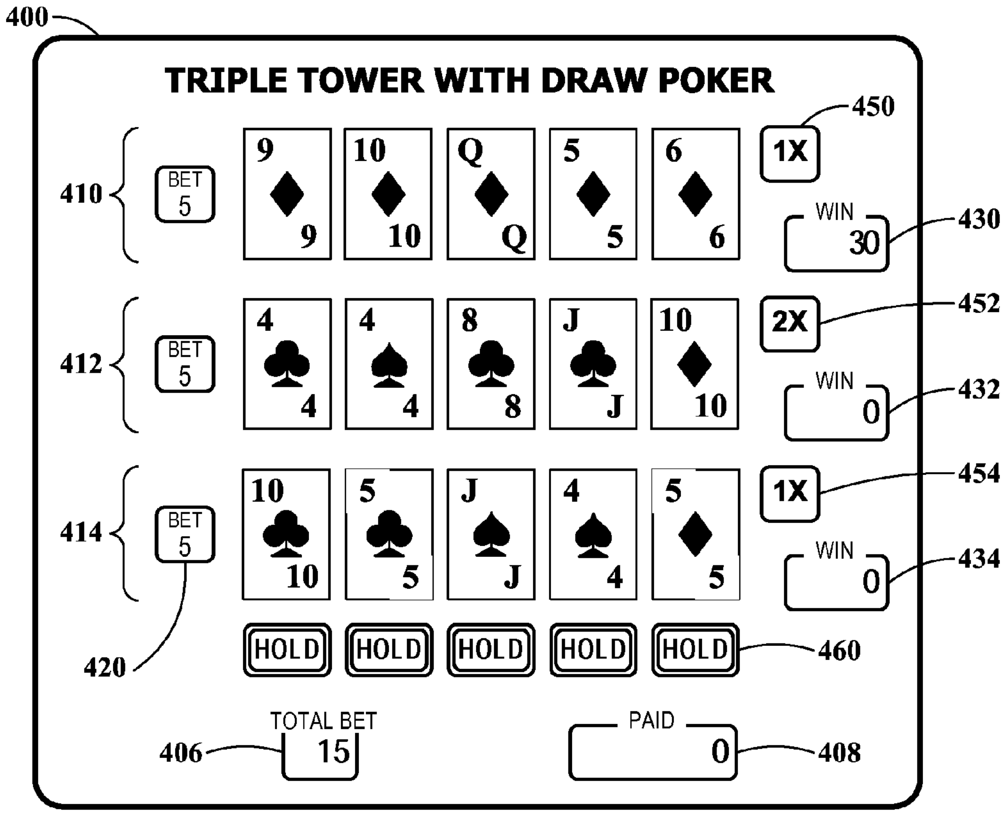

Referring now to FIG. 4C, a third game stage 414 is a draw poker stage having a dealt hand and then allowing a player to hold cards and draw new cards for the non-held cards. In FIG. 4C, the initial hand has been dealt for the third stage 414 which in this embodiment has resulted in the hand of 10C-5C-JS-4S-5D. After this initial hand is dealt, the player may hold none, one, or more of the cards in the third stage 414 by using the virtual buttons 460 associated with the cards on the game display 400. The player may also be able to hold particular cards by using physical buttons on a player interface panel 104 (FIG. 1) or by touching the cards themselves in some embodiments.

Figure 4D:
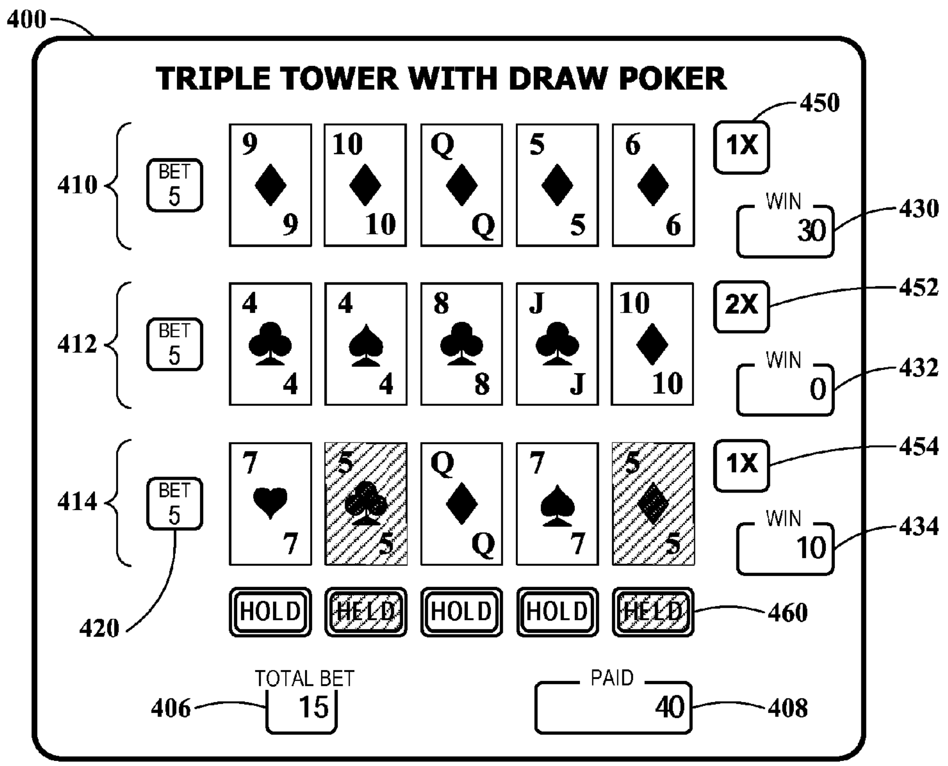

Referring to FIG. 4D, the player has held the 5C and 5D and has drawn new cards for the remaining three card positions in the third stage 414 hand. As shown in FIG. 4D, the player has received new cards 7H, QD, and 7S from the draw. This final hand includes a winning combination of Two Pair (5C-5D and 7H-7S) that has an award of 10 credits associated with it. Since the game modifier 454 was not altered by the previous game stages, it remains at its initialized value of "1×" and does not modify the 10 credit award. Hence, the credit win is shown in the third win indicator 434. Additionally, as all of the stages of this embodiment are complete, the wins from the first stage 410, the second stage 412, and the third stage 414 are summed and awarded to the player. Here, the values in the first, second, and third win indicators 430, 432, 434 are summed to a total of 40 credits, which is shown in the total award indicator 408.

Figure 5:
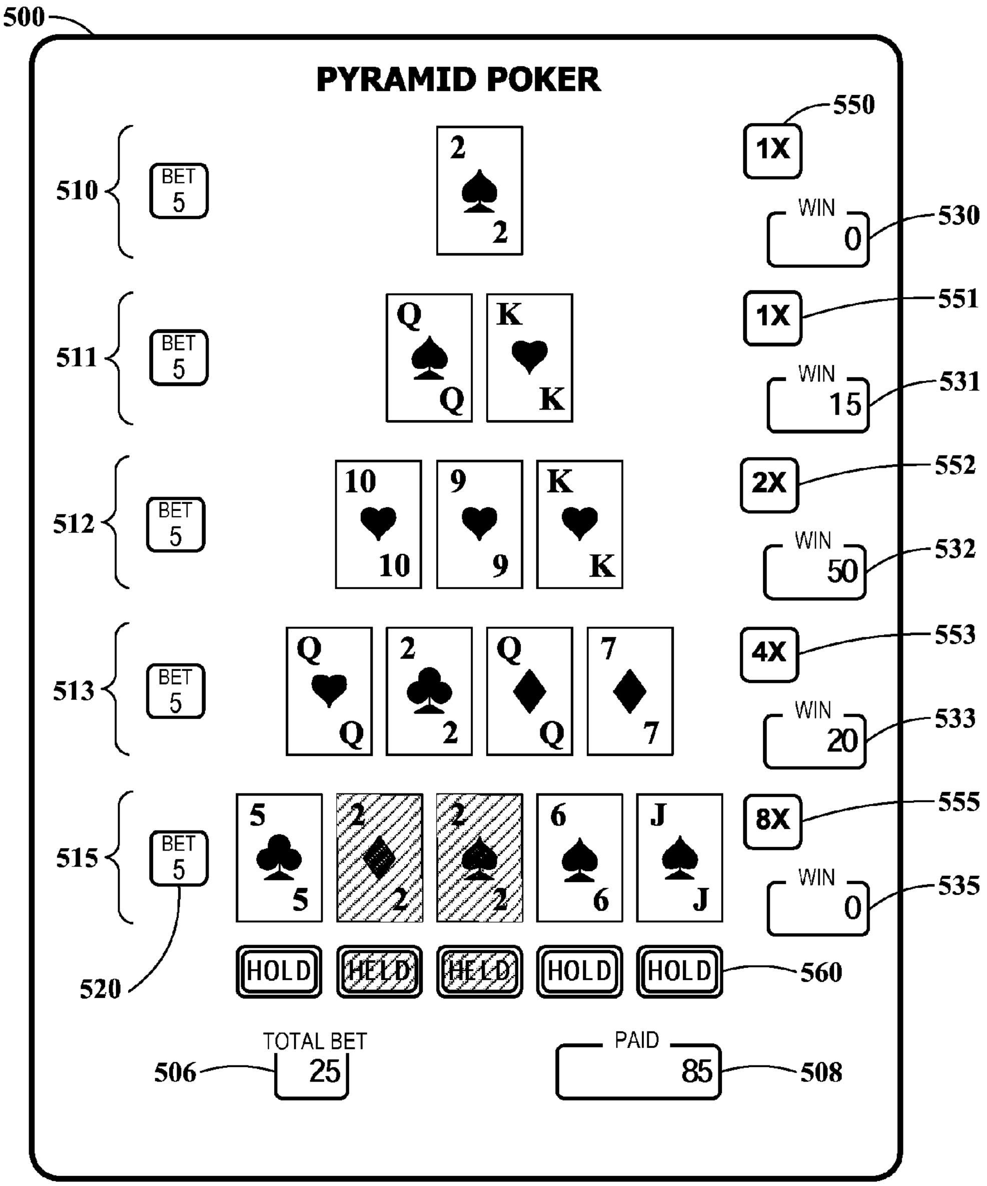
FIG. 5 is a detail diagram of a gaming display showing a game of chance having a modifier usable between game stages according to embodiments of the invention.

FIG. 5 is another example embodiment of a game modifier being used between game stages of a multi-stage game of chance according to embodiments of the invention. Referring to FIG. 5, a five stage wagering game of chance is shown. Here, the first game stage 510 is a single card stud poker game, the second game stage 511 is a two card stud poker game, the third game stage 512 is a three card stud poker game, the fourth game stage 513 is a four card stud poker game, and the fifth game stage 515 is a five card draw poker hand. As shown in FIG. 5, a player has placed a total wager of 25 credits, as shown in the total wager indicator 506, and the wagered credits have been allocated between each of the game stages as shown by the stage bet indicators 520. Here, since 25 credits were wagered on a game with five game stages, each game stage is allocated one-fifth of the total credits or, in other words, five credits is wagered on each game stage.

In the game play associated with the illustrated game shown in FIG. 5, the player received a non-winning hand in the first game stage 510, a straight in the second game stage 511, a flush in the third game stage 512, a pair in the fourth game stage 513, and a non-winning hand in the draw poker hand of the fifth game stage 515. Here, the game play may automatically show the first game stage 510, second game stage 511, third game stage 512, fourth game stage 513, and dealt hand of the fifth game stage 515 in automatic succession with little time in between each game stage. This allows the multi-stage game to be completed at a relatively rapid pace. Additionally, the player will still be able to hold and draw cards for the draw poker hand in the fifth game stage 515. Since the game modifier may be altered by predefined criteria or trigger conditions from each of the first four stages, the player may be playing the draw poker hand in the fifth game stage 515 with a large multiplier value for the game modifier 555 associated with the fifth game stage 515.

As shown in FIG. 5, the game modifier 550 was initialized at "1×" for the first game stage. However, as shown on first win indicator 530, the first game stage 510 did not result in a winning outcome, and hence the game modifier 551 was maintained at "1×" for the second game stage 511. The second game stage 511 resulted in a win (predefined criterion was met), as shown on the second win indicator 531, thereby altering the game modifier 552 for the third game stage 512 by doubling the multiplier value. The third game stage 512 also resulted in a win, as shown on the third win indicator 532, thereby altering the game modifier 553 for the fourth game stage 513 by doubling the multiplier value again. The fourth game stage 513 also resulted in a win, as shown on the fourth win indicator 533, thereby altering the game modifier 555 for the fifth game stage 515. Although the game modifier 555 for the fifth game stage was up to an "8×" multiplier, the draw poker hand in the fifth game stage did not result in a win, as indicated by the fifth win indicator 535. Once the fifth game stage 515 was complete, the values on all of the win indicators 530-535 were summed up and award to the player, as shown in the total award indicator 508.

The embodiments shown in FIGS. 6A-6D introduce a few new variations for games with multiple game stages and game modifiers usable between game stages. In particular, FIGS. 6A-6D illustrate an example game progression for embodiments that utilize multiple game areas, where each game area includes multiple game stages. Additionally, these embodiments include multiple ways a game modifier can be modified for the game stages. In particular, game modifiers are altered for subsequent game stages within each game area when a current game stage results in a winning hand. In addition, if related game stages within each game area result in a winning hand, the current and subsequent game stages are further altered.

Figure 6A:
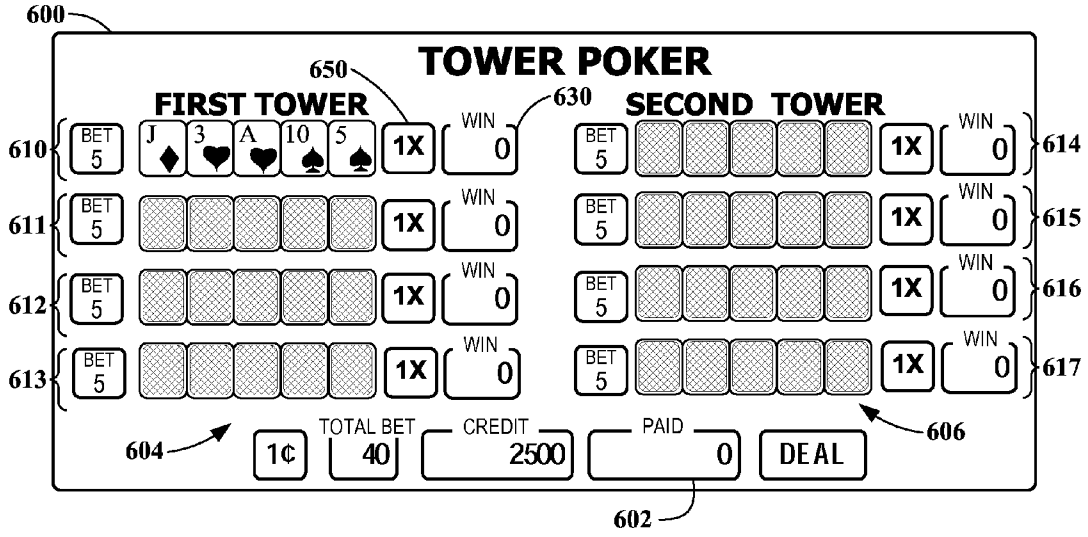
FIGS. 6A, 6B, 6C, and 6D are detail diagrams of a gaming display illustrating a game progression of another game of chance having multiple game areas and a modifier usable between game stages according to embodiments of the invention.

Referring to FIG. 6A, a gaming display 600 includes a first game area 604 having a first game stage 610, a second game stage 611, a third game stage 612, and a fourth game stage 613. Additionally the gaming display 600 includes a second game area 606 having a fifth game stage 614, a sixth game stage 615, a seventh game stage 616, and an eighth game stage 617. Each of the game stages includes a five card stud poker hand. The first game area 604 is organized in a first column of game stages, and the second game area 606 is organized in a second column of game stages adjacent to the first game area. Organizing the game areas and stages as shown in FIG. 6A allows for various game stages in each game area to be visually related. Here, the related stages are horizontally adjacent to one another. Hence, the first game stage 610 of the first game area 604 is associated with the fifth game stage 614 of the second game area 606. The additional game stages below these two game stages are also similarly related. Although these embodiments show one way of organizing game stages and game areas, and relating game stages between game areas, many different variations may be included in other embodiments.

At the beginning of the game event, each of the game modifiers 650 are initialized to "1×" and the win indicators 630 associated with each stage is set to zero. FIG. 6A shows the step where the first stud poker hand for the first game sage 610 is revealed. As shown in FIG. 6A, this poker hand is not a winning hand.

Figure 6B:
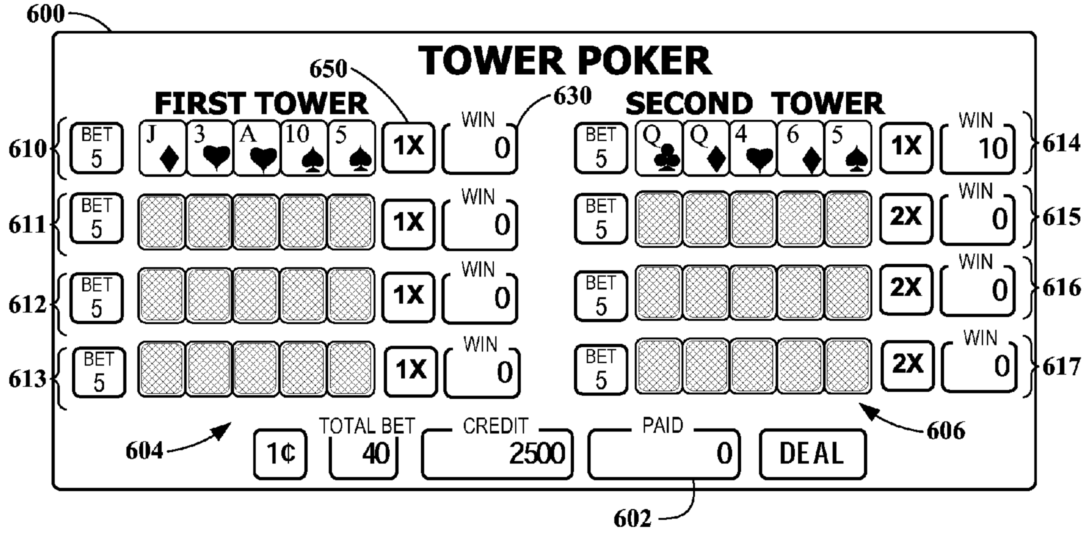

Referring now to FIG. 6B, the next game stage is played. Here, the fifth game stage 614 is played after the first game stage 610 since the fifth game stage is related to the first game stage. In this instance, the fifth game stage results in a win, and each of the subsequent game stages below the fifth game stage 614 in the second game area 606 have their associated game modifiers altered. Note that in this example, the game stages in the game areas not part of the current game stage do not have their associated game modifiers altered even though they are played subsequent to the current hand.

Figure 6C:
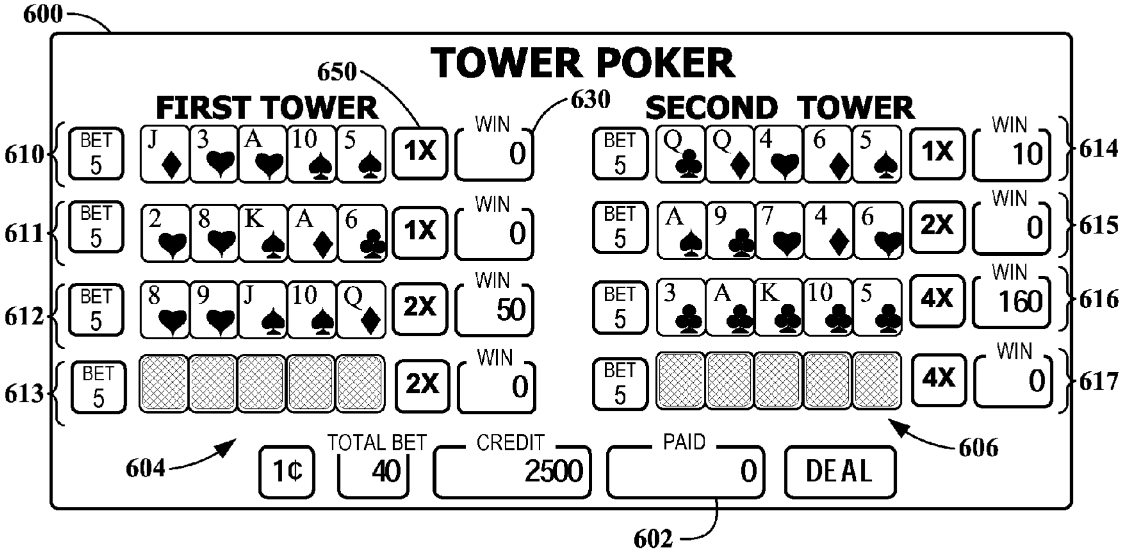

Referring now to FIG. 6C, the second game stage 611, sixth game stage 615, third game stage 612, and seventh game stage 616 have all been played. As shown in FIG. 6C, the second and sixth 611, 615 game stages did not result in winning hands. However, the third and seventh game stages 612, 616 both resulted in winning hands. Here, because the third game stage 612 and seventh game stage 616 resulted in win, the subsequent game stages below them in each game area have their associated game modifiers 650 altered. In addition, because the third game stage 612 is related to the seventh game stage 616, and both related game stages resulted in winning hands, the current game stages (third game stage 612 and seventh game stage 616) also have their respective game modifiers 650 altered. Hence, as shown in the FIG. 6C, the game modifier 650 associated with the third game stage 612 is doubled to "2×" even though the previous game stages in the first game area 604 did not meet the predefined criterion. Similarly, the game modifier 650 associated with the seventh game stage 616 is doubled to "4×." This allows the game modifiers for currently played game stages to increase or be otherwise altered during game play of that game stage. Although the embodiment in these figures show the game modifiers 650 being doubled for both subsequent hands and current hands when related game stages both satisfy predefined criterion, separate modification schemes may be used for the different modifier alterations. For example, the game modifiers for subsequent game stages within the same game areas may be doubled, while the game modifier for the current game stages may be tripled. In another example, the game modifiers for subsequent game stages with the same game areas may be doubled, while the awards in the current game stages may each be modified or incremented by 25 credits. Again, many different variations exist in different embodiments.

Figure 6D:
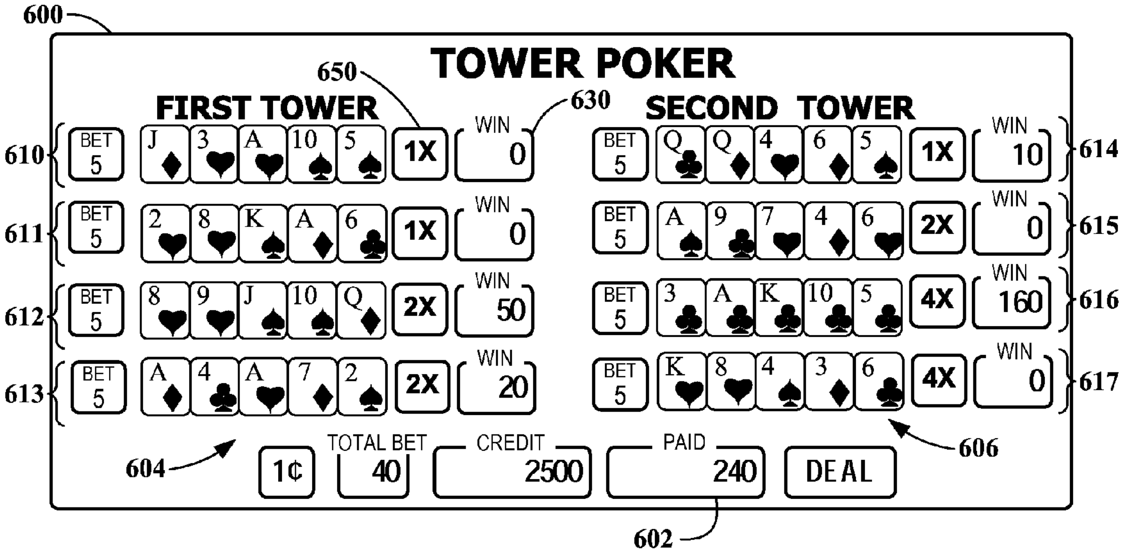

Referring to FIG. 6D, the fourth game stage 613 and eighth game stage 617 are completed, and a total of all of the win indicators 630 is summed and shown on the total win indicator 602. Although this embodiment shows game stages related by location between game areas, game stages may be related within the same game area, or multiple game stages in one game area may be related to a single game stage in another game area. Additionally, the game stages may be related by position, play order, randomness, outcomes, or other reasons in other embodiments.

Figure 7:
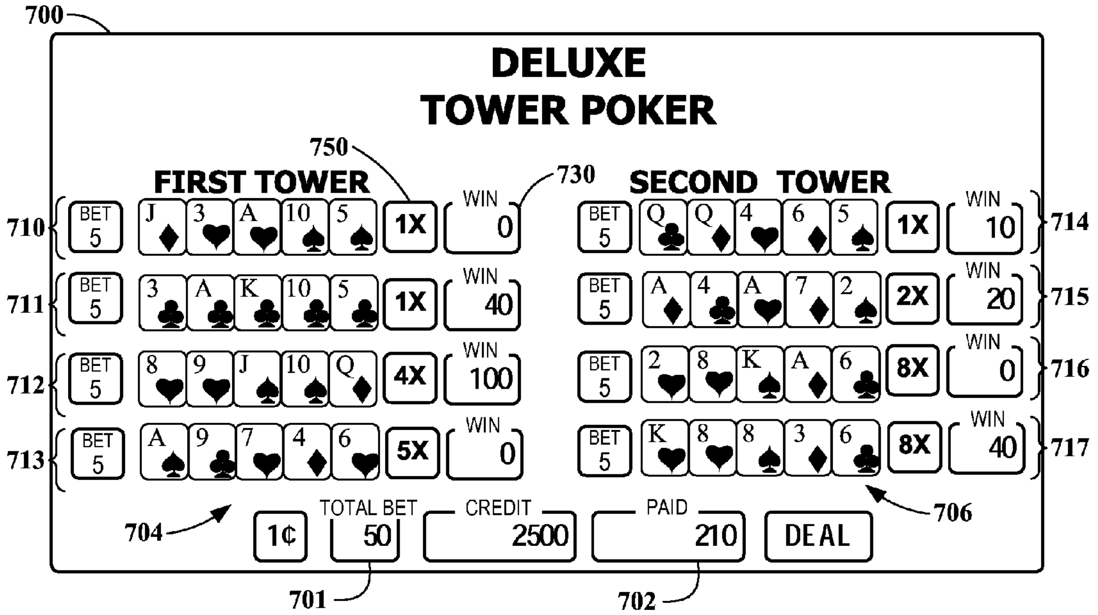
FIG. 7 is a detail diagram of a gaming display showing a game of chance having a modifier usable between game stages according to embodiments of the invention.

FIG. 7 illustrates another embodiment that utilizes multiple game areas, where each game area includes multiple game stages. Referring to FIG. 7, a game display 700 includes a first game area 704 having a first game stage 710, a second game stage 711, a third game stage 712, and a fourth game stage 713. Additionally the gaming display 700 includes a second game area 706 having a fifth game stage 714, a sixth game stage 715, a seventh game stage 716, and an eighth game stage 717. Each of the game stages includes a five card stud poker hand. The first game area 704 is organized in a first column of game stages, and the second game area 706 is organized in a second column of game stages adjacent to the first game area. The game stages in this embodiment are related based on the same positional location as discussed above with the example embodiments shown in FIGS. 6A-6D.

Here, a total bet of 50 credits is shown in the wager indicator 701. This wager includes five credits wagered on each of the eight game stages and 10 credits wagered to "buy" a bonus feature related between the game stages. Here, the game modifying multipliers are incremented by one for game stages subsequent to a winning game stage as part of the non-bonused game. The bonus feature, which can be activated by an increase in wager amount, quadruples the game modifying multipliers for subsequent game stages rather than simply incrementing them by one when related game stages both result in winning hands. This can be seen in the game play that unfolded in the example game illustrated in FIG. 7.

Here, the game modifying multiplier 750 associated with the sixth game stage 715 was incremented from "1×" to "2×" because the sixth game stage 714 resulted in a winning poker hand. Looking down further, however, the game modifying multipliers 750 associated with the third game stage 712 and seventh game stage 716 were each quadrupled (multiplied by four) because both the second game stage 711 and the sixth game stage 715 resulted in winning poker hands. The game modifying multiplier 750 associated with the fourth game stage 713 was incremented by one from "4×" to "5×" because the third game stage 712 resulted in a winning poker hand. As shown in FIG. 7, after each of the game stages has been completed, the win amounts shown in each of the win indicators 730 are summed up and awarded to the player, as shown by the total win indicator 702.

Figure 8:
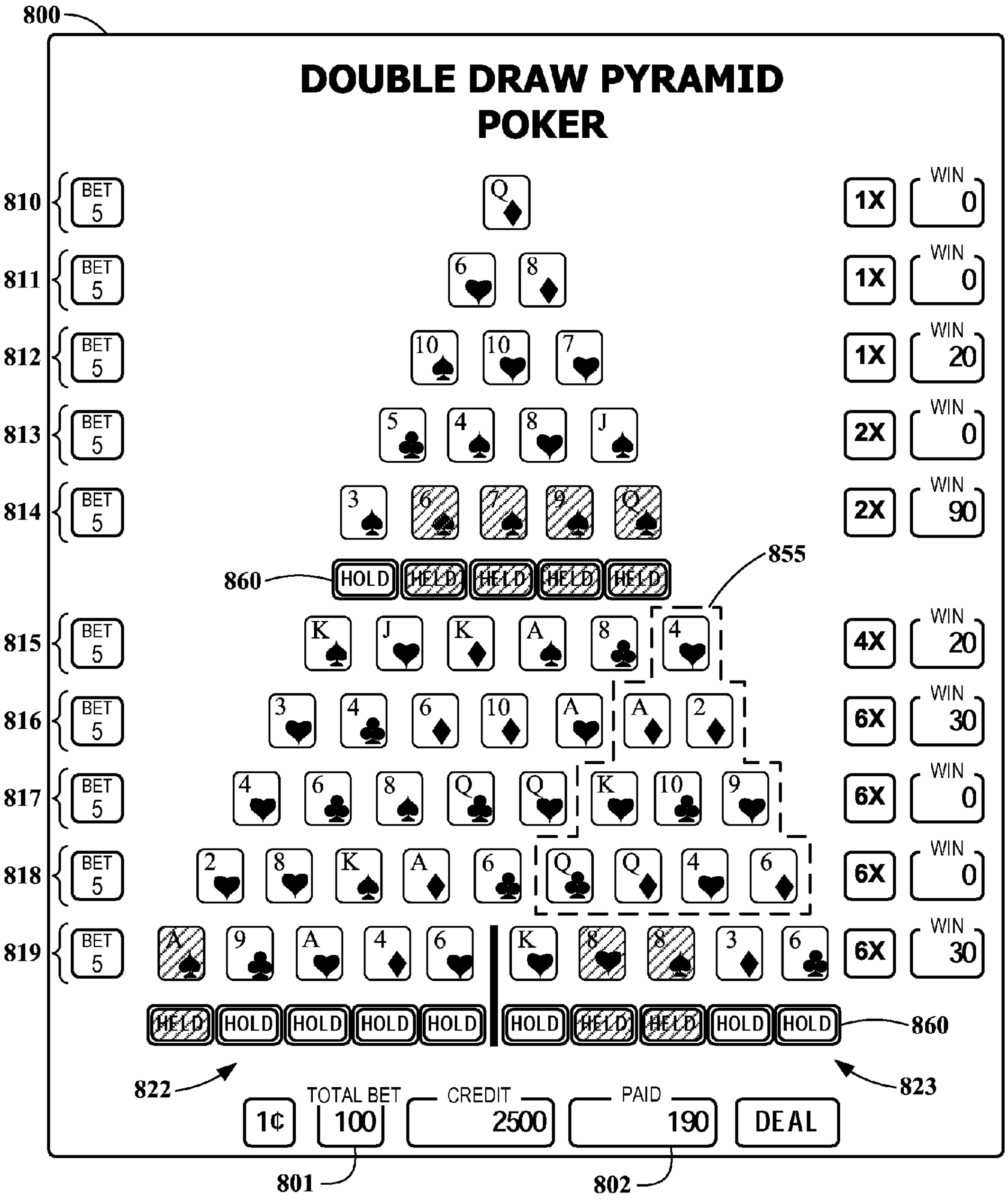
FIG. 8 is a detail diagram of a gaming display showing another game of chance having a modifier usable between game stages according to embodiments of the invention.

FIG. 8 is a detail diagram of a gaming display showing another game of chance having a modifier usable between game stages according to embodiments of the invention. In the embodiment shown in the FIG. 8, the game of chance includes a ten stage game where some of the game stages have multiple game areas within the stage. Referring to FIG. 8, game display 800 includes ten game stages 810, 811, 812, 813, 814, 815, 816, 817, 818, 819. Here the first four game stages 810, 811, 812, 813 are stud poker stages of varying hand lengths between one and four cards. The fifth game stage 814 is a draw poker stage and uses buttons 860 to hold cards in the initially dealt hand. The next four game stages 815, 816, 817, 818 are also stud poker stages. In some embodiments, these stages are played respectively as a six card stud poker hand, a seven card stud poker hand, an eight card stud poker hand, and a nine card stud poker hand. In other embodiments, although the hands include more than five cards, each hand is evaluated based only on the best poker hand created using five of the cards in the hand. In yet other embodiments, the cards located in the dashed outline 855 may be bonus cards that are only revealed face up and used in the poker hand when the previous game stages meet a predefined criterion or trigger condition. In the embodiment shown in FIG. 8, the bonus cards in the dashed area 855 are only displayed, and available for use in the stud poker hands in stages six, seven, eight, and nine 815-818 when the draw poker hand in the fifth game stage 814 results in an outcome of a straight or better (i.e., a straight, flush, full house, 4-of-a-kind, straight flush, or royal flush—for Jacks or Better Poker). Since the poker hand in the fifth stage 814 resulted in a flush hand, these bonus game modifier cards 855 were revealed along with their associated game stages 615, 616, 617, 618.

In this embodiment, the tenth game stage 819 includes two game areas 822, 823. Each of these game areas 822, 823 include a five card draw poker hand. In this embodiment, the player plays both draw poker hands and is given any awards associated with both poker hands. However, in other embodiments, the player may only be given the value of the higher poker hand, or the player may only get to play the second draw poker hand in the second game area 823 when the first draw poker hand in the first game area 822 results in a winning hand, or meets another predefined criterion. Many different variations again exist that are included in other embodiments.

FIGS. 9A-9D illustrate another game progression for an embodiment of the invention. In this embodiment, a wagering game of chance includes nine game stages, where eight of the game stages are stud poker hands and one of the game stages is a draw poker hand. Also, in this embodiment, a predefined criterion is met when a current game stage results in a winning hand. When a predefined criterion is met, the game modifying multipliers for related subsequent game stages are incremented by one. However, when a predefined criterion is not met, the game modifying multipliers for related subsequent game stages are decremented by one unless the game modifying multiplier is already at "1×."

Figure 9A:
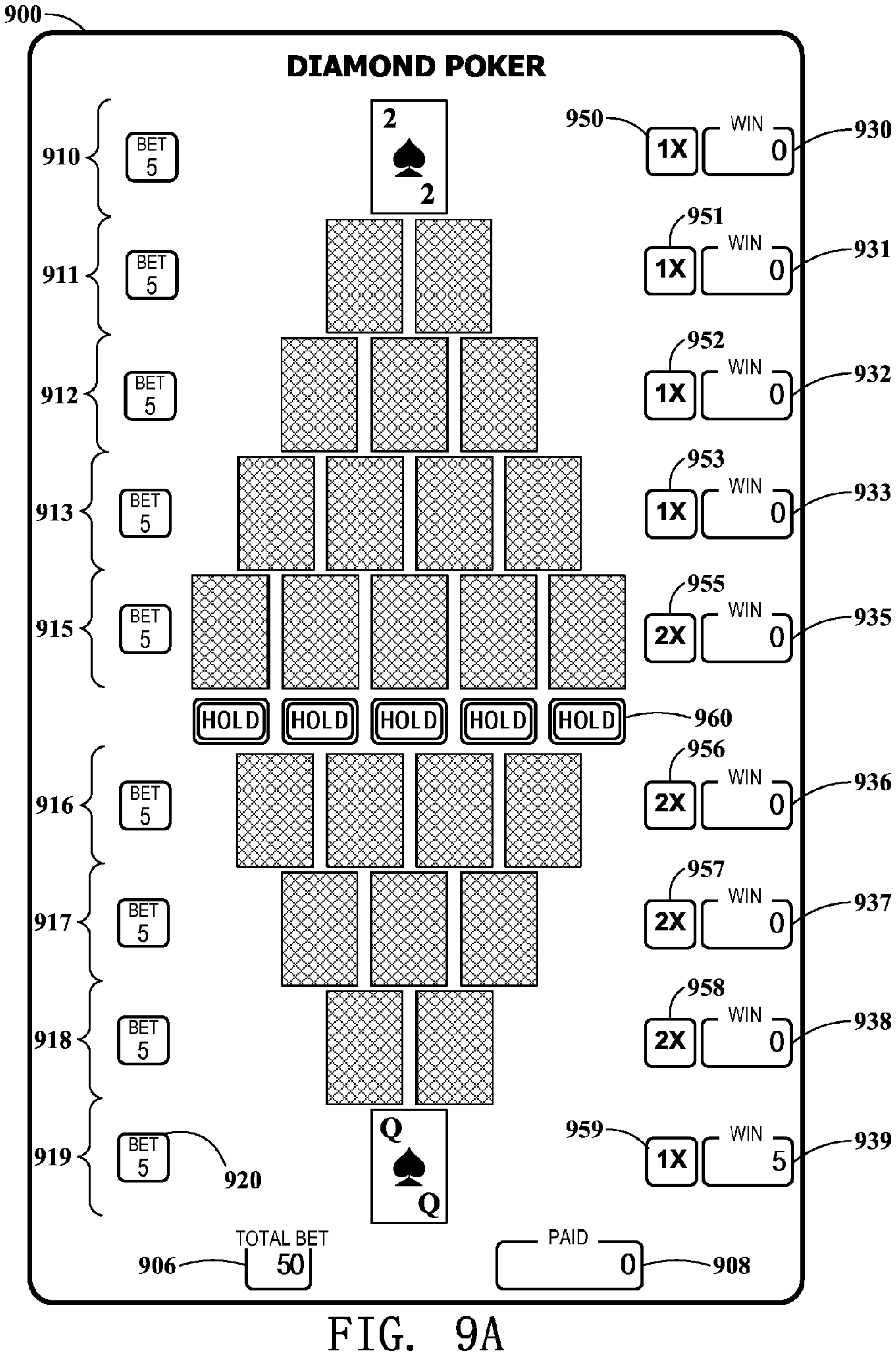
FIGS. 9A, 9B, 9C, and 9D are detail diagrams of a gaming display illustrating a game progression of another game of chance having multiple game areas and a modifier usable between game stages according to embodiments of the invention.

Referring to FIG. 9A, a game display 900 includes nine game stages 910-919 each with a respective win indicator 930-939 and a respective game modifier indicator 950-959. The total wager for this game event is 50 credits, which includes a wager of five credits for each game stage as shown on the wager indicators 920 associated with each stage, and five credits for a multiplied modifying multiplier to be used with the draw poker hand in the fifth stage 915, as further explained below.

Here, the first game stage 910, second game stage 911, third game stage 912, and fourth game stage 913 are related stud poker game stages that are positioned above a fifth draw poker game stage 915. Similarly, the sixth game stage 916, seventh game stage 917, eighth game stage 918, and ninth game stage 919 are related stud poker game stages that are positioned below the fifth game stage 915. These game stage progressions (910-913 and 919-916) are related because game modifiers are altered between the stages in each of these individual stage progressions without input from the other stage progression. The game modifier 955 associated with the fifth game stage 915 is the product of the last game modifying multipliers from each of the stage progressions. This means that the final values of the fourth game modifying multiplier 953 and the sixth game modifying multiplier 956 are multiplied together to come up with the fifth game modifying multiplier 955 used with the draw poker hand in the fifth game stage 915. As mentioned above, this multiplied game modifying multiplier for the fifth game stage is based on the additional five credit wager. Had the additional wager not been made, the fifth game modifying multiplier would have been the larger of the game modifying multipliers from the two individual stage progressions. In other embodiments, this fifth game modifier 955 may be the sum of the game modifiers from the upper stage progression (game stages 910-913) and the lower stage progression (game stages 916-919), or may be related to one or both or the upper and lower stage progressions based on another metric or criterion.

Referring again to FIG. 9A, the first stage 910 is played first, followed by the ninth stage 919. Here, the first stage does not result in a winning hand, and the game modifiers related to the first stage progression remain unaltered. The stud poker game in the ninth stage, however, does result in a win and the sixth, seventh, and eighth game modifying multipliers are incremented by one. The fifth game modifying multiplier takes on the multiplied value from the upper and lower stage progressions. In this instance, the lower stage progressions have a game modifying multiplier value of "2×," and the upper stage progressions have a game modifying multiplier value of "1×." Hence, the fifth game modifying multiplier is set at "2×."

Figure 9B:
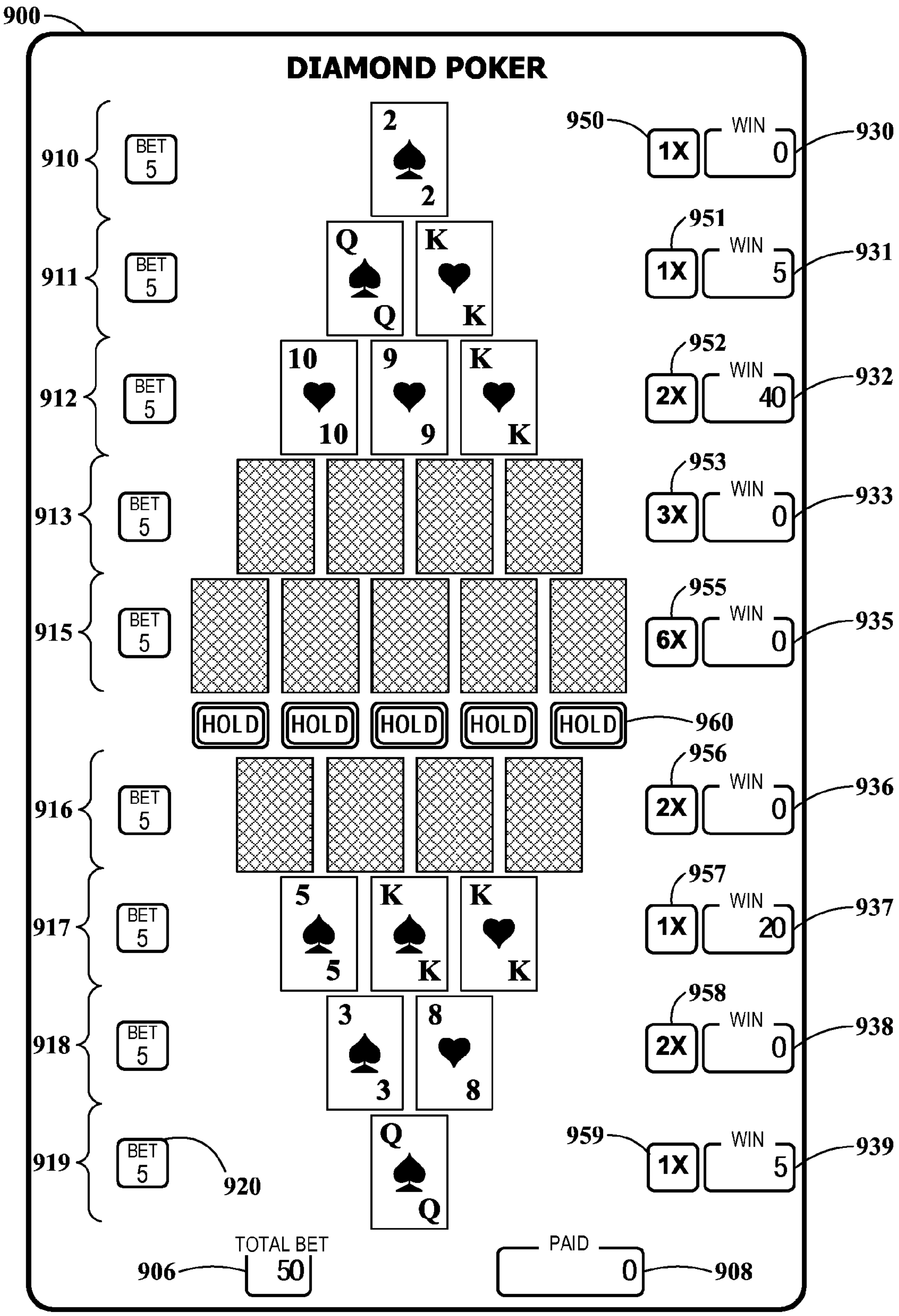

Referring to FIG. 9B, the second game stage 911, eighth game stage 918, third game stage 912, and seventh game stage 917 have been played. As seen in FIG. 9B, the upper stage progression has resulted in two consecutive winning hands, while the eighth game stage resulted in a losing hand. Hence, the game modifying multipliers in the upper stage have been incremented twice up to "3×" while the game modifying multipliers in the lower stage progression were decremented by one, and then incremented by one back to "2×." The fifth game modifying multiplier 955 is again set to the product of the values of the upper and lower stage progression game modifying multipliers. Hence, the fifth game modifying multiplier 955 is set to "6×."

Figure 9C:
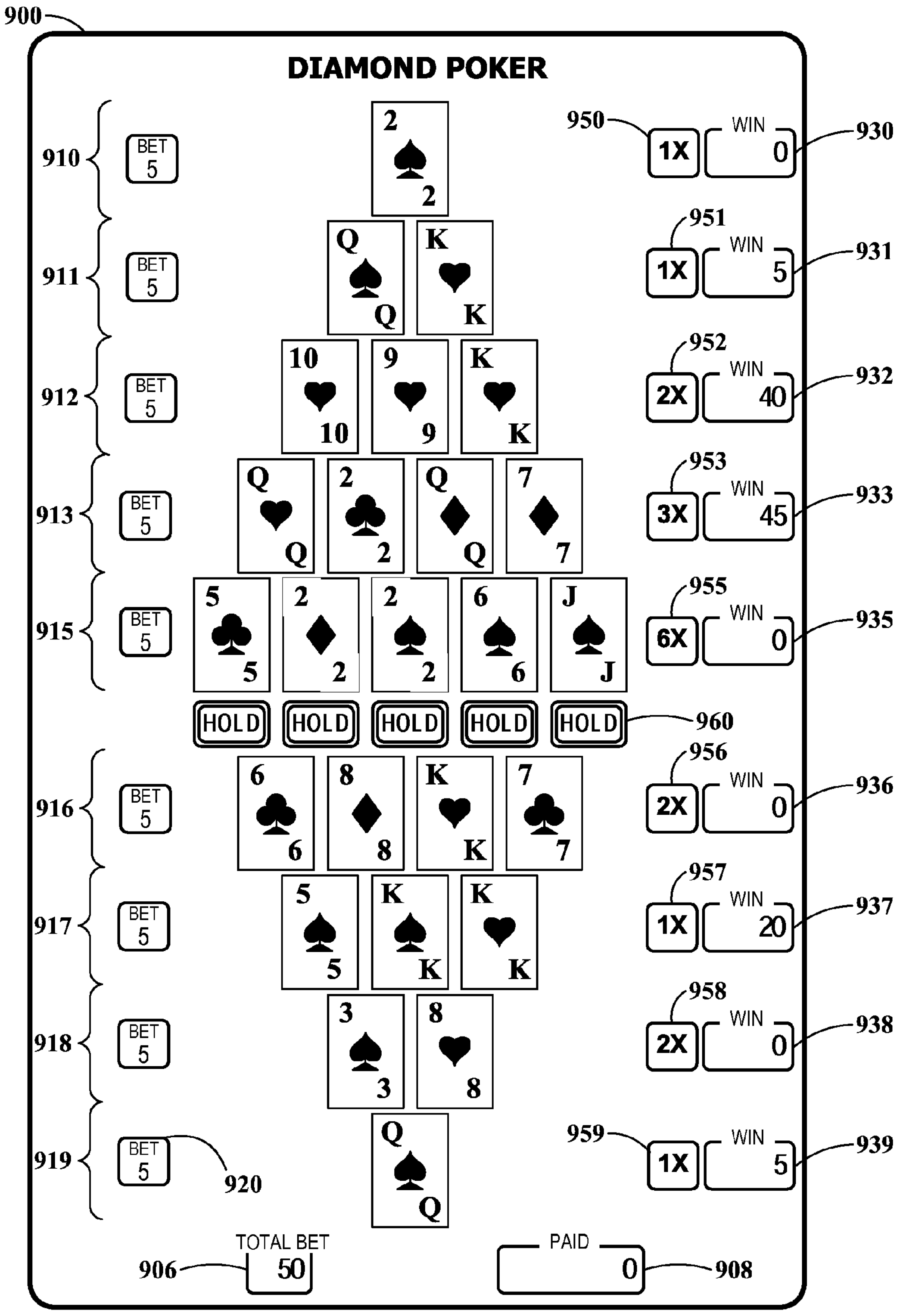

Referring to FIG. 9C, the fourth game stage 913, sixth game stage 916, and initial dealt hand of the fifth game stage 915 have been played. Here, the player knows that the fifth game stage 515 will have a game modifying multiplier of "6×" before the player holds and draws cards, which may increase anticipation for the player on the draw.

Figure 9D:
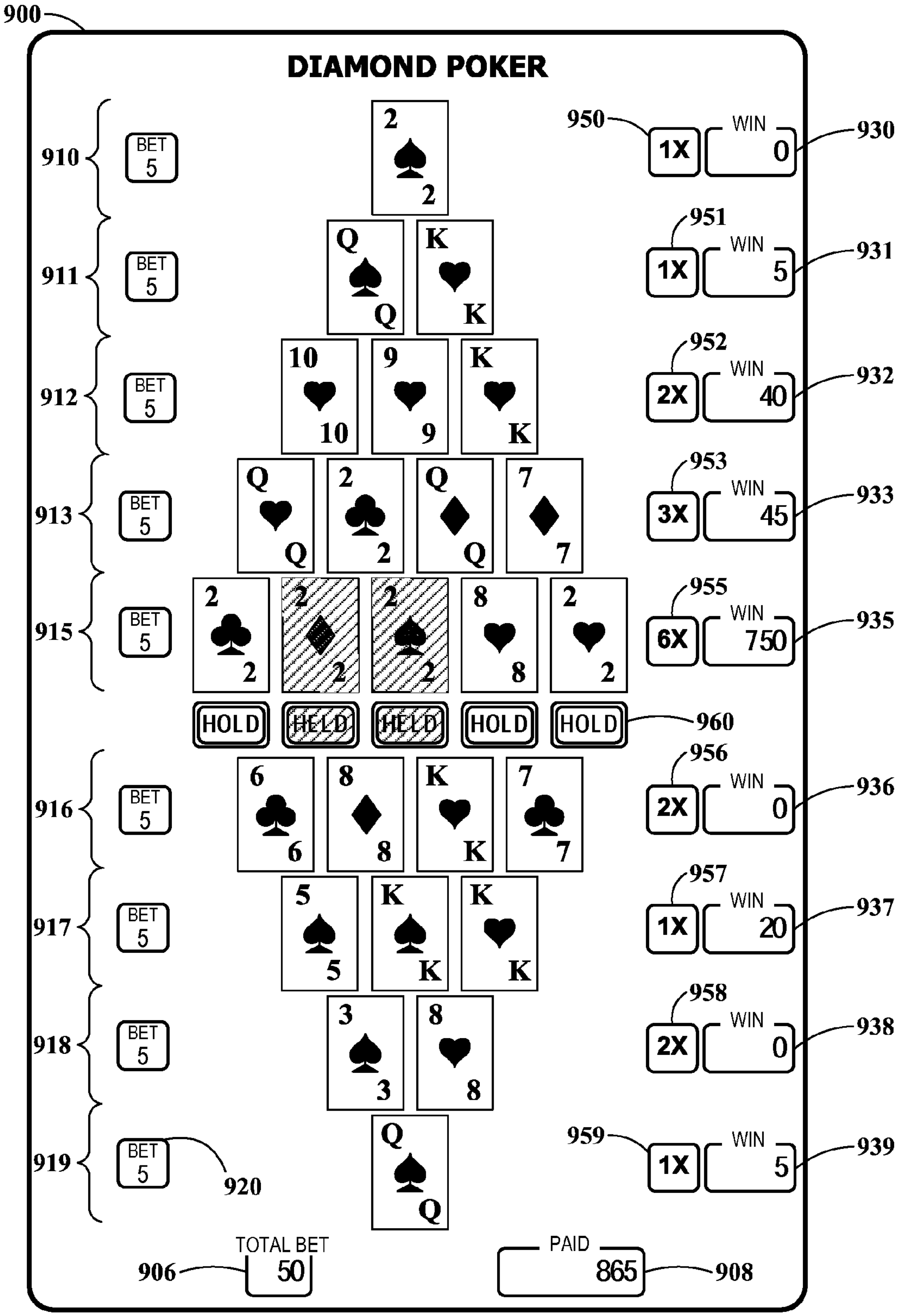

Referring to FIG. 9D, the player held the 2D and 2S and was rewarded on the draw with two additional deuces (2C and 2H) giving the player a four-of-a-kind winning hand at a "6×" game modifying multiplier. The win values of the win indicators 930-939 are then summed up and paid out as a total game award as shown in the total win indicator 908.

Figure 10A:
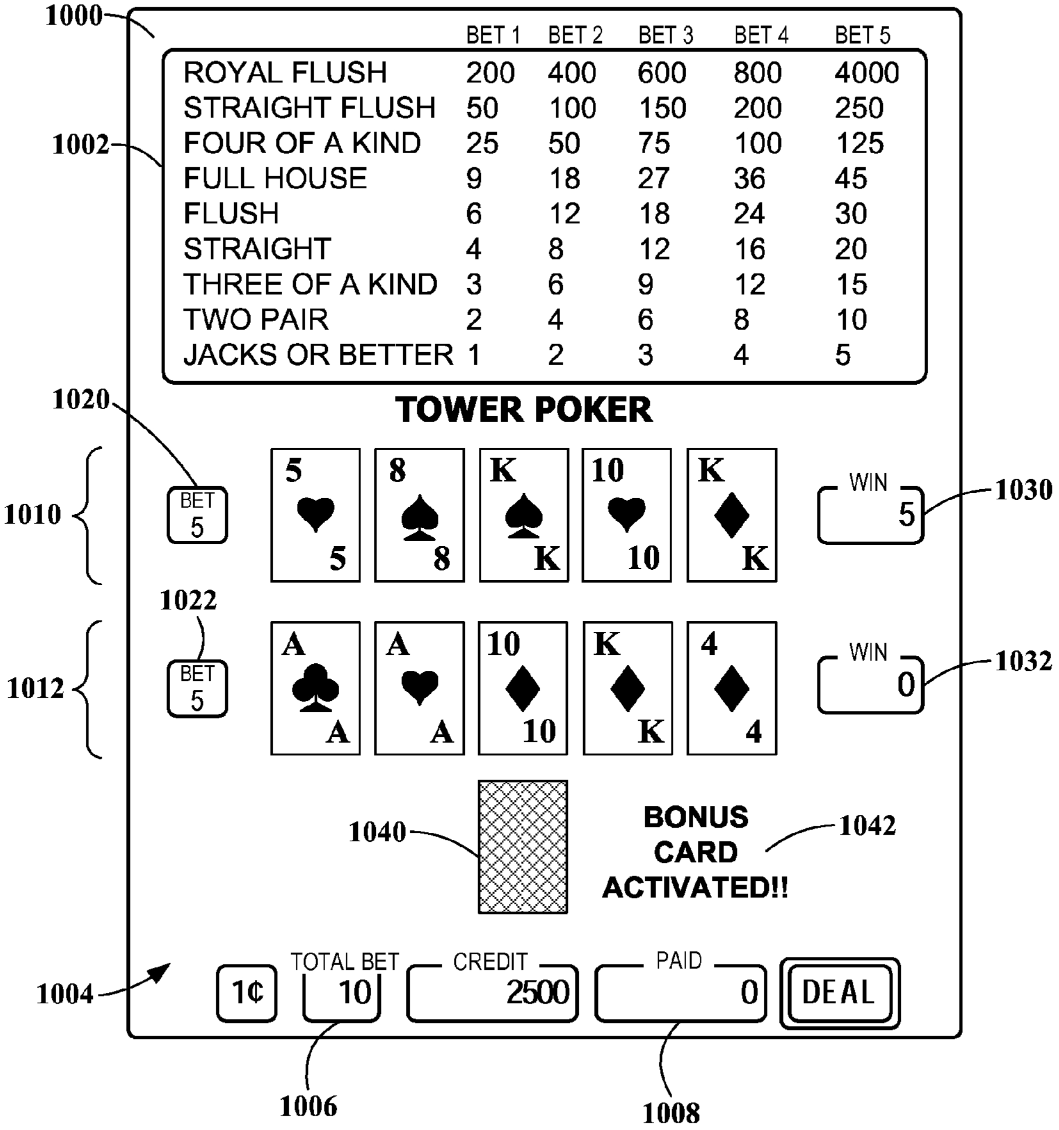
FIGS. 10A and 10B are detail diagrams of a gaming display illustrating another game of chance having a modifier usable between game stages according to embodiments of the invention.
Figure 10B:
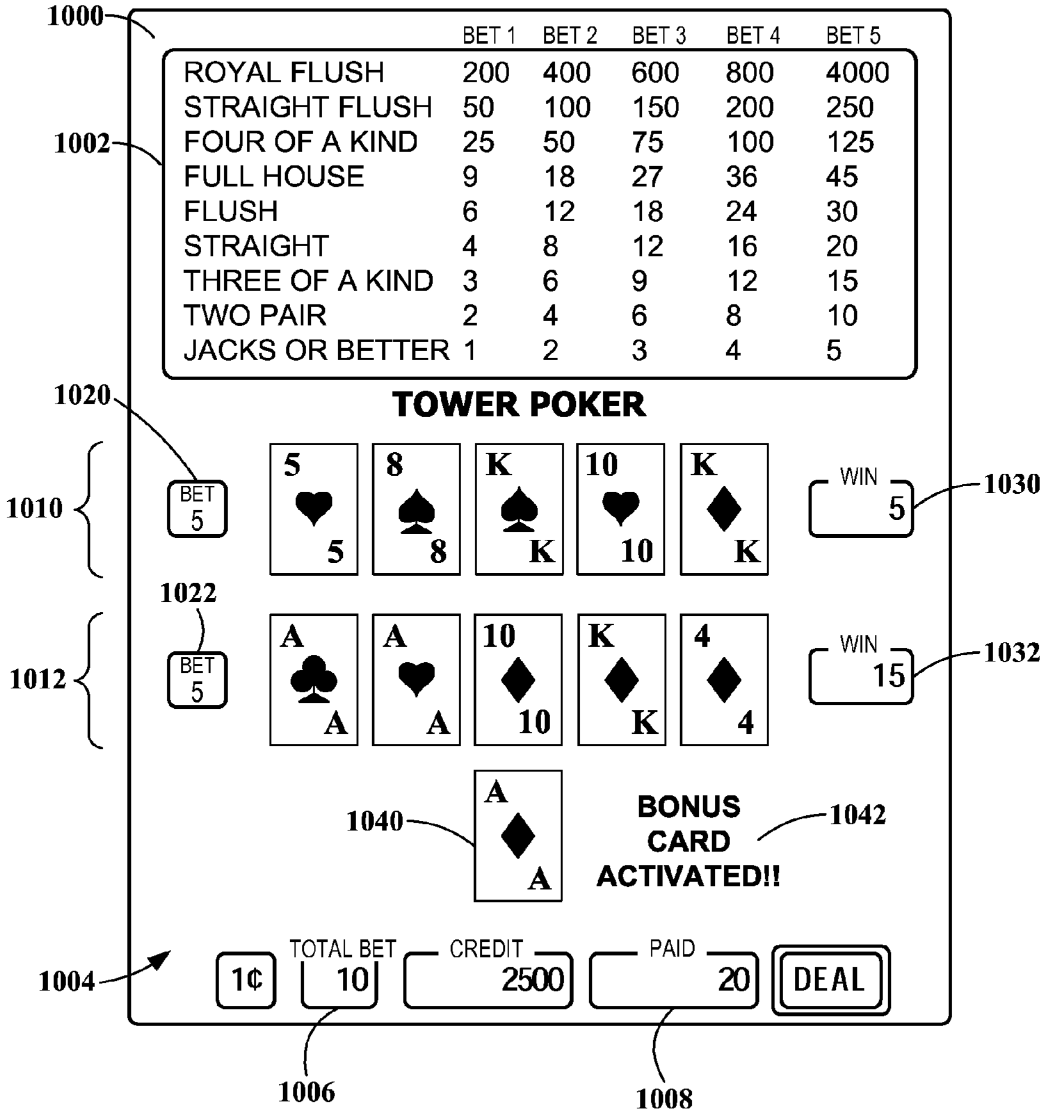

FIGS. 10 A and 10B illustrate another gaming device embodiment that utilizes a game modifier between game stages. As discussed above, the game modifying element that is useable between game stages can take many different forms, such as additional credits, free spins or games, extra game elements or indicia. In the embodiments illustrated in FIGS. 10A and 10B, the game modifier is a bonus card that is can be used in the second hand to potentially improve the result of the second hand when a predefined criterion in the first hand is met.

Referring to FIG. 10A, a gaming display 1000 includes a paytable portion 1002 and a game portion 1004 having multiple game stages 1010, 1012. Here, a first game stage 1010 is associated with a five card stud poker hand. The first game stage 1010 also includes a first wager indicator 1020 and a first win indicator 1030. A second game stage 1012 is associated with another five card stud poker hand, and includes a second wager indicator 1022 and second win indicator 1032. A bonus card 1040 is included below the second game stage 1012 and is activated with the first game stage meets a predefined criterion or trigger condition. In this embodiment, the trigger condition is satisfied if two or more high cards (J, Q, K, or A) are received in the first game stage 1010.

Here, a wager of ten credits is placed on the game as shown by the total wager indicator 1006. The first game stage 1010 results in a pair of Kings (KS and KD) which has an associated pay of five credits. In addition, because the hand of the first game stage 1010 includes two high cards (KS and KD), a game modifying message is shown 1042 and the game modifier bonus card 1040 is activated. The second game stage 1012 has also been revealed in FIG. 10A with a displayed result of AC-AH-10D-KD-4D.

Referring to FIG. 10B, after a short pause, the game modifying bonus card 1040 is revealed to be the AD. As this game modifying card 1040 is used with the cards in the second stage 1012 to form the best five card poker hand, the AD can be used with the AC and AH to form a three-of-a-kind. This three-of-a-kind outcome is associated with a 15 credit pay as shown in the second win indicator 1032. The values on the first win indicator 1030 and second win indicator 1032 are summed and paid to the player as shown on the total win indicator 1008.

As discussed above, the game stages may be played in any order. For example, in some embodiments, a draw poker stage may be played at the bottom of a "tower" or stack of hands first and a game modifier may be moved up to various other stud or draw poker stages above the initial draw poker stage, where game modifiers are altered as play of the game progresses up the tower. In yet other embodiments, game stages do not necessarily need to be played in specific order. For example, a second level of a "tower" or stack of poker hands may be played first, followed by a fifth level, then a third level, then a first level, and finishing with the fourth level. The order of stage play in these embodiments may follow a predetermined path or may be chosen at random. Here, as game stages are completed, they may be evaluated to determine if a predefined criterion or trigger condition has been satisfied, in which case current, subsequent, or previous game modifiers associated with the game stages may be altered.

In yet other embodiments, game stages may be "split" between play of other game stages. That is one or more game stages may be partially played, then allow play of other game stages prior to returning to finish the "split" game stage. FIGS. 11A-11D shows one example game progression of a game with multiple game stages, where a draw poker game stage is split around the play of stud poker game stages. In other embodiments, various other ways of splitting game stages are possible. For example, stud poker game stages may be split by only showing some of the cards in the stud poker hand initially before returning to the stage to reveal the rest of the cards. In slot game embodiments, some of the reels may spin and come to a rest showing results before returning to the stage to stop the other spinning reels.

Figure 11A:
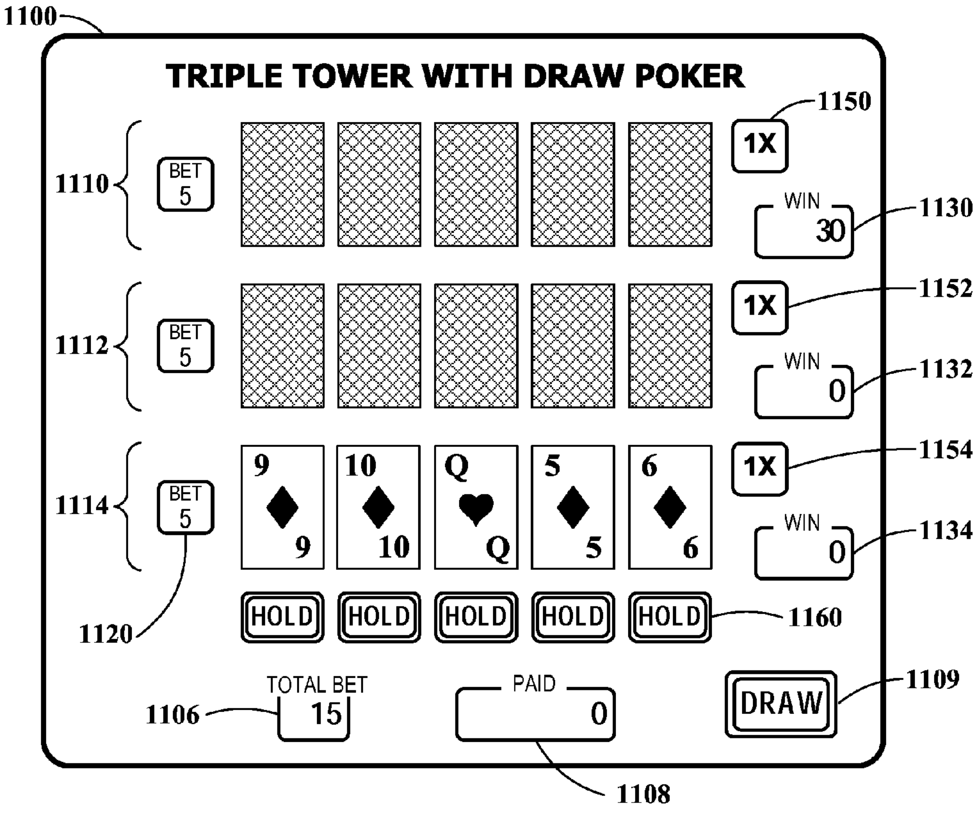
FIGS. 11A, 11B, 11C, and 11D are detail diagrams of a gaming display illustrating a game progression of another game of chance having a modifier usable between game stages according to embodiments of the invention.

Returning to FIGS. 11A-11D, a display 1100 of a gaming device shows a three stage poker game with a draw poker hand played in a bottom stage 1114, and two stud poker hands being played in a top stage 1110 and a middle stage 1112. Referring to FIG. 11A, a game display 1100 is configured to display a wagering game of chance that includes the three game stages 1110, 1112, 1114 discussed above. FIG. 11A shows a point in a wagering game event where a player has placed a wager of 15 credits as shown by the total bet indicator 1106. The total bet has been automatically allocated between the three games stages 1110, 1112, 1114 as shown by the five credit wagers shown in each of the wager indicators 1120.

After the wager has been received and the gaming event initiated, a game modifier is initialized and shown in each of the modifier indicators 1150, 1152, 1154. In this embodiment, game stage multipliers are used as game modifiers and the gaming device sets the game modifier at "1×" at the start of each gaming event. This "1×" is reflected in the three modifier indicators 1150, 1152, 1154 at the start of the gaming event.

As shown in FIG. 4A, instead of revealing the stud poker hand of the first game stage 1110, the game begins by dealing cards to the draw poker hand in the third game stage 1114. This represents the initial dealt hand in the draw poker hand, and is displayed at the third (bottom) game stage 1114 while the cards in the other two game stages 1110, 1112 remain hidden. The resulting dealt hand in the third game stage is 9D-10D-QH-5D-6D.

Figure 11B:
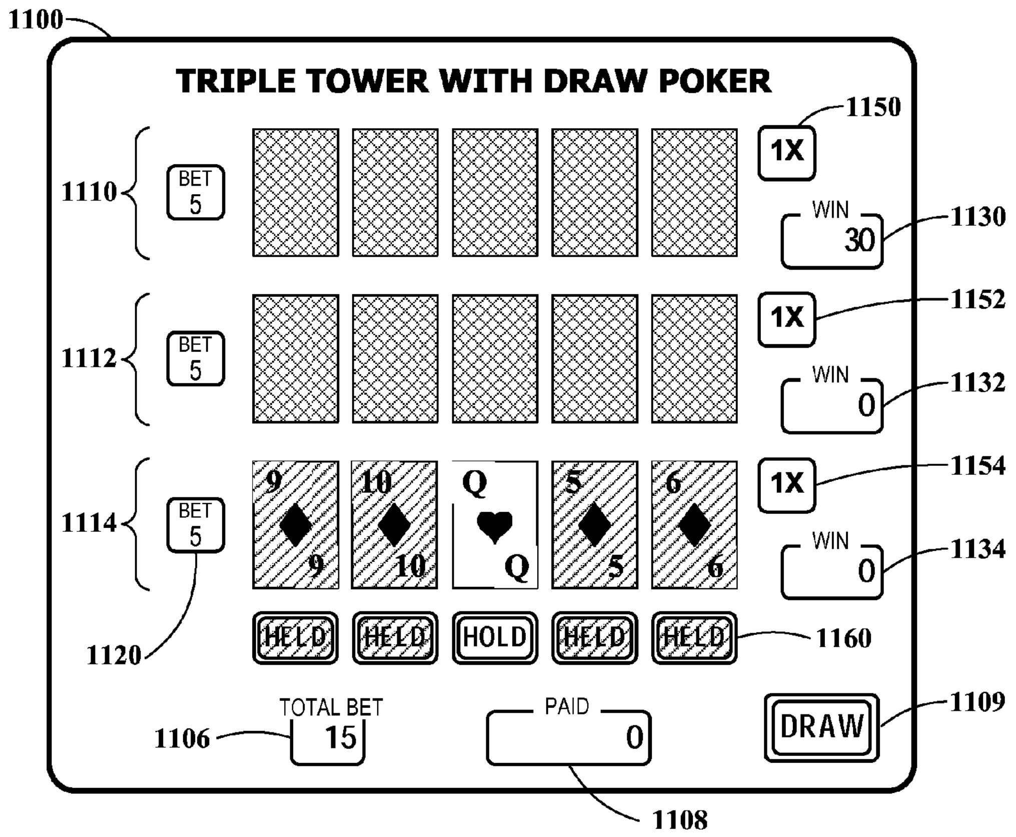

Referring now to FIG. 11B, after the initial draw poker hand is dealt in the third game stage 1114, the player has the opportunity to hold one or more cards of the dealt draw poker hand if they desire using buttons (such as soft buttons 1160) or other means to identify cards that they want to hold. As shown in FIG. 11B, the player has held the 9D-10D-5D-6D in hopes of drawing another diamond card to complete a flush hand. After the player has decided which cards, if any, to hold, the player can press the DEAL/DRAW button 1109 or other player input device to continue the game.

Figure 11C:
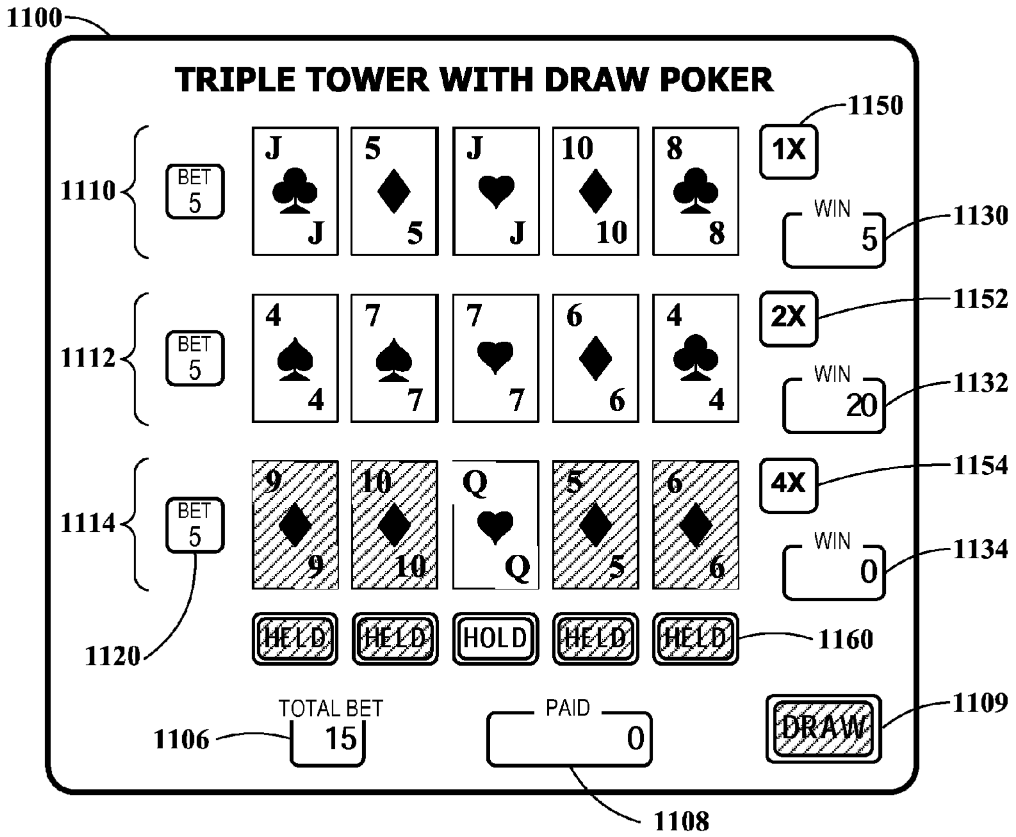

Referring to FIG. 11C, the player has pressed the DEAL/DRAW button 1109 or otherwise caused the game to progress. Instead of immediately revealing the result of the draw, however, these embodiments split this third game stage 1114 by leaving the non-held cards displayed, if any, and continuing to game play of other game stages. One reason for ordering games with a split stage is to allow a player to interact with a game, but preserve the evaluation of the bottom (or other final) game stage until a game modifier has had a chance to increase with the other game stages. As shown in FIG. 11C, the non-held QH in the third game stage 1114 is still shown, and the first and second game stages have been played. As shown, the first game stage has resulted in a pair of Jacks.

The award associated with a five credit wager for a high pair is 5 credits, which is multiplied by the game modifier indicated in the first modifier indicator 1150. The result is then displayed in the first win indicator 1130. Additionally, because the poker hand in the first stage 1110 resulted in a win (i.e., met a predefined criterion or trigger condition), subsequent game modifiers are altered. Here, as shown, the second modifier indicator 1152 was incremented from "1×" to "2×." As discussed above, many different variations of altering the modifiers can be used in other embodiments. Further, if the game modifier is always initialized to "1×," the first modifier indicator 1130 associated with the first game stage 1110 may be omitted.

The second game stage 1112 has also been played as shown in FIG. 11C. The stud poker hand in the second game stage 1112 has resulted in two pair (4S-4C and 7S-7H). The award associated with a five credit wager for two pair is 10 credits, which is multiplied by the game modifier indicated in the second modifier indicator 1152. The result is then displayed in the second win indicator 1132. Here, because the game modifier was a "2×", the 10 credit win is doubled to 20 credits. Additionally, because the poker hand in the second stage 1112 resulted in a win (i.e., met a predefined criterion or trigger condition), subsequent game modifiers are altered. Here, as shown, the third modifier indicator 1154 was increased to "4×."

Figure 11D:
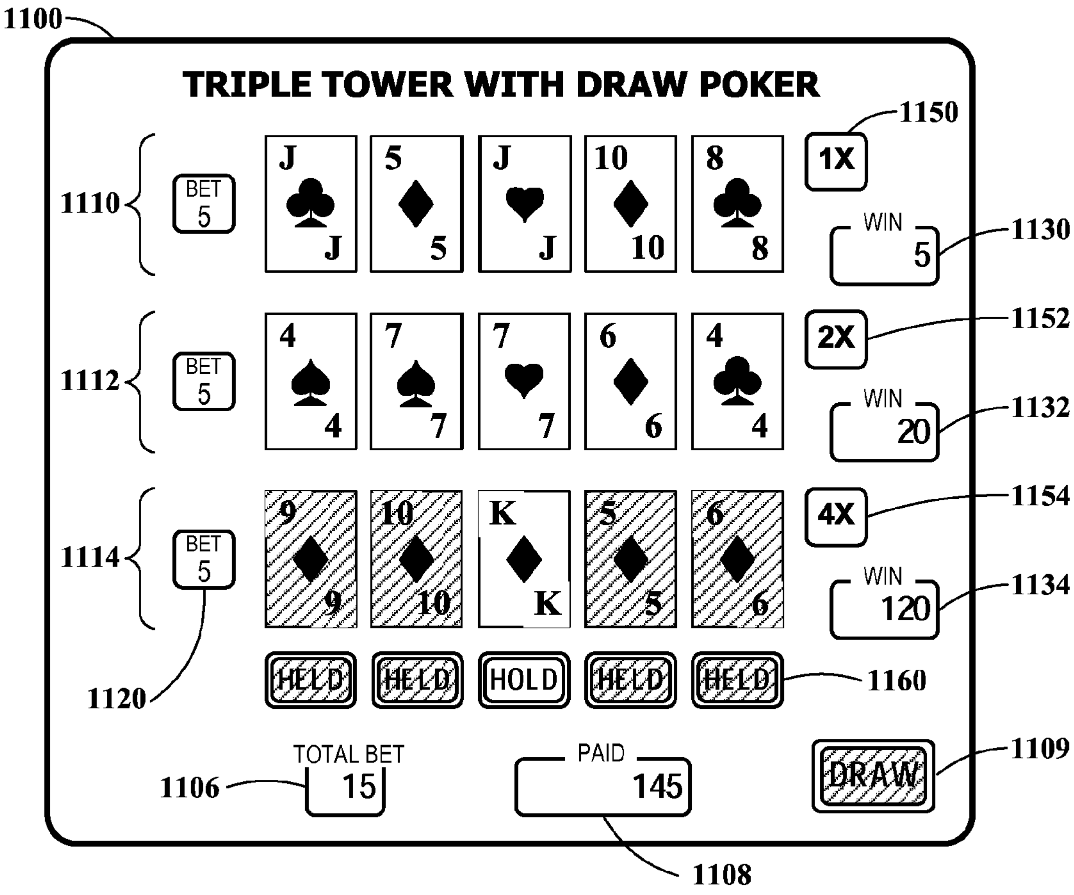

Referring to FIG. 11D, after the second stage hand 1112 is played, the result from the draw in the third stage 1114 is carried out. In some embodiments, the player may be required to activate an input device to see the draw. In other embodiments, the draw in the third stage 1114 may occur automatically after the result from the second stage 1112 is shown. This draw may be shown after a predetermined amount of time so that the player has a chance to see the game modifier amount shown in the third modifier indicator 1154 before the draw. In some embodiments, this predetermined amount of time may be based on the possible outcome of the draw or the amount of the game modifier shown in the third modifier indicator 1154. For example, a larger game modifier value, or the chance for a high final poker hand may trigger a longer hold time to allow for more player anticipation versus a small game modifier value, or a dealt hand with little chance of a high final poker hand.

As shown in FIG. 11D, the draw in the third stage 1114 (the second part of the split in the third stage) results in a KD being drawn which completes the diamond flush that the player was likely hoping for as the final hand for the draw poker game in the third stage. The award associated with a five credit wager for a flush is 30 credits, which is multiplied by the game modifier indicated in the third modifier indicator 1154. The result is then displayed in the third win indicator 1134. Here, because the game modifier was a "4×", the 30 credit win is increased to 120 credits. As all of the stages of this embodiment are now complete, the wins from the first stage 1110, the second stage 1112, and the third stage 1114 are summed and awarded to the player. Here, the values in the first, second, and third win indicators 1130, 1132, 1134 are summed to a total of 145 credits, which is shown in the total award indicator 1108.

Figure 12A:
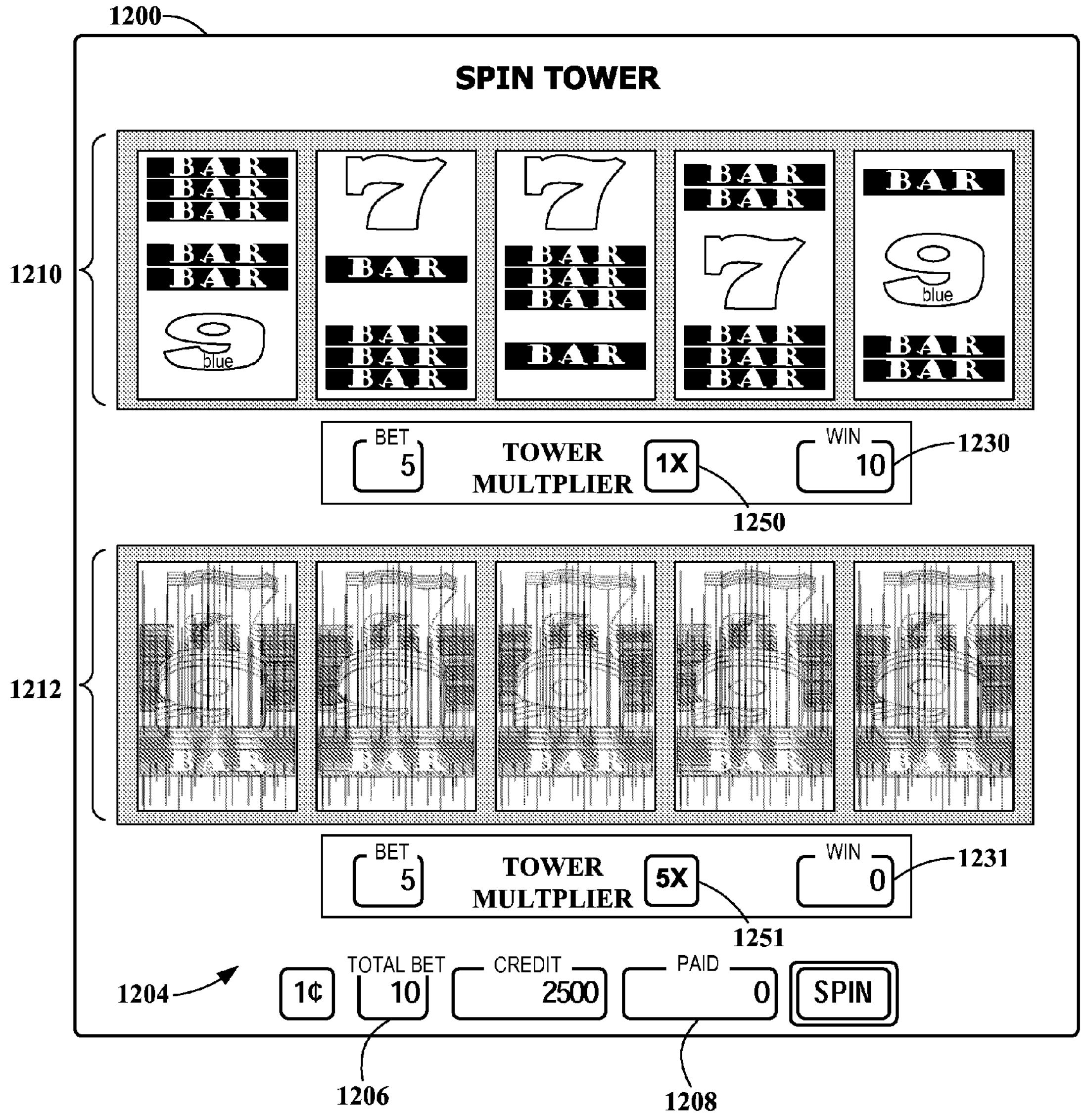
FIGS. 12A and 12B are detail diagrams of a gaming display illustrating another game of chance having a modifier usable between game stages according to embodiments of the invention.
Figure 12B:
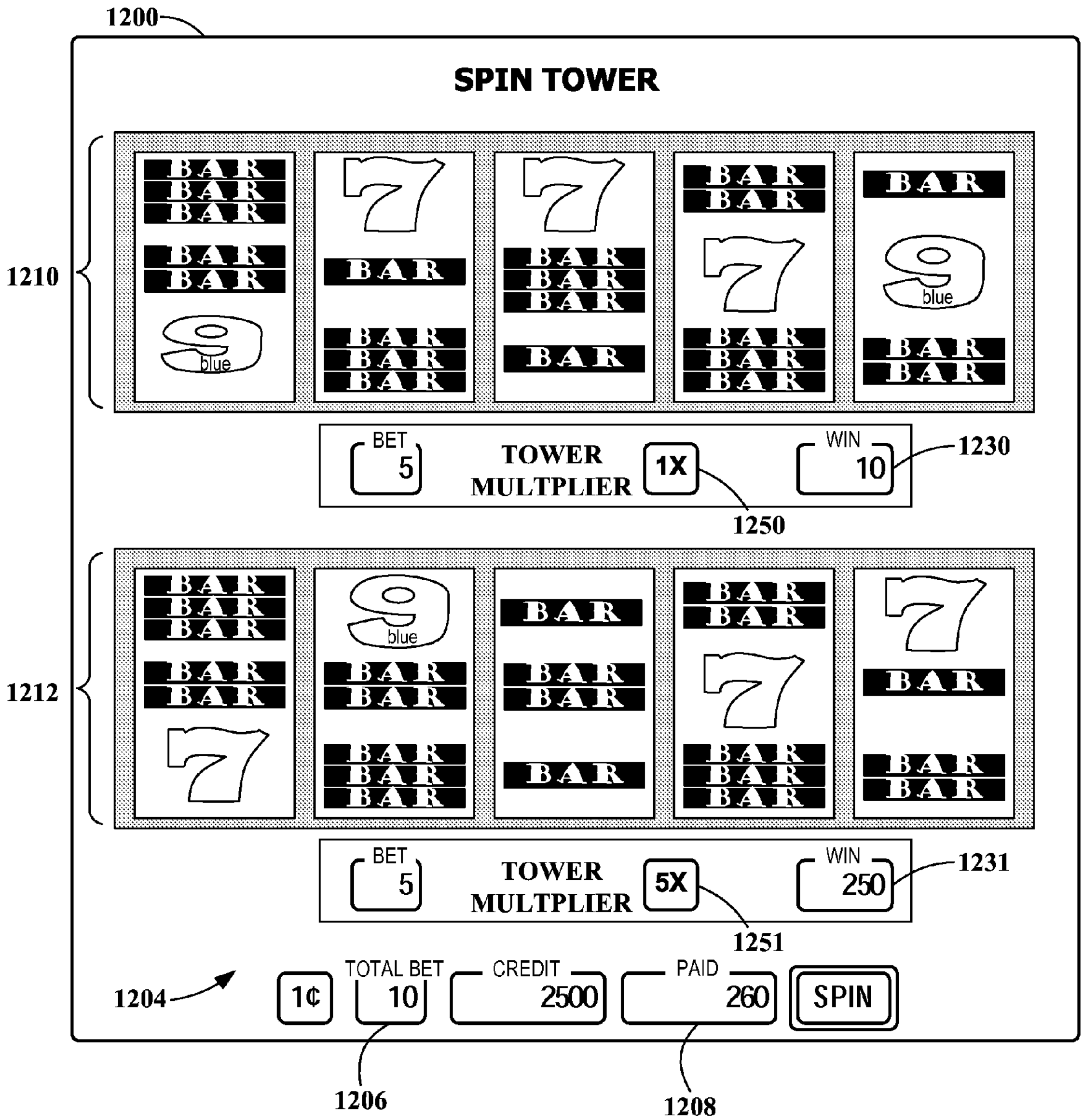

FIGS. 12A and 12B illustrate additional embodiments of gaming device having a game modifying usable between game stages. In particular, the embodiments shown in FIGS. 12A and 12B include a spinning reel slot embodiment of a multi-stage game having a game modifier. Referring to FIG. 12A, a gaming display 1200 includes a game portion 1204 having a first game stage 1210 of a five-reel spinning reel slot machine, and a second game stage 1212 of a five-reel spinning slot machine. Although some spinning reel embodiments may have multiple sets of spinning reels (e.g., one set of spinning reels for each game stage), other embodiments may only have a single set of spinning reels and use multiple spins of the reels for each game stage. Here, a bet of ten credits has been placed on the game as shown by the total wager indicator 1206.

As shown in FIG. 12A, a first game modifier 1250 has been initialized to "1×" and the reels of the first stage 1210 have been spun to show a game outcome of Any Bar-Any Bar-Any Bar-X-X, which as an award value of ten credits as shown in the first win indicator 1230. As the first game stage 1210 met a predefined criterion or trigger condition (here, resulting in a winning outcome), the game modifier 1251 associated with the second stage 1212 is altered to "5×." The reels in the second stage 1212 are currently being spun in FIG. 12A.

Referring to FIG. 12B, the reels of the second stage 1212 have come to rest to show an outcome of Double Bar-Double Bar-Double Bar-X-X, which is associated with an award of 50 credits. However, since the game modifying multiplier 1251 has been increased to "5×" for the second game stage 1212, the award is increased to 250 credits as shown on the second win indicator 1231. The wins from the first and second stage 1210, 1212 are then summed and the resulting total is paid to the player as shown on the total win indicator 1208.

Figure 13:
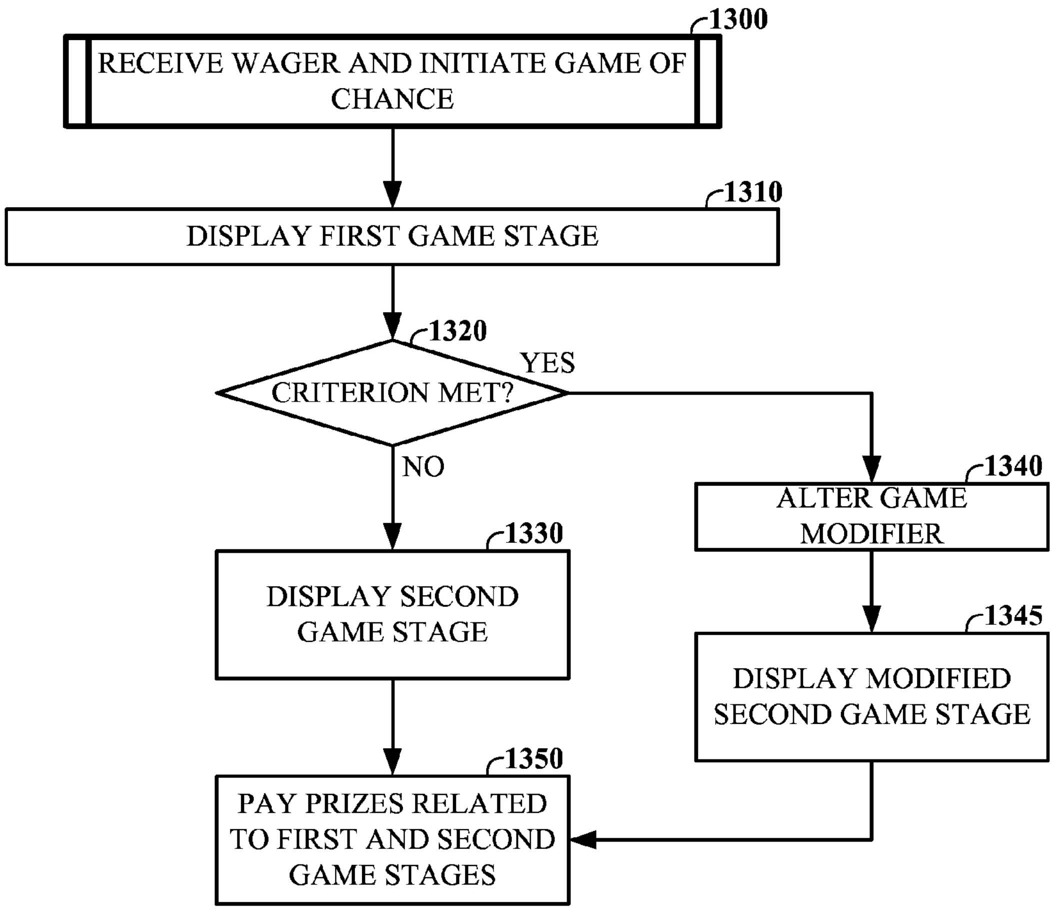
FIG. 13 is a flow diagram of a method of operating a gaming device according to embodiments of the invention.
Figure 14:
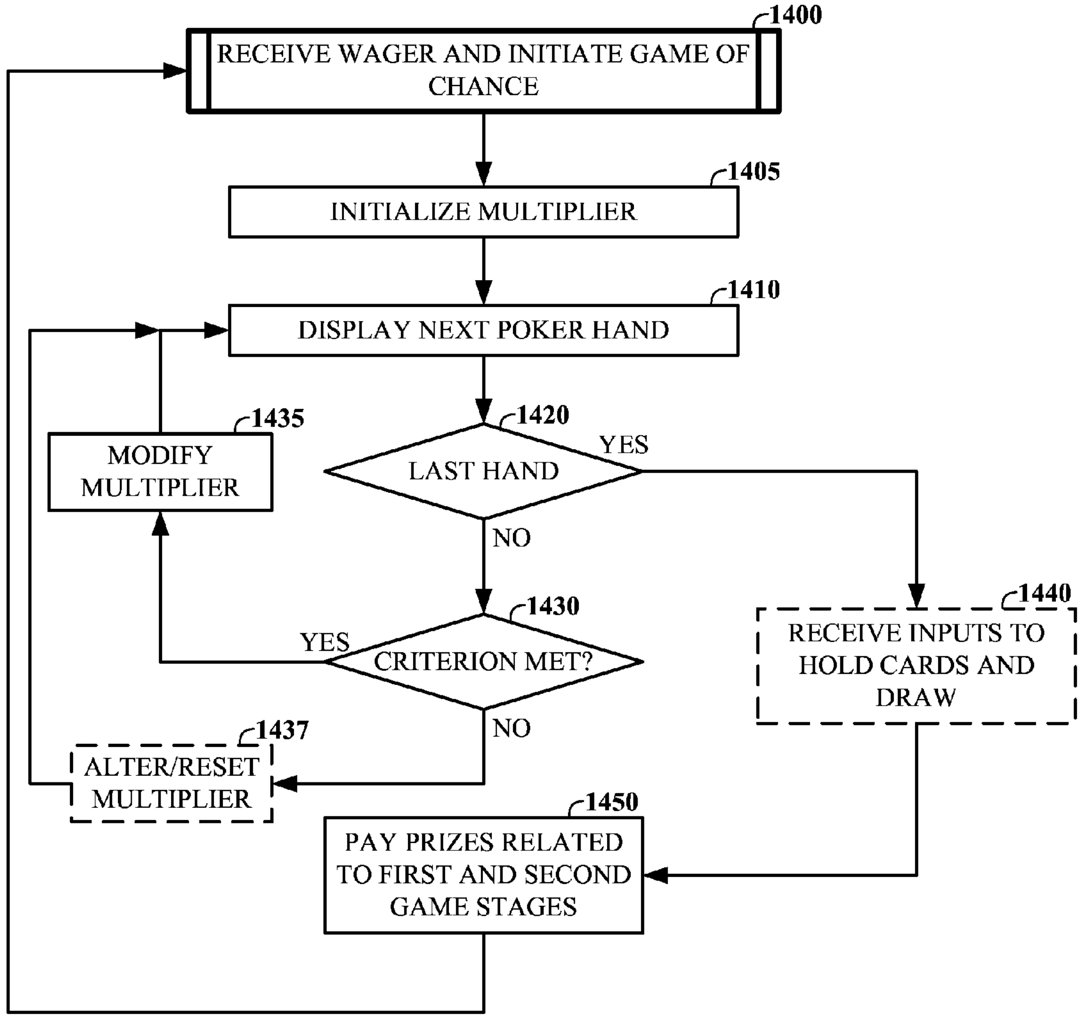
FIG. 14 is a flow diagram of another method of operating a gaming device according to embodiments of the invention.
Figure 15:
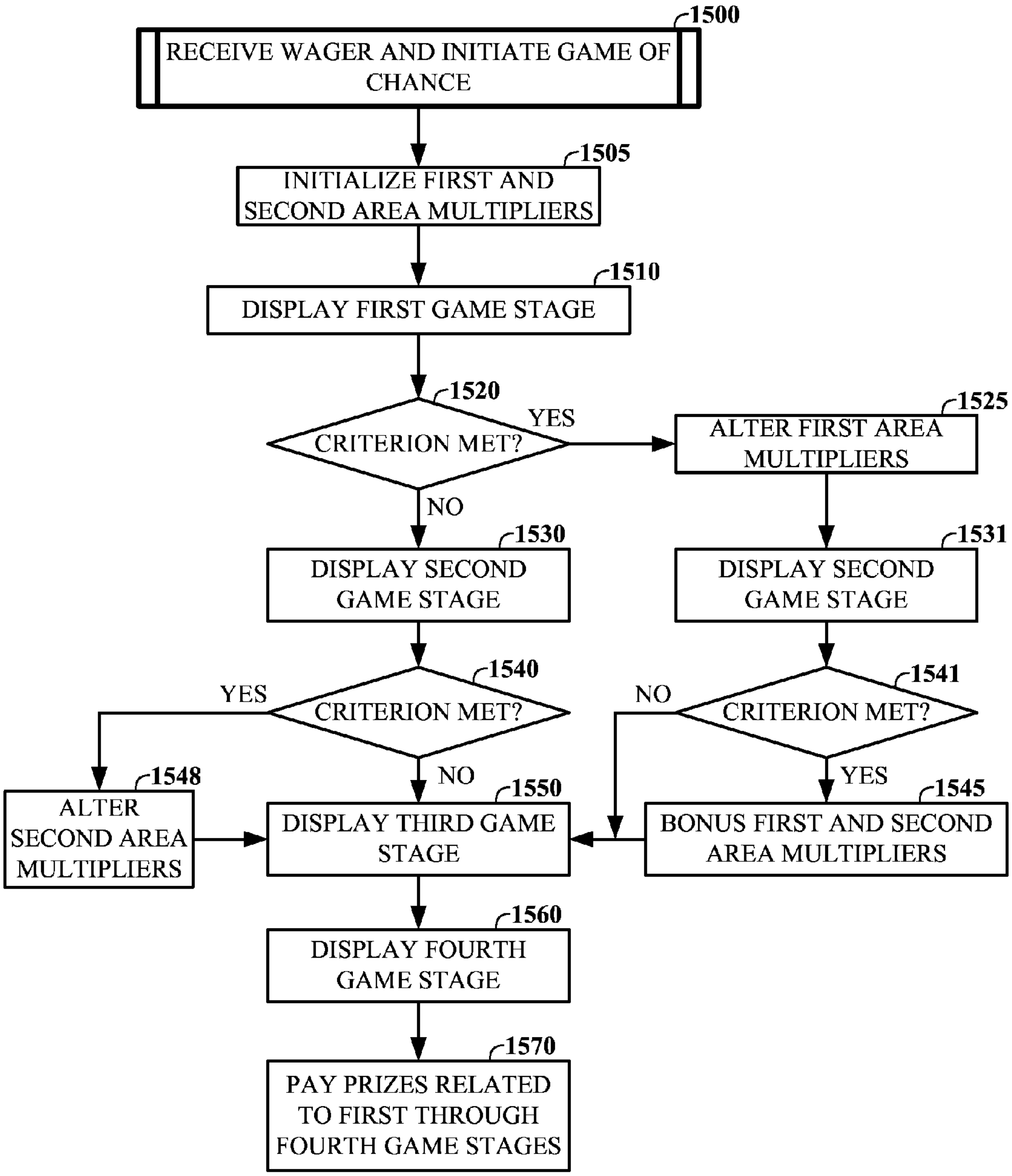
FIG. 15 is a flow diagram of yet another method of operating a gaming device according to embodiments of the invention.

FIGS. 13-15 are flow diagrams that illustrate methods of operating a gaming device to implement games of chance having multiple game stages and a game modifier that is usable between the game stages. Although processes are shown in a particular order in FIGS. 13-15, these processes may be arranged in different orders in other embodiments. Further, additional steps or processes may be performed between the illustrated steps. These processes may be carried out by the computer arrangement 1600 shown in FIG. 16 below, or in other gaming devices known in the art.

Referring to FIG. 13, a method of operating a gaming device includes receiving a wager and initiating a game of chance in process 1300. This process 1300 may include determining a wager amount specified by a player/user and allocating that wager between stages in a multi-stage game. For example, in a five stage game, a wager of 10 credits may be allocated so that two credits are wagered on each of the five game stages. In process 1310, a first game stage is displayed. Here, a first poker hand may be displayed, reels may be spun to a first outcome, or other games of chance are implemented to show a game result for the first game stage.

The gaming device then determines if a criterion has been met, or a trigger condition has been satisfied. As discussed above, this criterion or trigger condition may include determining if the game result of the first game stage is associated with an award or prize. If the criterion is not met, a second game stage is displayed in process 1330, and prizes related to the first and second game stages are paid in process 1350. Although only two game stages are referenced in FIG. 13, additional game stages or areas may be present.

Returning to process 1320, if the criterion or trigger condition is satisfied, the flow proceeds to process 1340, where a game modifier is altered. As discussed above, altering a game modifier can take many forms, such as incrementing a multiplier, providing an additional card in a poker hand, allowing an extra free spin, etc. A modified second game stage is then displayed in process 1345, where the second game stage is modified by the altered game modifier from process 1340. After the modified second game stage is shown in process 1345, the flow proceeds to process 1350 where prizes related to the first and second game stage are paid to the player.

FIG. 14 illustrates another method of operating a gaming device according to embodiments of the invention. The method illustrated in FIG. 14 refers to poker hands as game stages and a stage multiplier as a game modifier. However, the processes described in FIG. 14 may be applied to a variety of embodiments having different types of games in the multiple game stages and/or different types of game modifiers. Referring to FIG. 14, a flow begins at process 1400 where a wager is received and a game of chance is initiated. This process 1400 may be similar to process 1300 discussed above with regard to FIG. 13. In process 1405, a stage multiplier is initialized. This process 1405 may include setting the stage multiplier to "1×" for each of the game stages, although other initialization procedures may be implemented in other embodiments.

A next poker hand is displayed in process 1410. If the flow is proceeding from process 1405, a first poker hand or stage is displayed in process 1410. In process 1420, it is determined if the poker hand being displayed is the last hand or stage in a multi-stage game. If it is determined that the current stage or hand is not the last hand in process 1420, the flow moves to process 1430 where it is determined if a criterion or trigger condition has been satisfied by the poker hand displayed in process 1410. As discussed above, this triggering condition may include determining if the poker hand in process 1410 is associated with an award or threshold value, or if a particular card is displayed in the poker hand, etc. If the criterion or trigger condition has been met as determined in process 1430, the flow proceeds to process 1435 where a stage multiplier is modified. As discussed above, the modified multiplier may be applied to all subsequent game stages, or to only a next game stage. Further, this modification may include incrementing the multiplier, summing the multiplier with a fixed or variable number, multiplying the multiplier by a fixed or variable number, etc. The flow then proceeds to process 1410 where a next poker hand is displayed in a subsequent game stage.

Returning to process 1430, if the criterion or trigger condition is not met, the flow proceeds to optional process 1437. Process 1437 is optional since in some embodiments, if the criterion is not met, the multiplier is simply maintained in the next game stage, and the flow proceeds back to process 1410 where the next poker hand is displayed. However, in other embodiments, process 1437 may alter or reset the multiplier. For example, the multiplier may be altered by decrementing it, dividing it by a fixed or variable number, randomly choosing another multiplier value, etc. Alternatively, the multiplier may be reset to an initial value or to some other random or predefined "reset value" in process 1437. After process 1437 is completed, the flow returns to process 1410 where the next poker hand (next game stage) is displayed.

Returning to process 1420, if it is determined that the displayed poker hand is the last hand or game stage in the wagering game event, the flow moves to optional process 1440 to request and receive player inputs to hold and draw cards. Process 1440 represents embodiments where the final poker hand or stage is a draw poker stage. Hence, if the final poker hand is a stud poker hand, process 1440 is not needed. In other embodiments, every game stage may be draw poker hands, where player interaction is solicited in each game stage. In these embodiments, another process (not shown) may be included in the flow between processes 1420 and 1430 to request and receive inputs to hold and draw cards. After optional process 1440, the flow proceeds to paying prizes related to the multiple game stages in process 1450. Additional game events may take place where the flow returns to process 1400 when another wager is received and game initiated.

FIG. 15 illustrates another example method of operating a gaming device according to embodiments of the invention. The method illustrated in FIG. 15 includes multiple game areas each having multiple game stages and game modifiers that are associated with each game area. Although the game modifiers are described as multipliers in this embodiment, various other game modifiers may be used in other embodiments. Referring to FIG. 15, a flow begins a flow begins at process 1500 where a wager is received and a game of chance is initiated. This process 1500 may again be similar to process 1300 discussed above with regard to FIG. 13. In process 1505, a first area multiplier and a second area multiplier are initialized. This initialization process may include setting the multiplier to a predefined number such as "1×" or may include randomly choosing an initial value for the multiplier.

In process 1510 a first game stage is displayed. For example, a first stud poker hand may be selected from a first deck of cards and displayed in the first game area. In process 1520, it is determined if a criterion or trigger condition is satisfied for the first game stage. In the above example, the trigger condition may include the poker hand in the first game stage being associated with an award, or the poker hand in the first game stage including an Ace of any suit. If the criterion is satisfied, the flow progresses to process 1525 where the first area multiplier is altered. Here, the first stage multiplier may be incremented, randomly increased, summed with a determined value, multiplied by a determined value, or otherwise altered. If the criterion is not satisfied in process 1520, the flow proceeds instead to process 1530 where a second game stage is displayed. Similarly, if the criterion had been satisfied in process 1520, the flow would proceed from process 1525 to process 1531 where a second game stage is displayed. Processes 1530 and 1531 may be similar processes except that in process 1531 any awards associated with the second game stage would be multiplied by the altered first area multiplier rather than the initialized value of the first area multiplier.

From processes 1530, the flow proceeds to process 1540 where it is determined if the second game stage has satisfied a criterion or trigger condition. Note that in these embodiments, the first and third game stages are included in the first game area, and the second and fourth game stages may be included in the second game area. This may be similar to the embodiments shown in FIGS. 6A-6D and 7. If the criterion is satisfied in process 1540, the flow progresses to process 1548 where the second area multiplier is altered. The second area multiplier may be altered in a similar manner to how the first game multiplier is altered, or may be altered in a different manner depending on the embodiment. After the second area multiplier is altered in process 1548, the flow progresses to process 1550 where the third game stage is displayed. Returning to process 1540, if the criterion is determined to not have been satisfied, the flow progresses to process 1550, where the third game stage is displayed.

Returning to process 1531, the flow in this section of the method progresses from the display of the second game stage to process 1541 where it is determined if a criterion or trigger condition is satisfied for the second game stage. If the criterion is not satisfied, the flow proceeds directly to process 1550 where the third game stage is displayed. However, if the criterion is satisfied in process 1541, the flow progresses to process 1545 where the first and second area multipliers are bonused. Here, because both the first and second game stages satisfied trigger conditions, the first and second area multipliers are bonused or increased beyond how they would normally be altered in processes 1525 or 1548. For example, each of the first and second area multipliers may be doubled, or increased by a predefined or randomly chosen number. Process 1545 may also include altering the second area multiplier based on the satisfied condition prior to providing the extra bonusing of the area multiplier values. For example, if each area multiplier was incremented by one when a game stage satisfied a criterion and each area multiplier was doubled if both criterions were satisfied for consecutive game stages (or parallel game stages in the double tower embodiments shown in FIGS. 6A-6D and 7), then the second area multiplier may be increased from "1×" to "2×" and then doubled to "4×" in process 1545. After the first and second multipliers have been bonused in process 1545, the flow proceeds to process 1550 where a third game stage is displayed.

As mentioned above, the first and third game stages are included in the first game area and the second and fourth game stages are included in the second game area in this embodiment. Thus, displaying the third game stage in process 1550 may include multiplying any award associated with the third stage game outcome by the first area multiplier. A fourth game stage is then displayed in process 1560. Similarly, awards associated with the game outcome of the fourth game stage may be multiplied by the second area multiplier. The flow then proceeds to process 1570, where prizes associated with the first, second, third, and fourth game stages are paid to the player.

Figure 16:
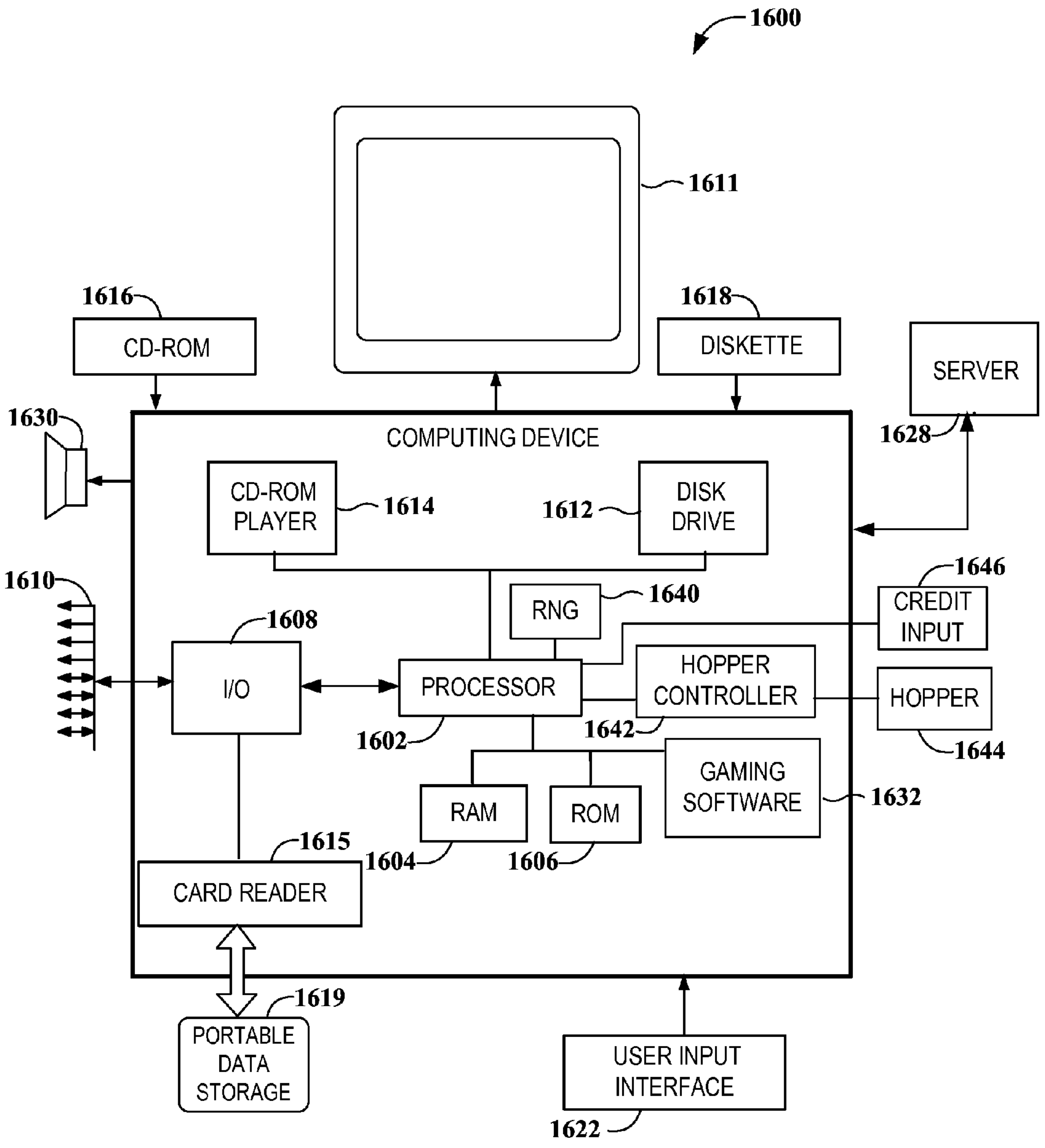
FIG. 16 is a block diagram illustrating a computing arrangement according to embodiments of the invention.

As may now be readily understood, one or more devices may be programmed to play various embodiments of the invention. The present invention may be implemented as a casino gaming machine or other special purpose gaming kiosk as described hereinabove, or may be implemented via computing systems operating under the direction of local gaming software, and/or remotely-provided software such as provided by an application service provider (ASP). The casino gaming machines utilize computing systems to control and manage the gaming activity. An example of a representative computing system capable of carrying out operations in accordance with the invention is illustrated in FIG. 16.

Hardware, firmware, software or a combination thereof may be used to perform the various gaming functions, display presentations, and operations described herein. The functional modules used in connection with the invention may reside in a gaming device as described, or may alternatively reside on a stand-alone or networked computer. The computing structure 1600 of FIG. 16 is an example computing structure that can be used in connection with such electronic gaming machines, computers, or other computer-implemented devices to carry out operations of the present invention.

The example computing arrangement 1600 suitable for performing the gaming functions in accordance with the present invention typically includes a central processor (CPU) 1602 coupled to random access memory (RAM) 1604 and some variation of read-only memory (ROM) 1606. The ROM 1606 may also represent other types of storage media to store programs, such as programmable ROM (PROM), erasable PROM (EPROM), etc. The processor 1602 may communicate with other internal and external components through input/output (I/O) circuitry 1608 and bussing 1610, to provide control signals, communication signals, and the like.

The computing arrangement 1600 may also include one or more data storage devices, including hard and floppy disk drives 1612, CD-ROM drives 1614, card reader 1615, and other hardware capable of reading and/or storing information such as DVD, etc. In one embodiment, software for carrying out the operations in accordance with the present invention may be stored and distributed on a CD-ROM 1616, diskette 1618, access card 1619, or other form of computer readable media capable of portably storing information. These storage media may be inserted into, and read by, devices such as the CD-ROM drive 1614, the disk drive 1612, card reader 1615, etc. The software may also be transmitted to the computing arrangement 1600 via data signals, such as being downloaded electronically via a network, such as the Internet. Further, as previously described, the software for carrying out the functions associated with the present invention may alternatively be stored in internal memory/storage of the computing device 1600, such as in the ROM 1606.

The computing arrangement 1600 is coupled to the display 1611, which represents a display on which the gaming activities in accordance with the invention are presented. The display 1611 represents the "presentation" of the video information in accordance with the invention, and may be any type of known display or presentation screen, such as liquid crystal displays (LCD), plasma displays, cathode ray tubes (CRT), digital light processing (DLP) displays, liquid crystal on silicon (LCOS) displays, etc.

Where the computing device 1600 represents a stand-alone or networked computer, the display 1611 may represent a standard computer terminal or display capable of displaying multiple windows, frames, etc. Where the computing device is embedded within an electronic gaming machine, the display 1611 corresponds to the display screen of the gaming machine/kiosk. A user input interface 1622 such as a mouse, keyboard/keypad, microphone, touch pad, trackball, joystick, touch screen, voice-recognition system, etc. may be provided. The display 1611 may also act as a user input device, e.g., where the display 1611 is a touchscreen device.

Chance-based gaming systems such as slot machines, in which the present invention is applicable, are governed by random numbers and processors, as facilitated by a random number generator (RNG). The fixed and dynamic symbols generated as part of a gaming activity may be produced using one or more RNGs. RNGs, as known in the art, may be implemented using hardware, software operable in connection with the processor 1602, or some combination of hardware and software. The present invention is operable using any known RNG, and may be integrally programmed as part of the processor 1602 operation, or alternatively may be a separate RNG controller 1640.

The computing arrangement 1600 may be connected to other computing devices or gaming machines, such as via a network. The computing arrangement 1600 may be connected to a network server 1628 in an intranet or local network configuration. The computer may further be part of a larger network configuration as in a global area network (GAN) such as the Internet. In such a case, the computer may have access to one or more web servers via the Internet. In other arrangements, the computing arrangement 1600 may be configured as an Internet server and software for carrying out the operations in accordance with the present invention may interact with the player via one or more networks.

Other components directed to gaming machine implementations include manners of gaming participant payment, and gaming machine payout. For example, a gaming machine including the computing arrangement 1600 may also include a hopper controller 1642 to determine the amount of payout to be provided to the participant. The hopper controller may be integrally implemented with the processor 1602, or alternatively as a separate hopper controller 1642. A hopper 1644 may also be provided in gaming machine embodiments, where the hopper serves as the mechanism holding the coins/tokens of the machine. The wager input module 1646 represents any mechanism for accepting coins, tokens, coupons, bills, electronic fund transfer (EFT), tickets, credit cards, smart cards, membership cards, etc., for which a participant inputs a wager amount. It will be appreciated that the primary gaming software 1632 may be able to control payouts via the hopper 1644 and controller 1642 for independently determined payout events.

Among other functions, the computing arrangement 1600 provides an interactive experience to players via input interface 1622 and output devices, such as the display 1611, speaker 1630, etc. These experiences are generally controlled by gaming software 1632 that controls a primary gaming activity of the computing arrangement 1600. The gaming software 1632 may be temporarily loaded into RAM 1604, and may be stored locally using any combination of ROM 1606, drives 1612, media player 1614, or other computer-readable storage media known in the art. The primary gaming software 1632 may also be accessed remotely, such as via the server 1628 or the Internet.

The primary gaming software 1632 in the computing arrangement 1600 is shown here as an application software module. According to embodiments of the present invention, this software 1632 provides a card game or similar game of chance as described hereinabove. For example, the software 1632 may present, by way of the display 1611, representations of playing cards or other symbols to map these indicia of these cards or symbols to multi-positional game elements. One or more aligned positions of these game elements may be evaluated to determine awards based on a paytable. The software 1632 may include instructions to provide other functionality as known in the art and described herein, such as shown and described above regarding FIGS. 1-15 or below regarding FIGS. 17A-22H.

Many of the above embodiments describe game methods and apparatuses that utilize game modifiers between game stages in a single game or game round. Additional embodiments are described below that use game modifiers between games for multi-stage games of chance. As discussed above, the “Ultimate X” Poker concept described in the ’305 application discloses a poker game that uses winning hands in a multi-hand poker game to alter a multiplier for the same ordered hand in a next round of poker games. That is, for example, in a three hand multi-hand poker game, if the second hand results in a winning hand, a corresponding multiplier for a second hand in the next poker game is changed. The disclosure in the ’305 application is, however, limited in that only multi-hand poker games are disclosed and only multipliers that are tied to corresponding winning hand levels are increased. Thus, any multiplier benefits in the ’305 application are lost with one unlucky game, and each of the hands in the multi-hand game is tied to an initially dealt hand.

In contrast to the disclosure in the ’305 application, embodiments described below are directed to game modifiers that are usable between games and game stages within each game. One such embodiment is described in conjunction with FIGS. 17A-17G.

Figure 17A:
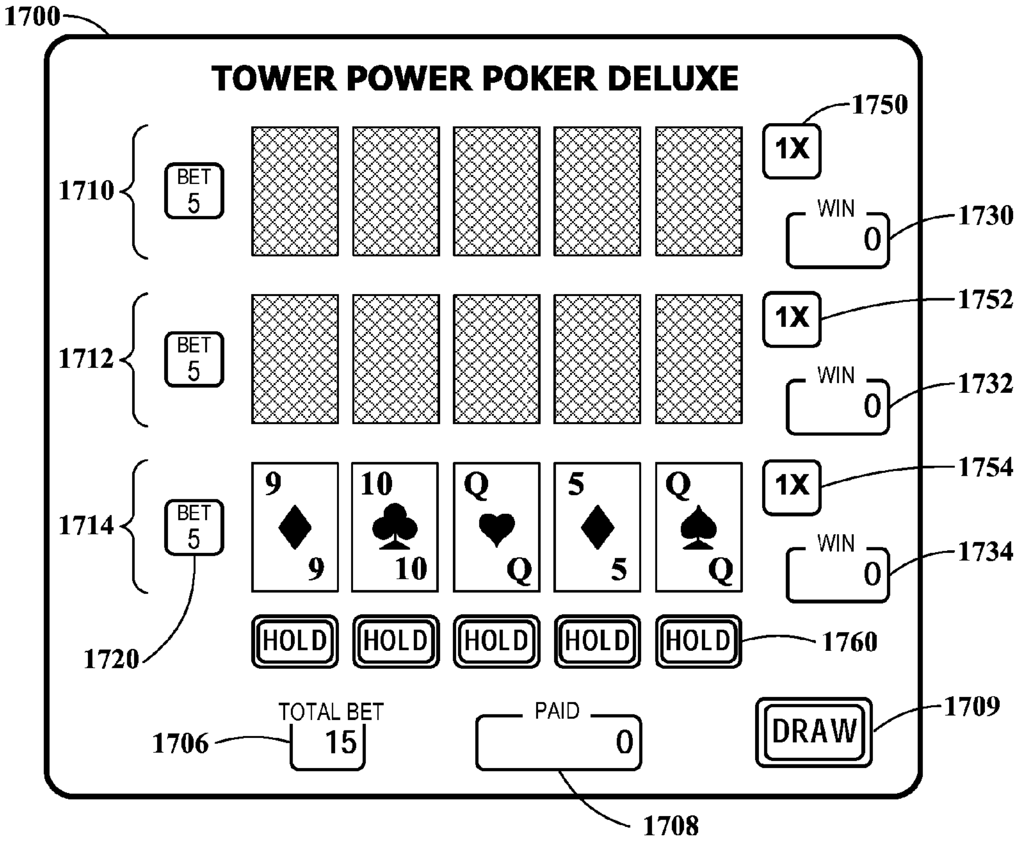
FIGS. 17A, 17B, 17C, 17D, 17E, 17F, and 17G are detail diagrams of a gaming display illustrating a game progression of multiple games of chance having game modifiers usable between game rounds and game stages according to embodiments of the invention.

FIGS. 17A, 17B, 17C, 17D, 17E, 17F, and 17G are detail diagrams of a gaming display illustrating a game progression of multiple games of chance having game modifiers usable between game rounds and game stages according to embodiments of the invention. Referring to FIG. 17A, a game display 1700 is configured to display a wagering game of chance that includes three game stages 1710, 1712, 1714. In this embodiment, the first two game stages 1710, 1712 are five card stud poker games, and the third game stage 1714 is a draw poker game. In other embodiments, various other games may be included in a multi-stage gaming event. FIG. 17A represents a point in a wagering gaming event where a player has placed a wager of 15 credits as shown by the total bet indicator 1706. The total bet has been automatically allocated between the three games stages 1710, 1712, 1714 as shown by the five credit wagers shown in each of the wager indicators 1720.

Also included on the game display 1700 are game modifier indicators 1750, 1752, 1754 and win indicators 1730, 1732, 1734 that respectively correspond to each of the three game stages 1710, 1712, 1714. In this embodiment, game stage multipliers are used as game modifiers and, as shown in FIG. 17A, each of the game modifiers 1750, 1752, 1754 are shown as “1×.”

After the wager has been received and the gaming event initiated, an initial dealt hand is displayed in the third game stage 1714, which in this embodiment is a draw poker game stage. The dealt hand for the third game stage 1714 is 9D-10D-QH-5D-6D. The player is then allowed to hold zero, one, or more of the cards in the dealt draw poker hand in the third game stage 1714.

Figure 17B:
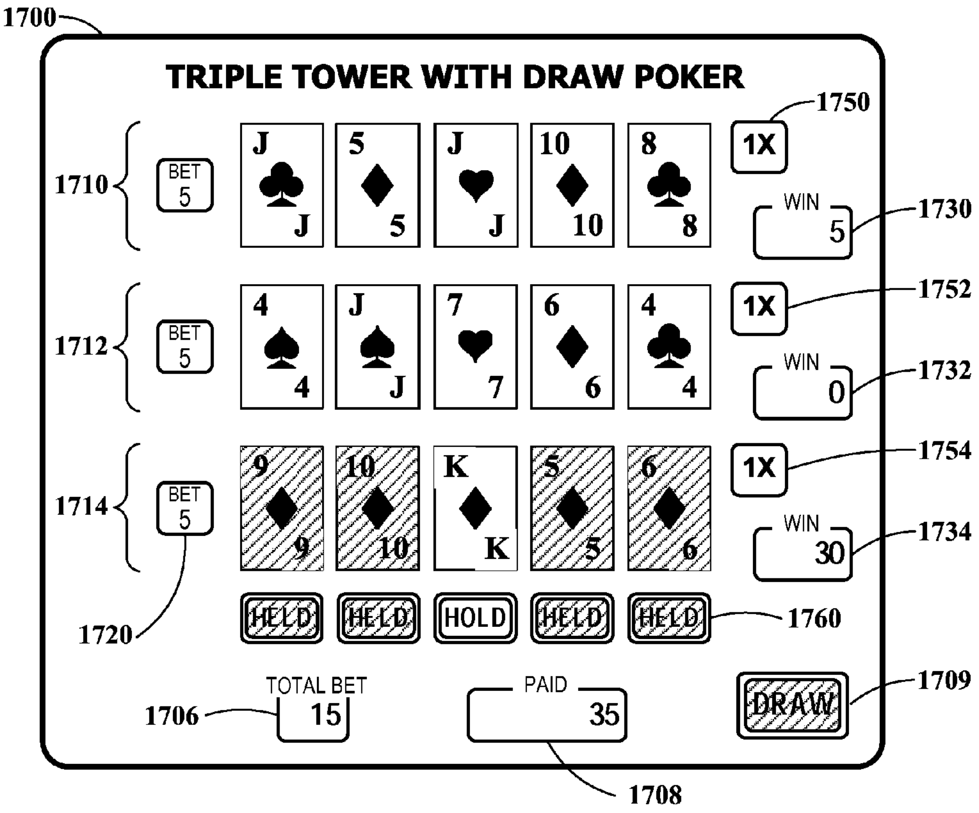

Referring to FIG. 17B, the player has held the four diamond cards (9D-10D-5D-6D) in the third game stage 1714 and pressed the “DRAW” button 1709. After the DRAW button 1709 is pressed, the stud poker hand in the first stage 1710 is revealed followed by the stud poker hand in the second stage 1712 being revealed, and finally, the non-held cards (if any) in the draw poker hand in the third game stage 1714 are discarded and replaced by draw cards. Here, the stud poker hand in the first game stage is JC-5D-JH-10D-8C, which results in a high pair award of 5 credits. This win is multiplied by the first game modifier shown in the first game modifier indicator 1750 and the result is shown in first win indicator 1730. Here, as the first game modifier is a “1×” the award is maintained at the indicated 5 credits.

The second stud poker hand in the second game stage does not result in a winning game outcome and hence no award is shown in the second win indicator 1732. The result of the draw in the third game stage reveals another diamond card (KD). Hence, the draw poker hand results in a diamond flush and the corresponding 30 credit award is shown in the third win indicator 1734 as modified by the “1×” multiplier of the third game modifier. The win total for this first game is the sum of the wins shown in the win indicators 1730, 1732, 1734, which is then shown in the PAID meter 1708. It is also determined by the game device whether any game stage criterions have been satisfied. In this embodiment, predefined game criterions are set to be satisfied if a winning hand is received on the various game stages 1710, 1712, 1714. In the game shown in FIG. 17B, both the first game stage 1710 and the third game stage 1714 result in winning hands. Further, when the predefined game criteria are satisfied, the multiplier value for a game stage modifiers used in a subsequent stage in the subsequent game is altered.

Figure 17C:
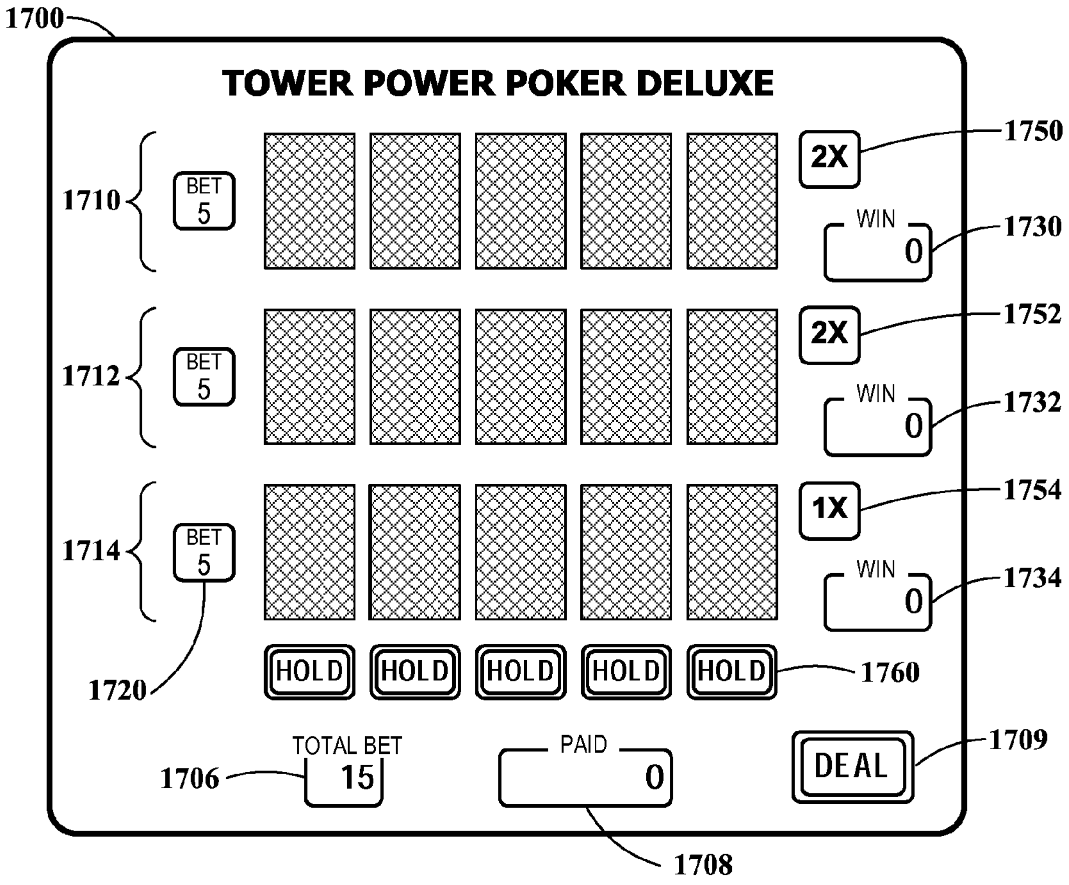

Thus, as shown in FIG. 17C, since the first game stage 1710 resulted in a winning hand and satisfied the predefined criterion, the game modifier 1752 associated with the second game stage is doubled for the next game of chance. Similarly, since the third game stage 1714 resulted in a winning hand and satisfied the predefined criterion, the game modifier 1750 associated with the first game stage is double for the next game of chance. Here, when the third or last game stage satisfies the predefined criterion the resulting alteration of the game modifier for the next game loops around to first or top game modifier. In other embodiments, when the predefined criterion for the last game stage of a multi-stage game is satisfied, no further alterations to the game modifiers in a subsequent game are made. In addition, while three game stages or poker games are shown in these embodiments with specific predefined criteria, other embodiments can utilize any of the other discussed variations discussed above or below in this concept description.

Figure 17D:
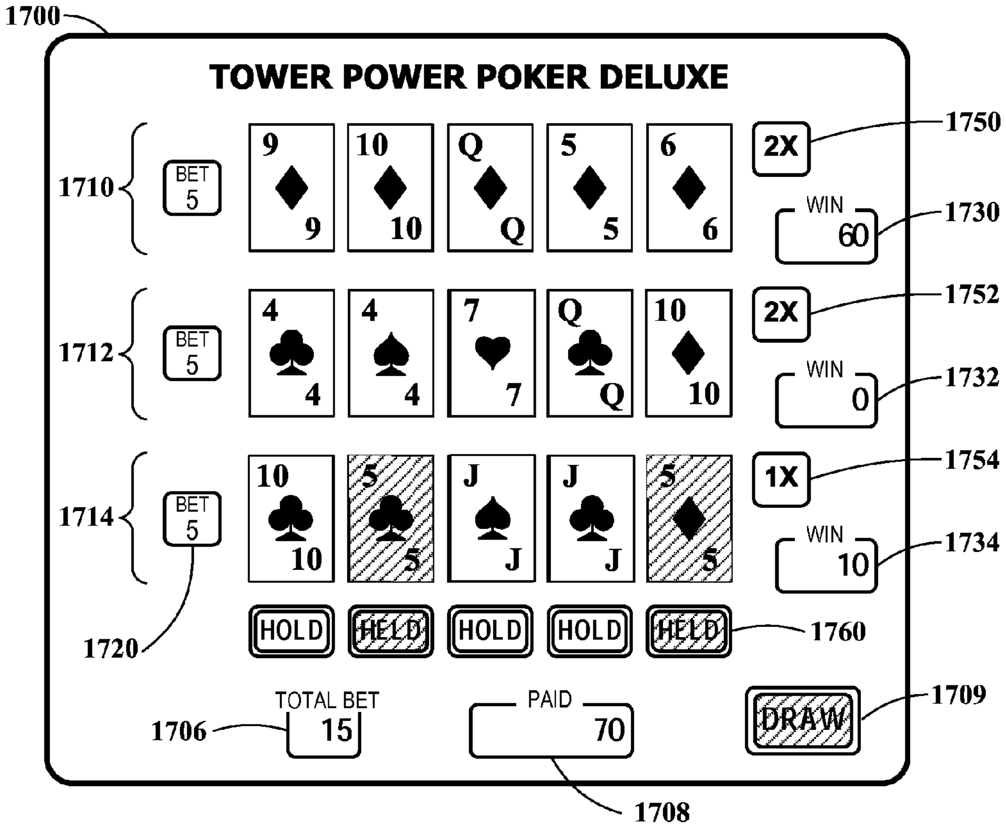
Figure 17E:
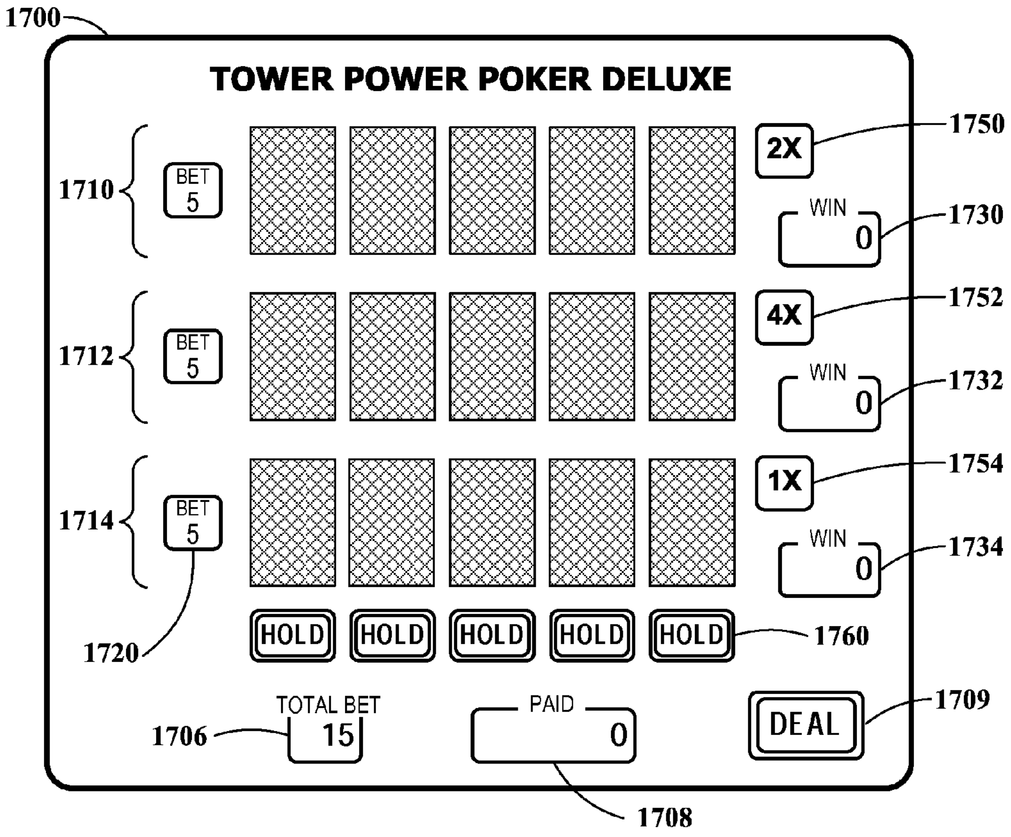

Returning to FIG. 17C, to take advantage of the increased multipliers shown in the game modifier indicators 1750, 1752, 1754, the player places an additional wager to initiate another game of chance. Referring to FIG. 17D, after another round of playing through the game stages (in a similar manner to that described above with respect to FIGS. 17A and 17B), the game results in winning hand appearing in the first game stage 1710 (here a diamond flush with a pay of 30 credits) and a winning hand appearing in the third game stage 1714 (here, two pair—Jacks and 5s with a pay of 10 credits). Since the first game modifier had previously been increased to “2×”, the 30 credits win associated with the flush outcome in the first game stage 1710 is doubled to 60 credits as shown in the first win indicator 1730. Again, each of the game stages is analyzed to see if they satisfy the predefined criterion. Here, since both the first and third poker hands are winning hands, the first and third game stages 1710, 1714 satisfy the predefined criterion. Since the first stage 1710 meets the predefined criterion, the second game stage modifier 1752 for a subsequent game is altered. Here, the associated multiplier is doubled. Similarly, since the third stage 1714 satisfies the predefined criteria, the first game stage modifier 1750 for a subsequent game is also altered. In addition, each of the existing game modifiers in the present game is moved down to a next game stage for the subsequent game. Thus, referring to FIGS. 17D and 17E, the “2×” of the first game modifier 1750 is doubled to “4×” with the winning hand in the first stage 1710 and moved down to be the second game modifier 1752 for use in a subsequent game. The “2×” of the second game modifier is reset to “1×” since a winning hand was not received in the second stage 1712, and this “1×” is moved down to the third game stage modifier 1754 for a subsequent game. The “1×” of the third game modifier 1754 is doubled to “2×” because of the winning hand in the third stage 1714 and looped back to the first game stage modifier 1750 for a subsequently played game.

In other embodiments, a losing hand does not reset a multiplier to "1×" or otherwise initialize a game modifier. Thus, in the above example, the third game stage modifier 1754 shown in FIG. 17E would be maintained at "2×." In some of these embodiments, however, a game modifier is only looped around from the last game stage to the first game stage when the last game stage satisfies a predefined criterion, which may be different from predefined criteria used with other game stages.

Figure 17F:
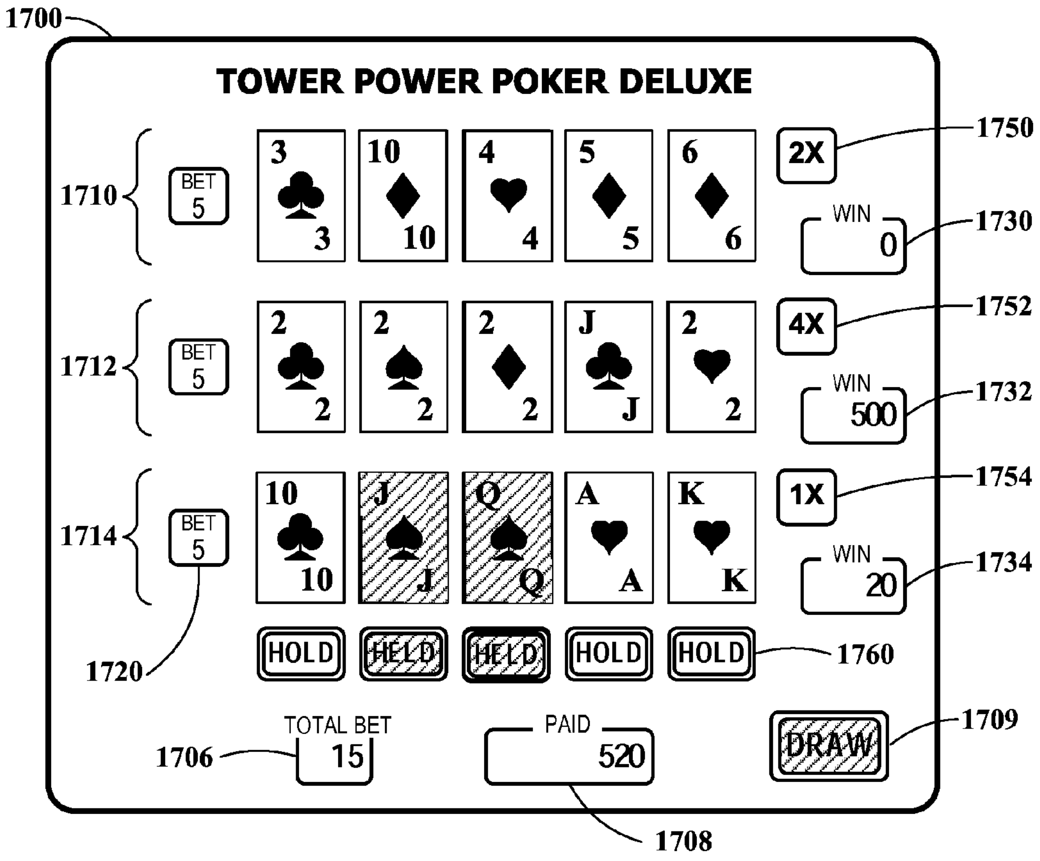
Figure 17G:
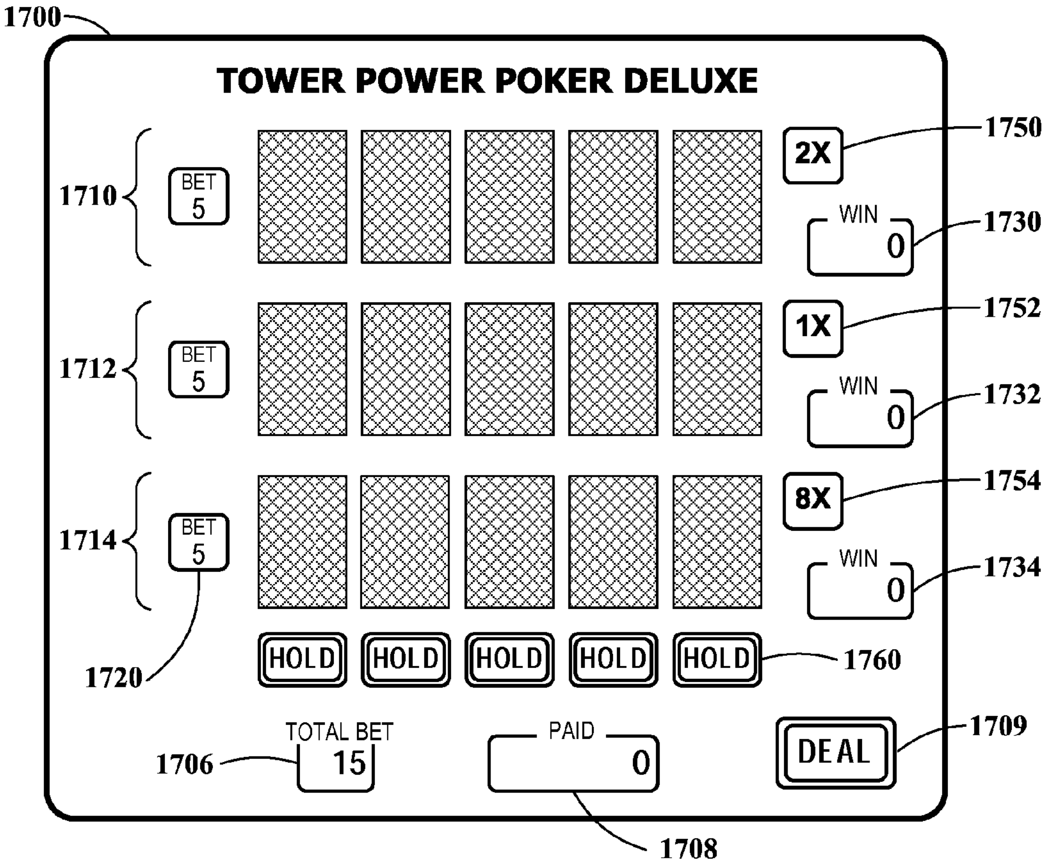

Referring to FIG. 17F, a player has placed another wager and initialized another game of chance to use the increased game modifier multipliers. Here, the player has received a four-of-a-kind in the second game stage 1712 with a "4×" modifier, which results in a pay of 500 credits. In addition, the player has received a straight in the third game stage 1714, which is associated with an award of 20 credits. In addition to receiving the awards associated with the winning hands shown in the game stages of FIG. 17F, the game modifiers associated with the winning hands are again doubled and moved down a game stage. Hence, as shown in FIG. 17G, the first game stage modifier 1750 is set to "2×" from the looped modifier associated with the straight in the third game stage 1714 shown in FIG. 17F, the second game stage modifier 1752 is reset to "1×", and the third game stage modifier is set to "8×".

Although one embodiment has been shown utilizing looping multipliers in the above game progression shown in FIGS. 17A-17G, many variations can be made to the rules in the predefined criterion, the alteration of the game modifiers, or the types of games shown in the game stages. That is, any of the concepts described above, such as implementing the games in a slot machine device, can be implemented within a method of operating a gaming device to use and alter game modifiers in multi-stage games between separately initiated games of chance.

One such variation is to utilize modifications to the game modifiers based on the game stages within a single game (such as those embodiments described above in FIGS. 1-15), and then use the looping modifications to the game modifiers described above (see e.g., FIGS. 22A-22H and example description below), or others, to continue using the altered modifiers in the next game having multiple game stages. For example, the game rules of a three-stage game may include altering the game modifiers associated with subsequent game stages after a criterion has been met within a single game, and then associating the modifiers at the end of the single game with game stages of a subsequently played game. In another example, a five-stage game may include rules to alter game modifiers associated with subsequent game stages after one game stage is determined to meet a predefined criterion. Then the game modifier of the last game stage could be looped around to modify the game modifier associated with the first game stage of the next played game if a predefined criterion had been satisfied.

Figure 18A:
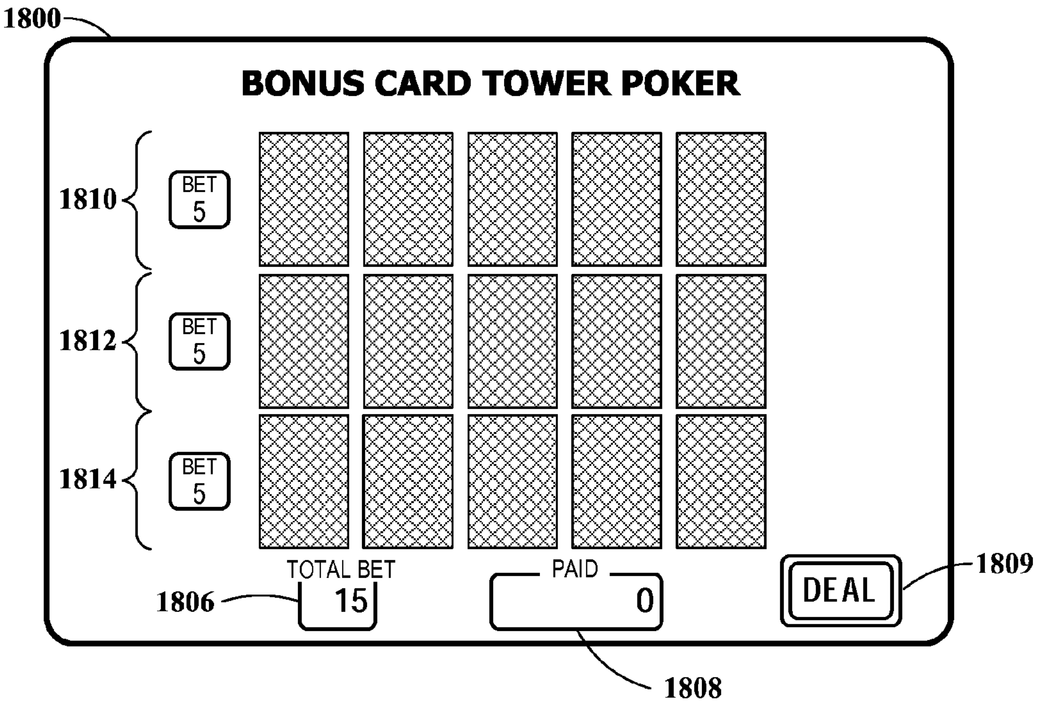
FIGS. 18A, 18B, 18C, 18D, 18E, 18F, and 18G are detail diagrams of a gaming display illustrating a game progression of multiple games of chance having game modifiers usable between game rounds and game stages according to embodiments of the invention.
Figure 18B:
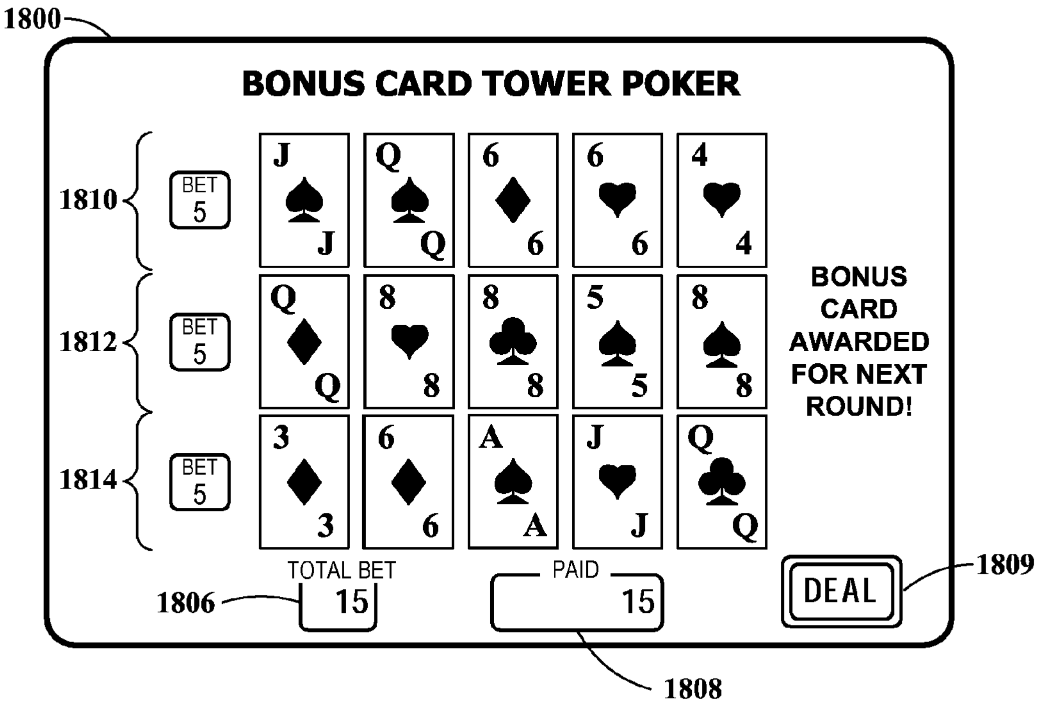
Figure 18C:
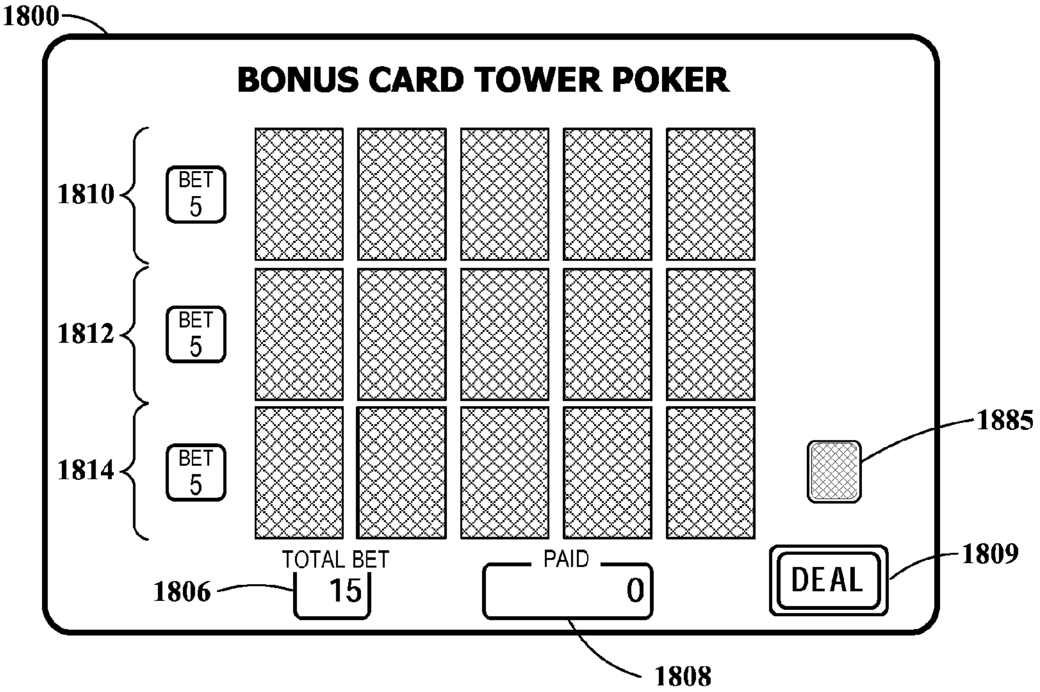

Another variation is shown in FIGS. 18A-18G. Here, a game display 1800 again includes three game stages 1810, 1812, 1814 that play three five-card stud poker hands (although in other embodiments, various other wagering games of chance may be presented). However, in this embodiment, a game modifier usable between games and stages within the games includes the awarding and use of bonus cards that can be used with dealt cards to create a best five-card poker hand. Referring to FIG. 18A, a bet of 15 credits is made as shown on the BET meter 1806 and the game is initiated by pressing the DEAL button 1809. This bet is automatically allocated between the three game stages 1810, 1812, 1814, as shown. The poker hands in the first, second, and third stages 1810, 1812, 1814 are then displayed as shown in FIG. 18B. Here, the hand in the second stage 1812 is a three-of-a-kind and is associated with an award of 15 credits, as shown on the PAID meter. Additionally, since this hand is a winning hand, and hence satisfies the predefined criterion of this embodiment, a bonus card is award in the next round. Referring to FIG. 18C, the bonus card 1885 is associated with the third game stage 1814 as the game stage modifier drops to the next game stage for the subsequently played game. In other embodiments, the bonus card game modifier may be moved or looped in a different manner such as by randomly choosing a game stage to associate with it, keeping it associated with the game stage that triggered it, or any of the other various ways of choosing one or more of the game stages to modify in a subsequent game.

Figure 18D:
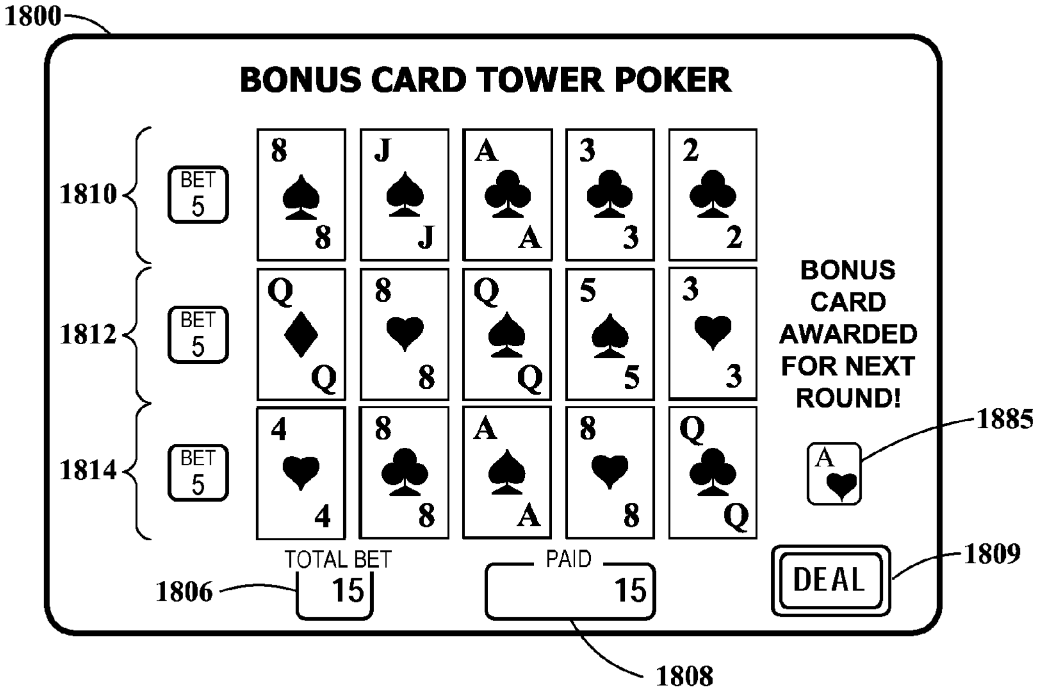

Referring to FIG. 18D, a second game having 3 stud-poker hands is wagered upon and initiated. Here, the second game stage 1812 results in a winning hand with a pair of Queens, and the third game stage 1814 results in a winning hand of two pairs (Aces and 8s) by using the bonus card awarded from the previous game. The total award for these winning hands is displayed in the PAID meter 1808. Additionally, it is indicated that bonus cards have been awarded for the next round or game. In this embodiment, each winning hand in a game stage receives a bonus card to be used with a next game stage in a subsequent game. Additionally, if one bonus card was previously awarded and associated with a corresponding game stage, a second bonus card is added. In this embodiment, the number of bonus cards associated with any game stage is capped at two. However, in other embodiments, additional bonus cards may be given, and/or may be used in different manners with different game stages.

Figure 18E:
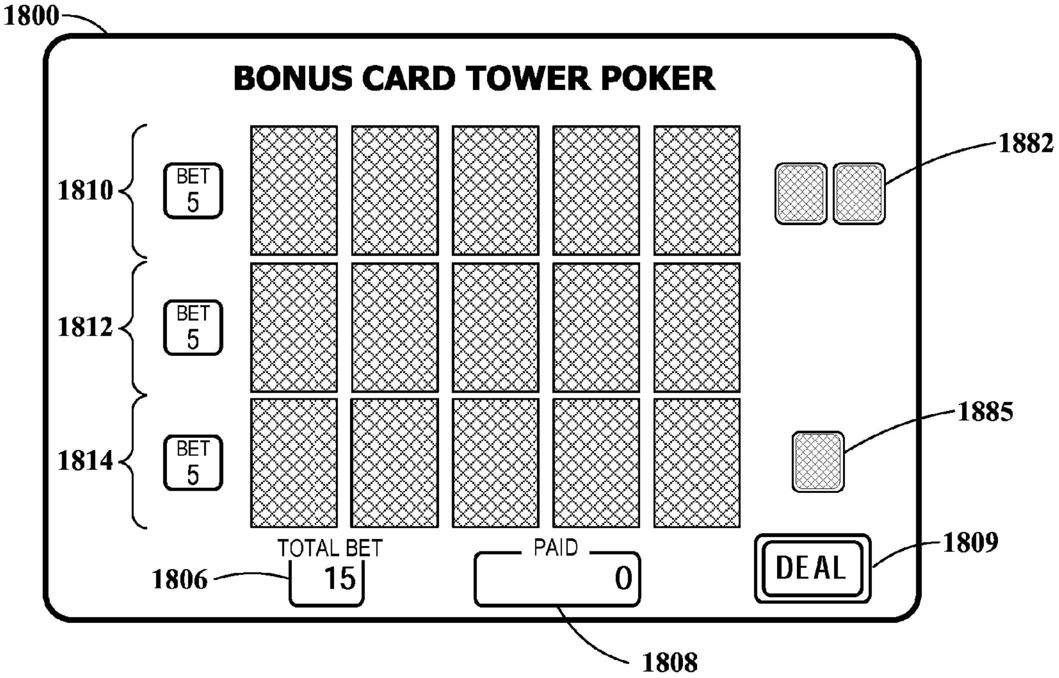

Returning to FIGS. 18D and 18E, since the third game stage 1814 resulted in a winning hand, another bonus card 1885 is added to the first bonus card and awarded for use in the first game stage 1810 for the next game as shown in FIG. 18E. Additionally, since the second game stage 1812 resulted in a winning hand, a bonus card is awarded for use with the third stage 1814 in a subsequent game as shown in FIG. 18E.

Figure 18F:
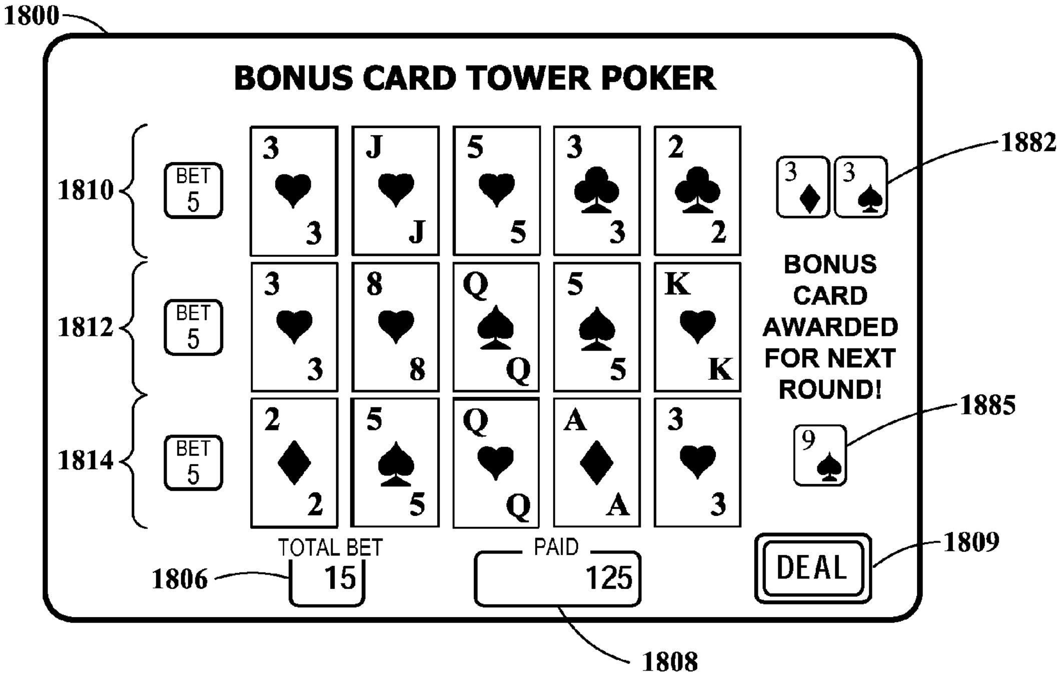

As shown in FIG. 18F, another wager has been placed a third game has been initiated. Here, the bonus cards associated with the first game stage helps form a four-of-a-kind hand with a corresponding award of 125 credits. Bonus cards may be drawn from the same deck as the cards in the main hand of each game stage, or may be drawn from a second deck, which can result in additional winning combinations, such as five-of-a-kinds.

Figure 18G:
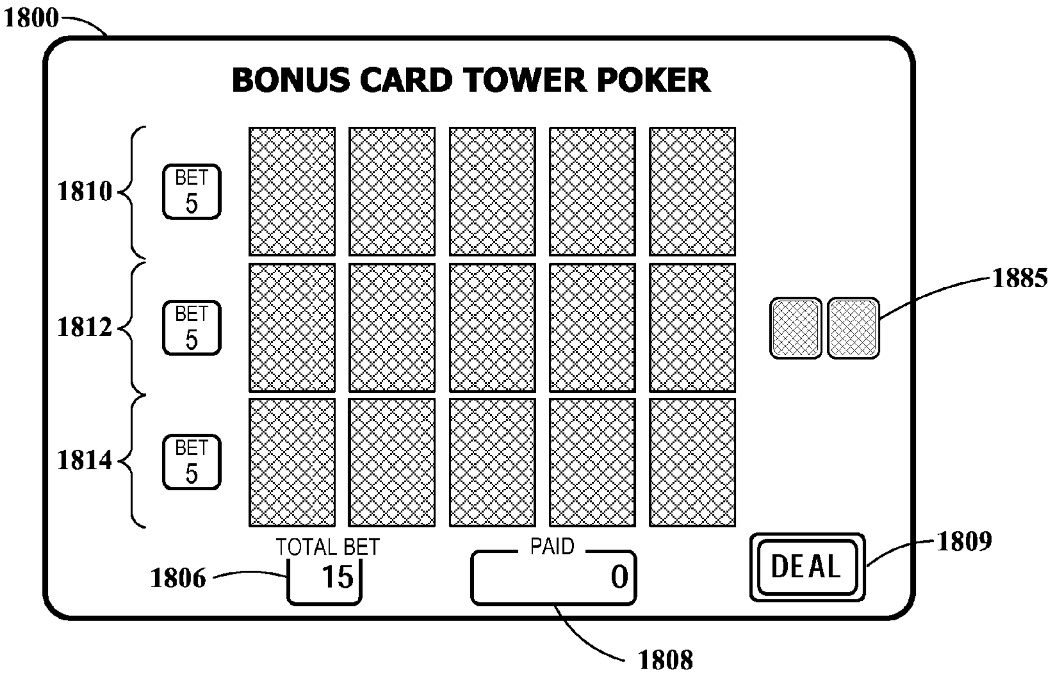

Referring to FIG. 18G, bonus cards 1885 have again been associated with a game stage in a subsequently played game. Although the previous hand that triggered the bonus cards in the game shown in FIG. 18F already included two bonus cards, the bonus cards awarded for use in the next game shown in FIG. 18G is still two bonus cards. This is because, as mentioned above, the rules in this particular embodiment specify that the number of bonus cards awarded is capped at two. In other embodiments, however, three or more bonus cards may be associated with a given hand in a game stage.

Figure 19A:
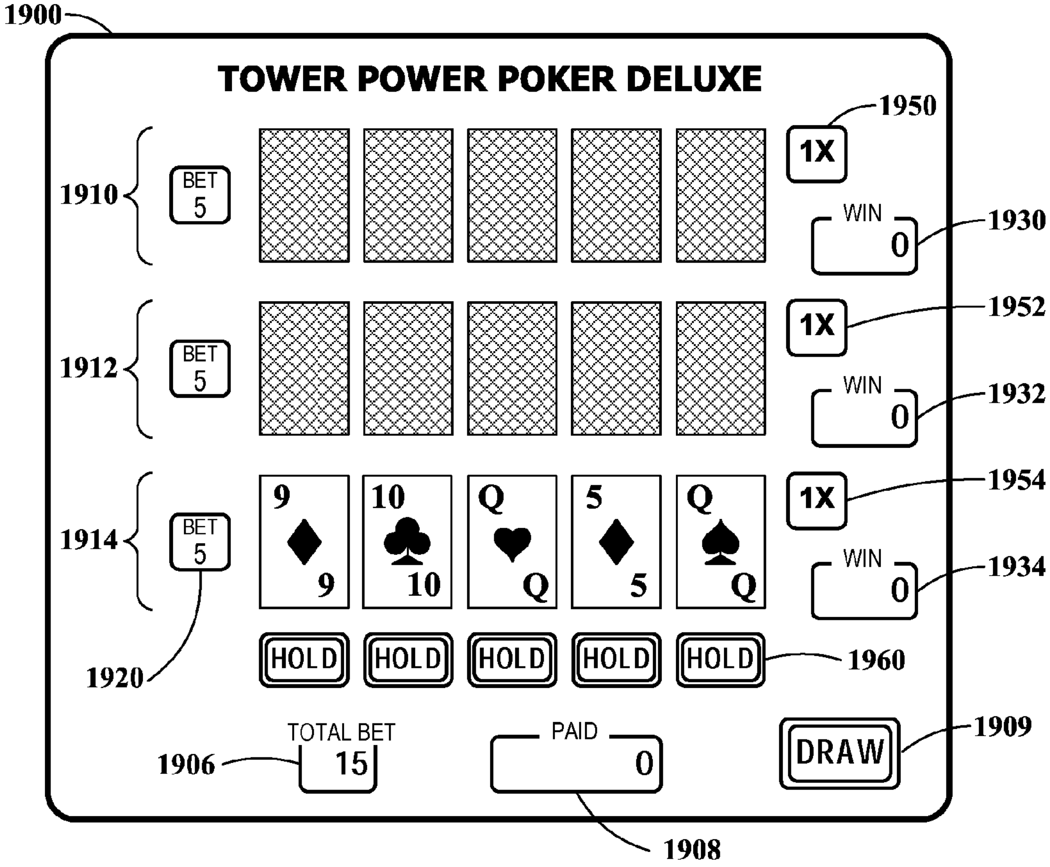
FIGS. 19A, 19B, 19C, 19D, 19E, 19F, 19G, and 19H are detail diagrams of a gaming display illustrating a game progression of multiple games of chance having game modifiers usable between game rounds in a multi-hand poker game according to embodiments of the invention.

FIGS. 19A, 19B, 19C, 19D, 19E, 19F, 19G, and 19H are detail diagrams of a gaming display illustrating a game progression of multiple games of chance having game modifiers usable between game rounds in a multi-hand or multiplay poker game according to embodiments of the invention. Referring to FIG. 19A, a game display 1900 is configured to display a multi-hand poker that includes three game stages

1910, 1912, 1914. In this embodiment, all three game stages 1910, 1912, 1914 part of the same multi-hand poker game. Although three hands or stages are shown in this embodiment, other embodiments may include five, ten, or other numbers of poker hands or stages. FIG. 19A represents a point in a wagering gaming event where a player has placed a wager of 15 credits as shown by the total bet indicator 1906. The total bet has been automatically allocated between the three games stages 1910, 1912, 1914 as shown by the five credit wagers shown in each of the wager indicators 1920.

Also included on the game display 1900 are game modifier indicators 1950, 1952, 1954 and win indicators 1930, 1932, 1934 that respectively correspond to each of the three game stages 1910, 1912, 1914. In this embodiment, game stage multipliers are used as game modifiers and, as shown in FIG. 19A, each of the game modifiers 1950, 1952, 1954 are shown as "1×."

After the wager has been received and the gaming event initiated, an initial dealt hand is displayed in the third game stage 1914. The dealt hand for the third game stage 1914 is 9D-10C-QH-5D-QS. The player is then allowed to hold zero, one, or more of the cards in the dealt draw poker hand in the third game stage 1914.

Figure 19B:
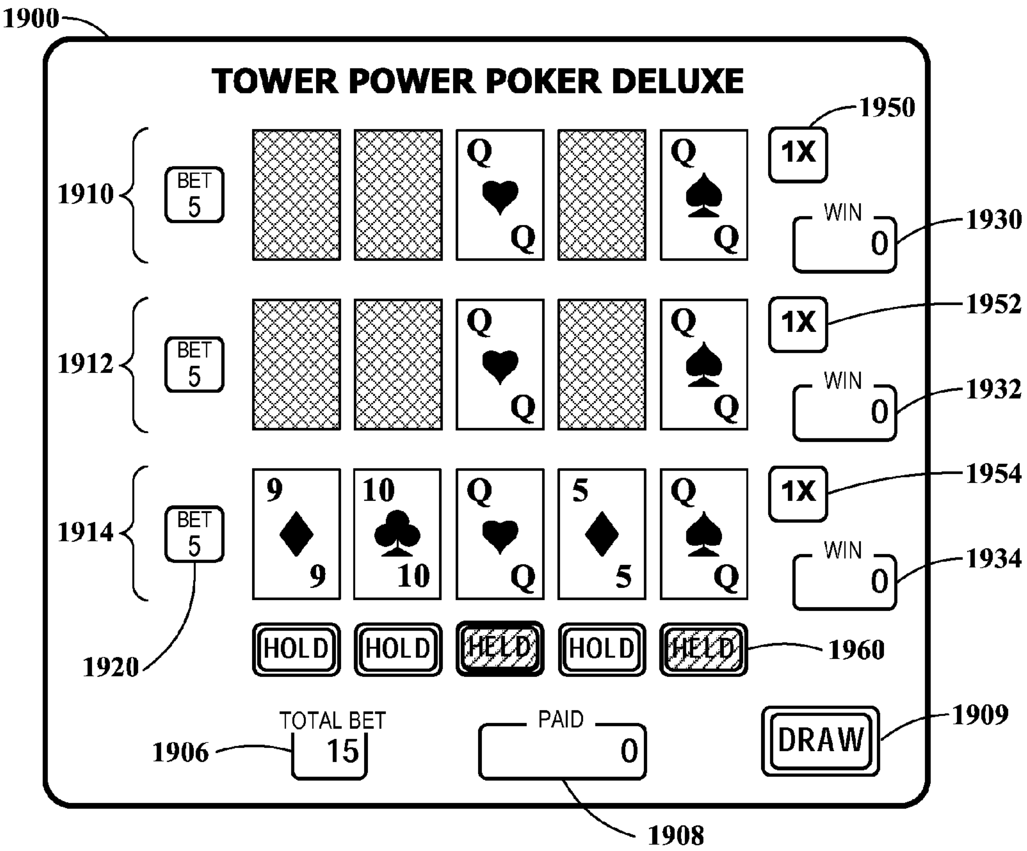

Referring to FIG. 19B, the player has held the pair of queens (QH-QS) in the third game stage 1914 using buttons 1960 or other player interface devices. In this multi-hand game, each card held in the third stage 1914 is replicated in the first and second stages 1910, 1912. These cards may be replicated in the identical card positions, or may be moved to other card positions. When the player is satisfied with the held cards, the "DRAW" button 1909 is activated to continue the game.

Figure 19C:
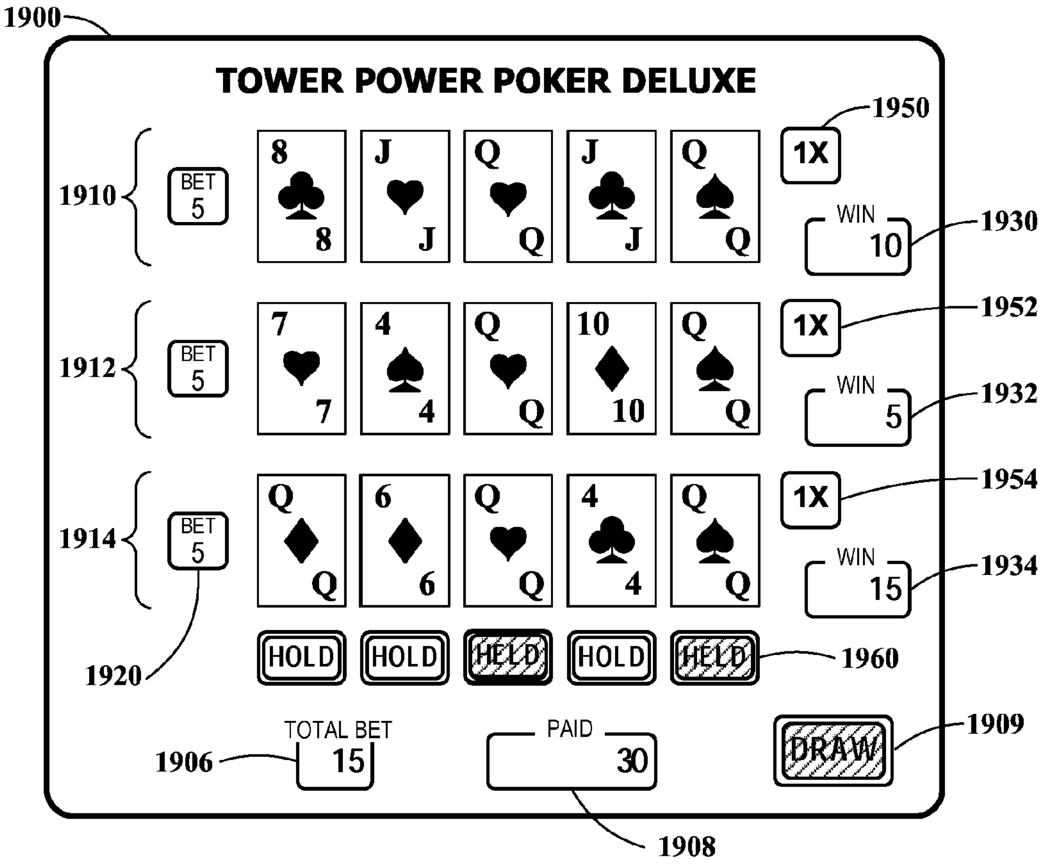

Referring to FIG. 19C, after the DRAW button 1909 is pressed, the non-held cards in the third stage 1914 are discarded and replaced by draw cards, and unrevealed cards in the first stage 1910 and second stage 1912 are shown; thereby completing the poker hands in the first, second and third stages. Here, the first poker hand in the first game stage 1910 includes a pair of jacks and the held pair of queens resulting in a "two-pair" award of 10 credits. This win is multiplied by the first game modifier shown in the first game modifier indicator 1950 and the result is shown in first win indicator 1930. Here, as the first game modifier is a "1×" the award is maintained at the indicated 10 credits. In the second poker hand in the second game stage 1912, only the pair of queens results in an award. Hence, an award of 5 credits is multiplied by the "1×" from the second game modifier 1952 for the award of 5 credits shown in the second win indicator 1932. The player received a third queen in the third hand 1914, which is associated with a 15 credit win. This win is multiplied by the "1×" from the third game modifier 1954 and displayed in the third win indicator 1934.

The total of the first, second, and third win indicators 1930, 1932, and 1934 is then paid to the player, where this total is reflected in the PAID meter 1908. Although the play of the present game is complete, the results of this game are used to alter the game modifiers 1950, 1952, 1954 for the next game. In this embodiment, any hand or stage that resulted in a winning poker hand (predefined criterion) triggers the game modifier for a next stage to be incremented. That is, if the first game stage 1910 resulted in a winning poker hand, the game modifier 1952 associated with the second stage would be incremented. Similarly, if the second game stage 1912 resulted in a winning poker hand, the game modifier 1954 associated with the third stage would be incremented. Also, if the third game stage 1914 resulted in a winning poker hand, the game modifier 1950 associated with the first stage would be incremented.

Figure 19D:
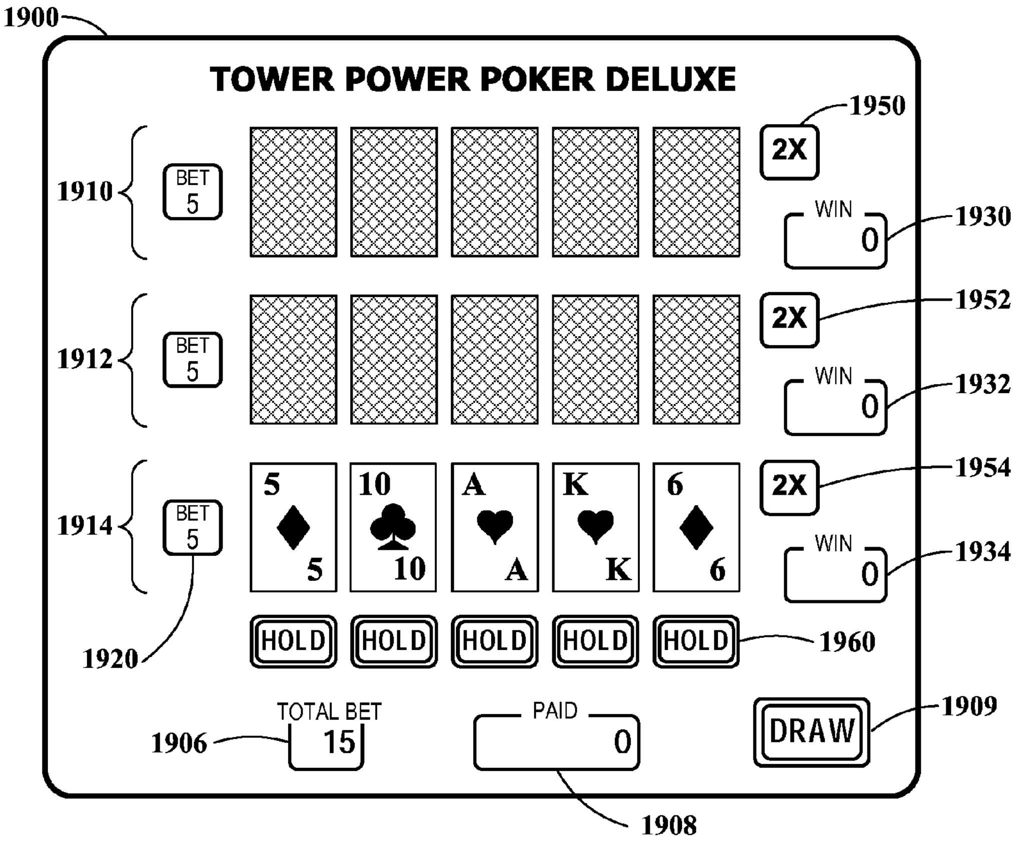
Figure 19E:
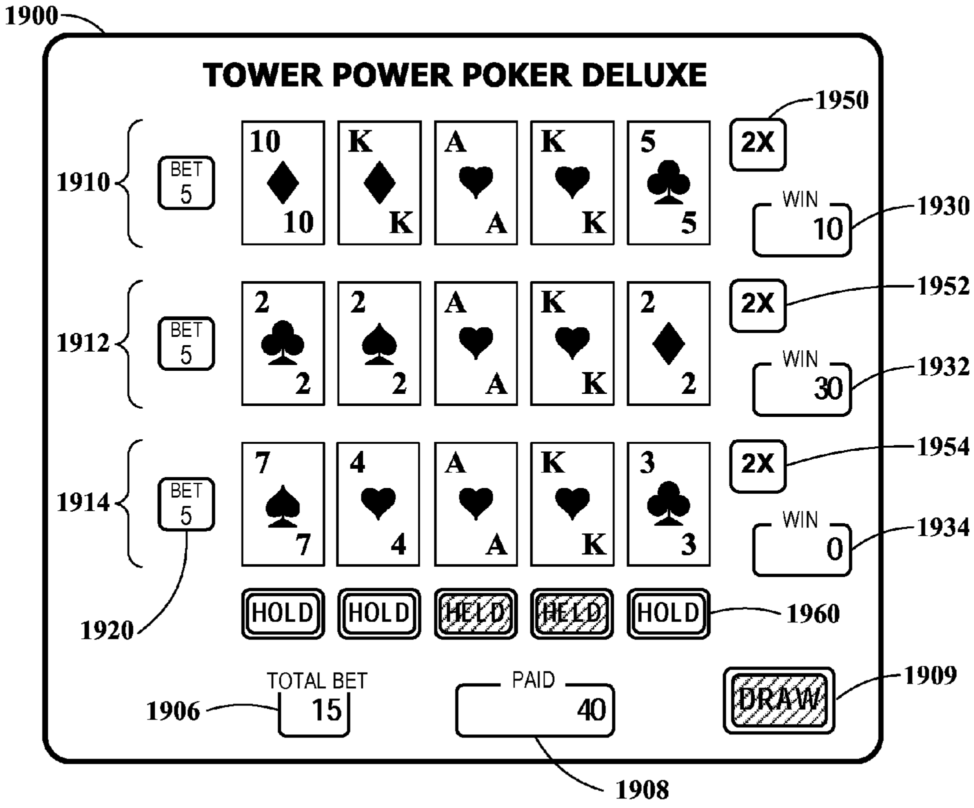

As shown in FIG. 19D, since all the previous hands resulted in a winning poker hand, each of the game modifiers 1950, 1952, 1954 is incremented from "1×" to "2×". FIG. 19D also shows the next dealt hand in the third game stage 1914. FIG. 19E shows the result of the player holding cards (here the AH-KH, which is replicated in the first and second game stages 1910, 1912), and drawing replacement cards to complete all three poker hands. Here, the poker hands associated with the first stage 1910 and second stage 1912 are winning poker hands. The awards associated with these hands are multiplied by the "2×" game modifiers 1950, 1952 respectively associated with the game stages 1910, 1912. Additionally, since these two games stages were winning poker hands, the game modifiers for the next game are incremented.

Figure 19F:
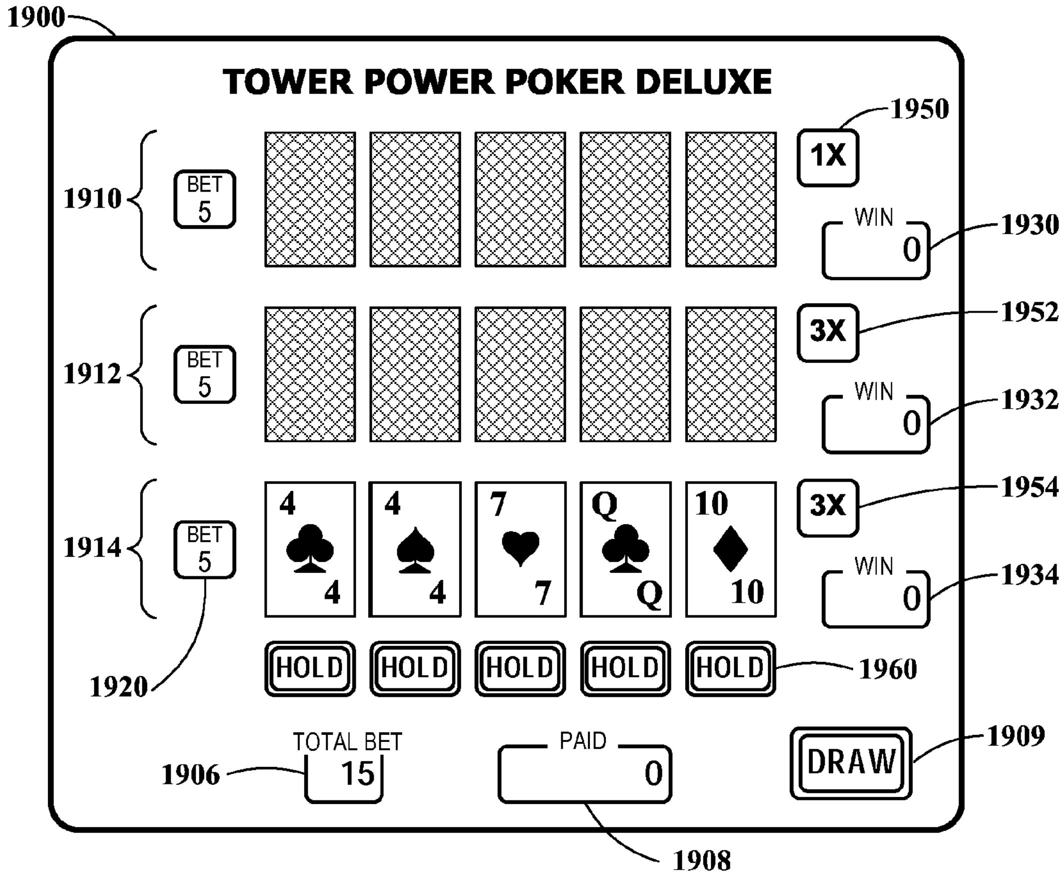

Referring to FIG. 19F, since the poker hand associated with the first game stage 1910 was a winning poker hand, the game modifier 1952 associated with the second game stage 1912 is incremented from "2×" to "3×". Similarly, since the poker hand associated with the second game stage 1912 was a winning poker hand, the game modifier 1954 associated with the third game stage 1914 is incremented from "2×" to "3×". However, since the poker hand associated with the third game stage 1914 was not a winning poker hand, the game modifier 1950 associated with the first game stage 1910 is decremented from "2×" to "1×". In other embodiments, a game modifier may be reset to "1×" when a corresponding hand from the previous game does not meet a predefined criterion. Additionally, various other embodiments may modify other aspects of a multi-hand poker game, such as by altering game modifiers within a single multi-hand game based on predefined conditions or criteria.

Figure 19G:
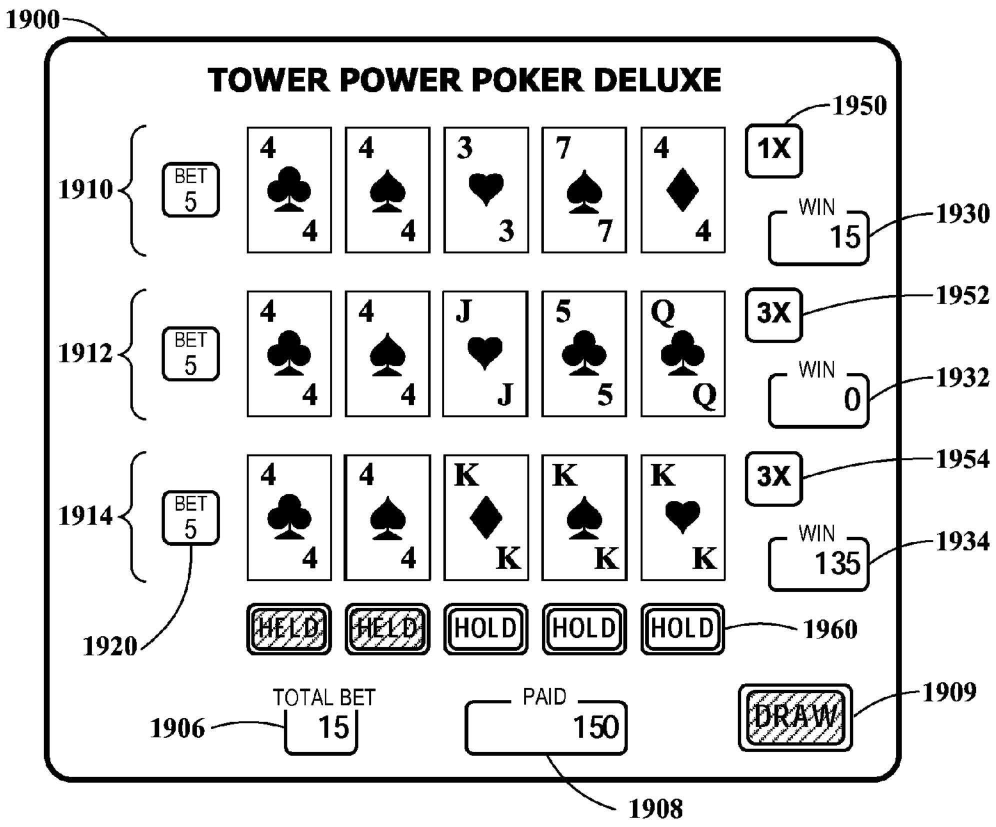
Figure 19H:
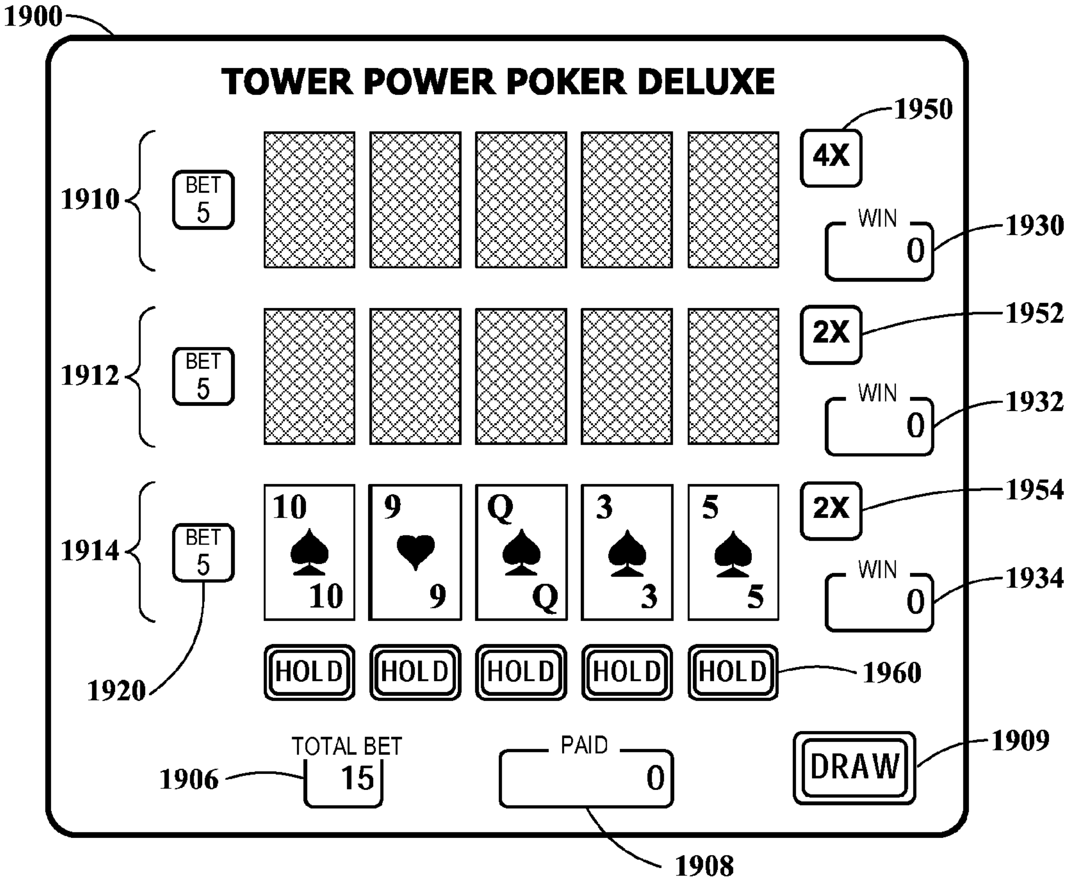

In FIG. 19G, the multi-hand poker game shown in FIG. 19F is played out. Here, the player has held the pair of fours in the initially dealt hand (stage three 1914), which are replicated in the first and second hands 1910, 1912 as shown. Draw cards then fill in the first and second hands 1910, 1912 to complete the hands, and replacement cards are given for the discarded cards in the third hand 1914. After the draw, it is determined that the player has received a three of kind in the first hand 1910, no win in the second hand 1912, and a full-house in the third hand 1914. The win indicators 1930, 1932, 1934 reflect the award values associated with these hands 1910, 1912, 1914 as multiplied by the respective game modifiers shown in the modifier indicators 1950, 1952, 1954. Additionally, as shown in FIG. 19H, the win modifiers for the next game are altered based on the results of the poker hands.

In particular, since the first hand 1910 resulted in a win (i.e., meeting the predefined criterion for this embodiment), the associated game modifier is incremented and dropped down to the next level. As a result, the game modifier is incremented from "1×" to "2×" and associated with the second modifier indication 1952 for the next game. The second hand 1912 did not result in a win, so the third game modifier 1954 for the next game uses the previous second game modifier, but is decremented from "3×" to "2×" for the next game. The third hand 1914 also resulted in a winning hand. Thus, the previous game modifier is incremented from "3×" to "4×" and is looped around to the first game modifier 1950 position.

Figure 20:
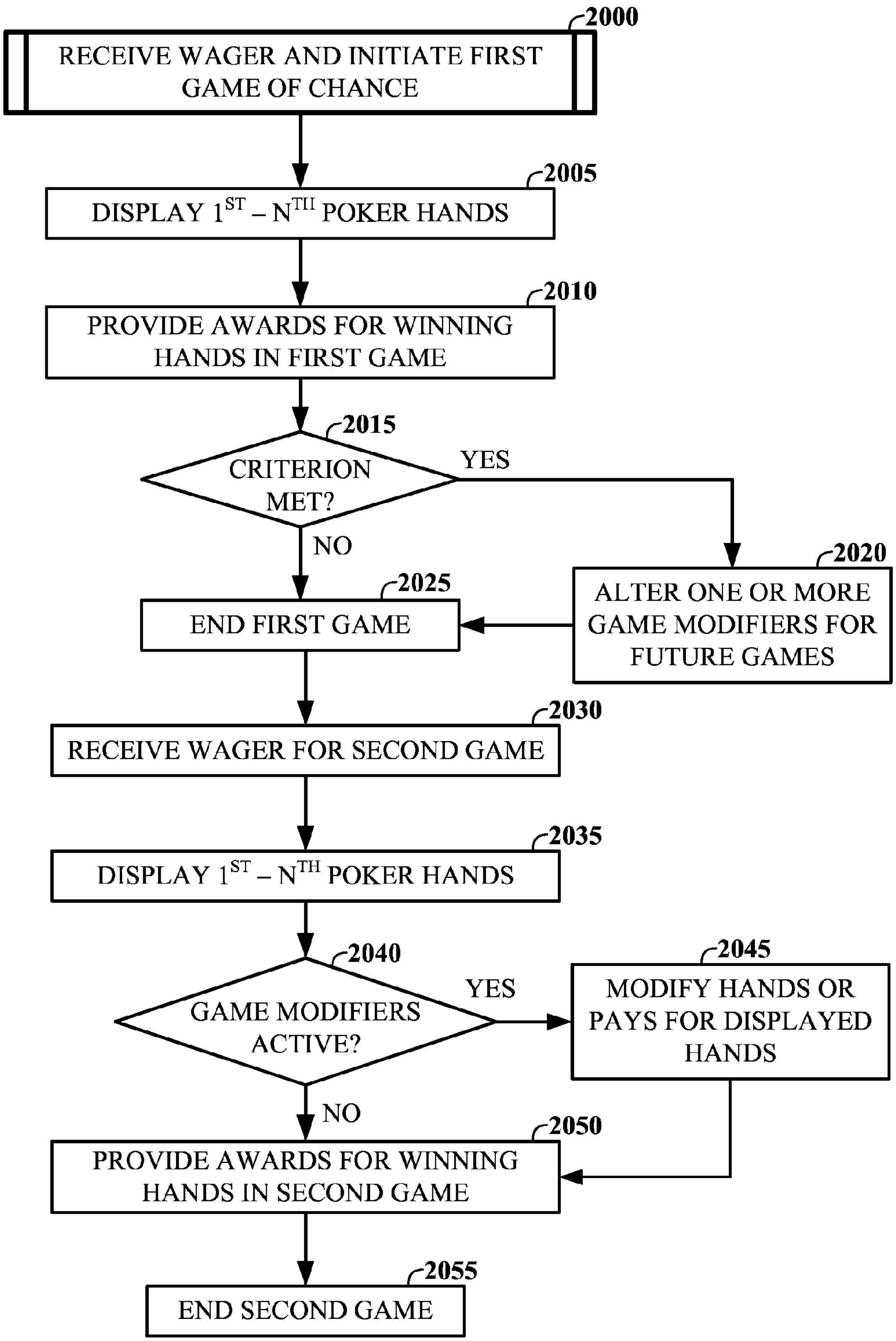
FIG. 20 is a flow diagram of a method of operating a gaming device according to embodiments of the invention.

FIG. 20 is a flow diagram of a method of operating a gaming device according to embodiments of the invention. Although various processes are shown in a particular order in this flow diagram, the order of these processes can be changed in other embodiments without deviating from the scope or spirit of this concept. Hence, the order of the processes shown is for illustrative purposes only and is not meant to be restrictive. Additional game processes may also be included between various processes even though they are not shown in these flow diagrams for clarity purposes. Further each of the processes may be performed by components in a single game device, such as by a game processor, or may be performed in part or whole by a remote server or processor connected to the gaming device via a network. Each process may encoded in instructions that are stored in a memory, a computer-readable medium, or another type of storage device.

Referring to FIG. 20, a flow begins at process 2000 where a wager is received and a first game of chance is initiated. The flow proceeds to step 2005, where a number of poker hands are displayed. While poker hands are described in this flow diagram, in other method embodiments, slot games may be displayed on one or multiple game reel displays. In process 2010, awards are provided for winning hands in the first game. That is, each of the poker game stages that are displayed in process 2005 is evaluated against a paytable to determine if they are associated with an award. In process 2015, it is determined if a predetermined criterion is met or satisfied. If the criterion is not met, the flow moves to process 2025, where the first game ends. If the criterion is met in process 2015, the flow proceeds to process 2020 where one or more game modifiers are altered for future games. Once these modifiers have been altered, the first game ends in process 2025.

The flow then proceeds to process 2030 where a wager is received and a second game is initiated. New poker hands in various game stages are displayed in process 2035. In process 2040, it is determined if one or more of the game modifiers are active. These game modifiers may be activated in the previous first game in process 2020. If one or more game modifiers are active, the flow proceeds to process 2045 where one or more poker hands in the game stages is modified or one or more pays for the game stages is modified. After the hands or pays have been modified, or if no game modifiers are active, the flow proceeds to process 2050 where awards are provided for winning hands in the second game. After the awards have been paid for the second game, the second game ends in process 2055.

Figure 21:
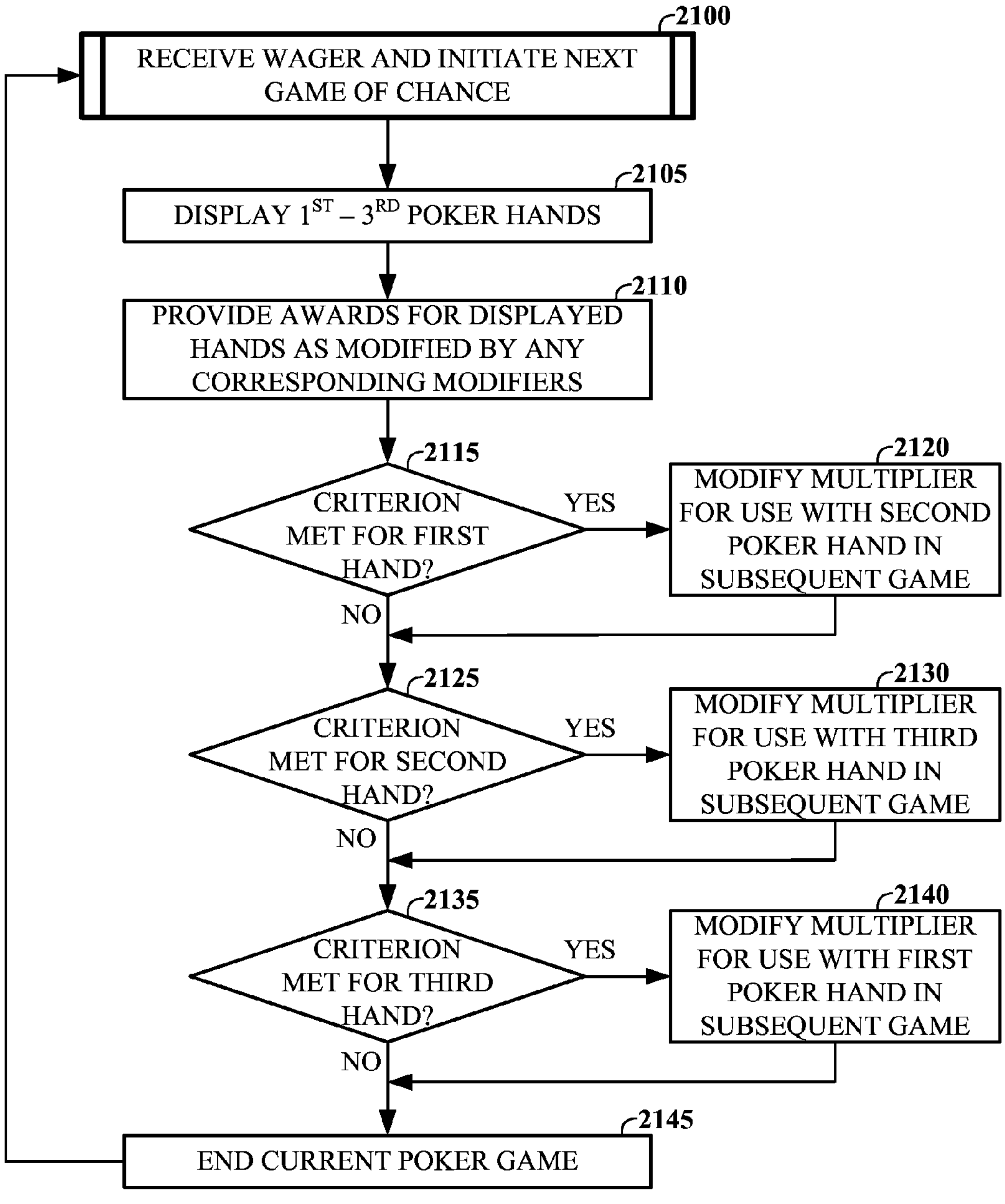
FIG. 21 is a flow diagram of another method of operating a gaming device according to embodiments of the invention.

FIG. 21 is a flow diagram of another method of operating a gaming device according to embodiments of the invention. The flow diagram illustrated in FIG. 21 shows more detail for an example embodiment with three game stages of poker hands in each game of chance. Referring to FIG. 21, a flow begins in process 2100, where a wager is received and a game of chance is initiated. In process 2105, the first, second, and third poker hands are displayed. In process 2110, awards are provided for the displayed poker hands as modified by any corresponding modifiers. In process 2115, it is determined whether the first hand satisfies a predefined criterion. If the first hand does satisfy the predefined criterion, the flow proceeds to process 2120 where a multiplier for use with a second poker hand in a subsequent game is modified. For example, the multiplier may be incremented or doubled. After the multiplier has been modified, or if it is determined that the first hand does not satisfy the predefined criterion in process 2115, the flow proceeds to process 2125.

In process 2125, it is determined whether the second hand satisfies a predefined criterion. If the second hand does satisfy the predefined criterion, the flow proceeds to process 2130 where a multiplier for use with a third poker hand in a subsequent game is modified. For example, the multiplier may be incremented or doubled. After the multiplier has been modified, or if it is determined that the second hand does not satisfy the predefined criterion in process 2125, the flow proceeds to process 2135.

In process 2135, it is determined whether the third hand satisfies a predefined criterion. If the third hand does satisfy the predefined criterion, the flow proceeds to process 2140 where a multiplier for use with a first poker hand in a subsequent game (made by looping back to the first hand) is modified. For example, the multiplier may be incremented or doubled. After the multiplier has been modified, or if it is determined that the third hand does not satisfy the predefined criterion in process 2135, the flow proceeds to process 2145, where the current poker game ends. The flow then repeats itself when another wager and/or game initiating input is received in process 2100.

FIGS. 22A, 22B, 22C, 22D, 22E, 22F, 22G, and 22H are detail diagrams of a gaming display illustrating a game progression of multiple games of chance having game modifiers usable between game rounds and game stages according to embodiments of the invention. The embodiments shown in these figures are similar to those shown in FIGS. 17A-17G; however, the embodiments described below include alteration of game stage modifiers based on both a predefined criterion related to previously played game stages in a single game of chance, and a predefined criterion related to a previously played game of chance.

Figure 22A:
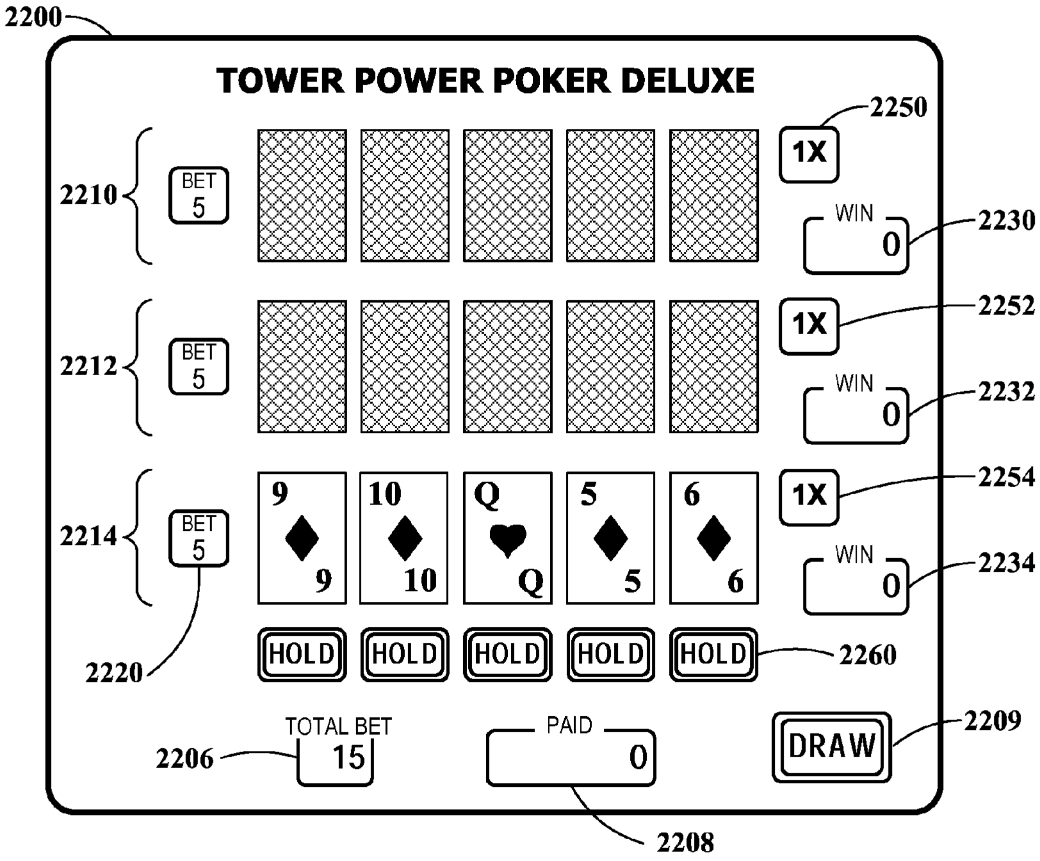
FIGS. 22A, 22B, 22C, 22D, 22E, 22F, 22G, and 22H are detail diagrams of a gaming display illustrating a game progression of multiple games of chance having game modifiers usable between game rounds and game stages according to embodiments of the invention.

Referring to FIG. 22A, a game display 2200 is configured to display a wagering game of chance that includes three game stages 2210, 2212, 2214. In this embodiment, the first two game stages 2210, 2212 are five card stud poker games, and the third game stage 2214 is a draw poker game. In other embodiments, various other games may be included in a multi-stage gaming event. FIG. 22A represents a point in a wagering gaming event where a player has placed a wager of 15 credits as shown by the total bet indicator 2206. The total bet has been automatically allocated between the three games stages 2210, 2212, 2214 as shown by the five credit wagers shown in each of the wager indicators 2220. In other embodiments, a bonus or side bet may be needed to activate the game modifier feature.

Also included on the game display 2200 are game modifier indicators 2250, 2252, 2254 and win indicators 2230, 2232, 2234 that respectively correspond to each of the three game stages 2210, 2212, 2214. In this embodiment, game stage multipliers are used as game modifiers and, as shown in FIG. 22A, each of the game modifiers 2250, 2252, 2254 are shown as "1×."

After the wager has been received and the gaming event initiated, an initial dealt hand is displayed in the third game stage 2214, which in this embodiment is a draw poker game stage. The dealt hand for the third game stage 2214 is 9D-10D-QH-5D-6D. The player is then allowed to hold zero, one, or more of the cards in the dealt draw poker hand in the third game stage 2214.

Figure 22B:
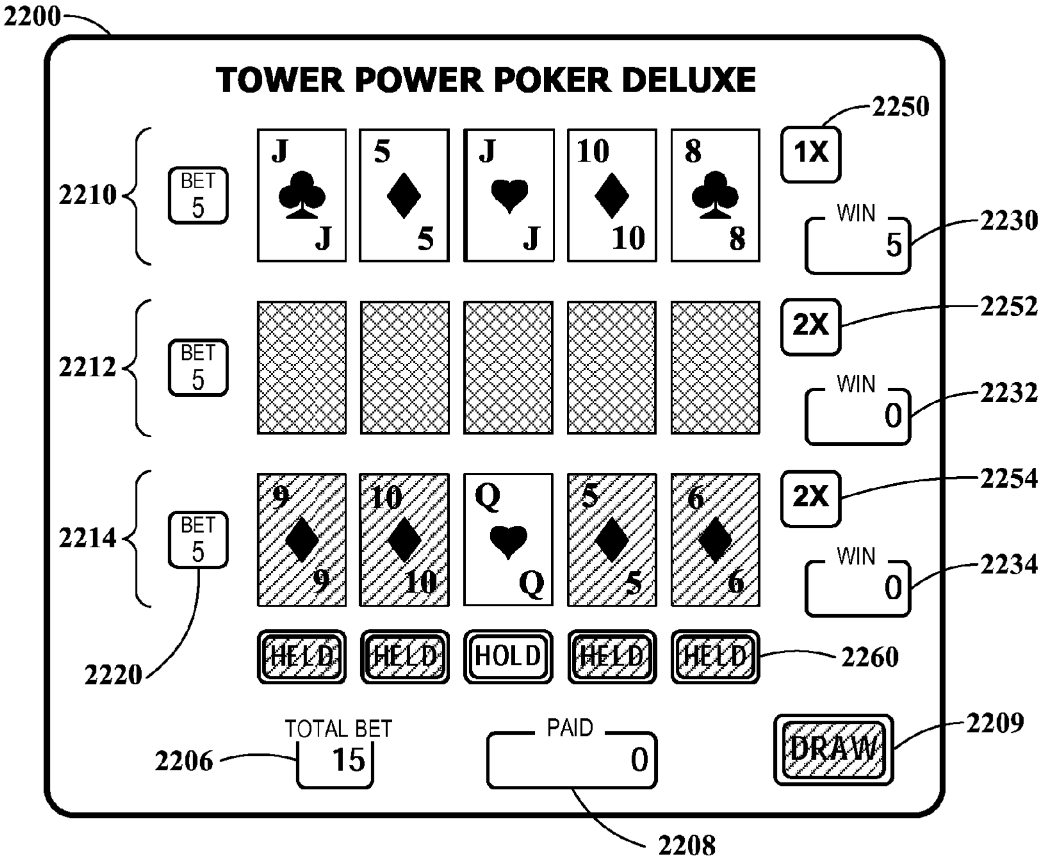

Referring to FIG. 22B, the player has held the four diamond cards (9D-10D-5D-6D) in the third game stage 2214 and pressed the "DRAW" button 2209. After the DRAW button 2209 is pressed, the stud poker hand in the first stage 2210 is revealed as shown in the figure. Here, the stud poker hand in the first game stage 2210 is JC-5D-JH-10D-8C, which results in a high pair award of 5 credits. This win is multiplied by the first game modifier shown in the first game modifier indicator 2250 and the result is shown in first win indicator 2230. Here, as the first game modifier is a "1×" the award is maintained at the indicated 5 credits. However, because the hand in this game stage 2210 satisfies a predefined criterion (here, it is a winning hand associated with an award in a paytable), the game modifiers 2252, 2254 for the subsequent game stages 2212, 2214 are altered. In this embodiment, the game stage modifier values associated with the subsequent game stages are doubled. As discussed above, in other embodiments, various other predefined conditions or criteria may be used to trigger alteration of some or all of the game modifiers. Additionally, multiple predefined criteria may be used together to determine how the game modifiers are altered. For example, poker hands meeting certain requirements, such as a three-of-a-kind may result in a game modifier multiplier being incremented by one, while a poker hands meeting a straight or better may result in the game modifier being doubled. In still other embodiments, different types of game modifiers other than multipliers may be used.

Figure 22C:
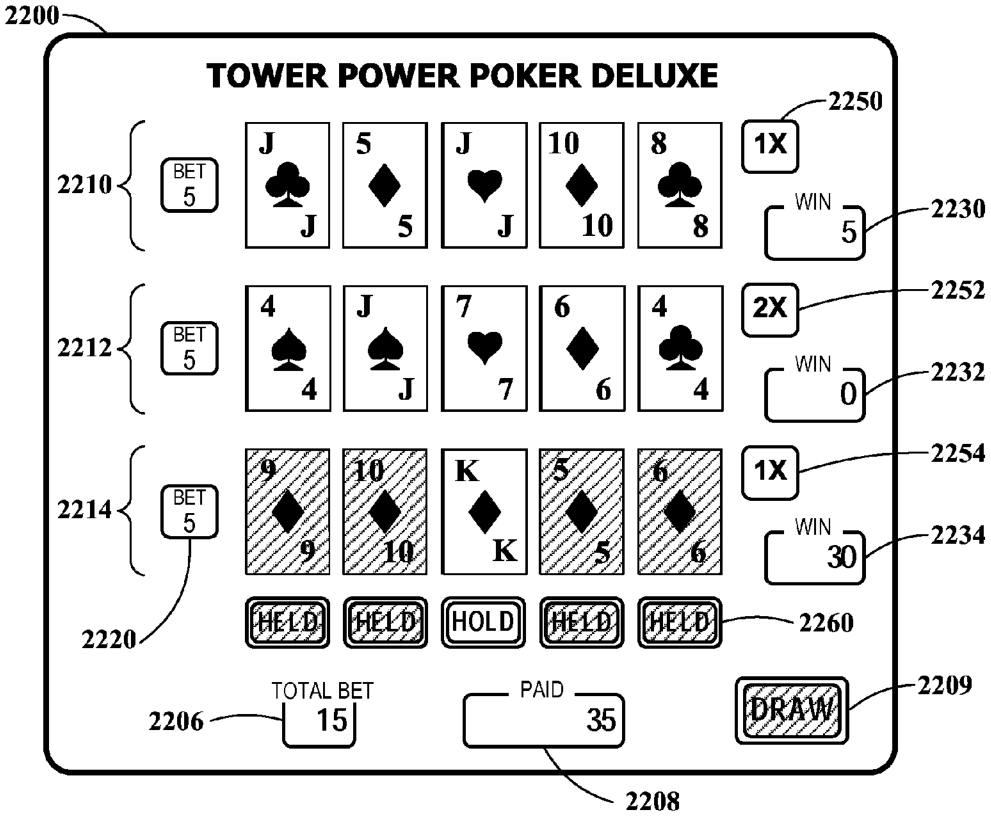

Referring to FIG. 22C, the second stud poker hand in the second stage 2212 is revealed to be 4S-JS-7H-6D-4C. As this hand is not associated with an award in the paytable, no win is indicated in the second win indicator 1732. Additionally, since this hand did not satisfy the predefined criteria of a winning hand, the subsequent multipliers are reduced by half. Hence, the third game modifier is reduced from a "2×" to a "1×". FIG. 22C also illustrates the result of in the third game stage 2214, where the non-held card is discarded and replaced by a draw card. Here, the replacement card is the KD, which completes the diamond flush. The player is awarded 30 credits for the flush as shown in the third win indicator 2234 (after being multiplied by the "1×" third game modifier 2254), and the sum of the win indicators 2230, 2232, 2234 is shown in the PAID meter 2208.

Figure 22D:
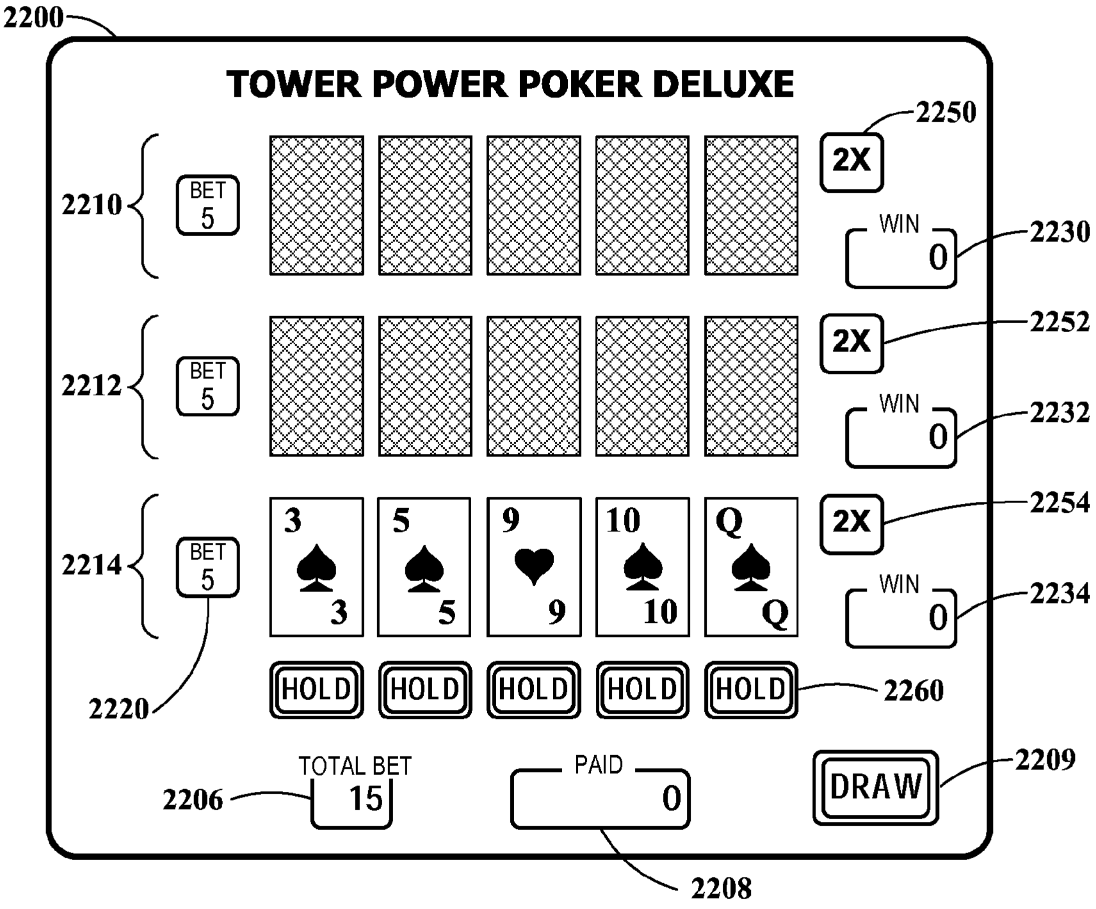

Since this last game stage (third game stage 2214) resulted in a win, the game modifiers for the next played game are altered. That is, since the last game stage in the game satisfied a predefined criterion, the benefit of the game modifier alteration loops back around and cascades down through all the game modifiers as shown in FIG. 22D. Here, because the third game modifier 2254 was previously a "1×", the first game modifier 2250 for the next game is doubled to "2×", which is also cascaded down to the second and third game modifiers 2252, 2254 for the subsequent game.

Figure 22E:
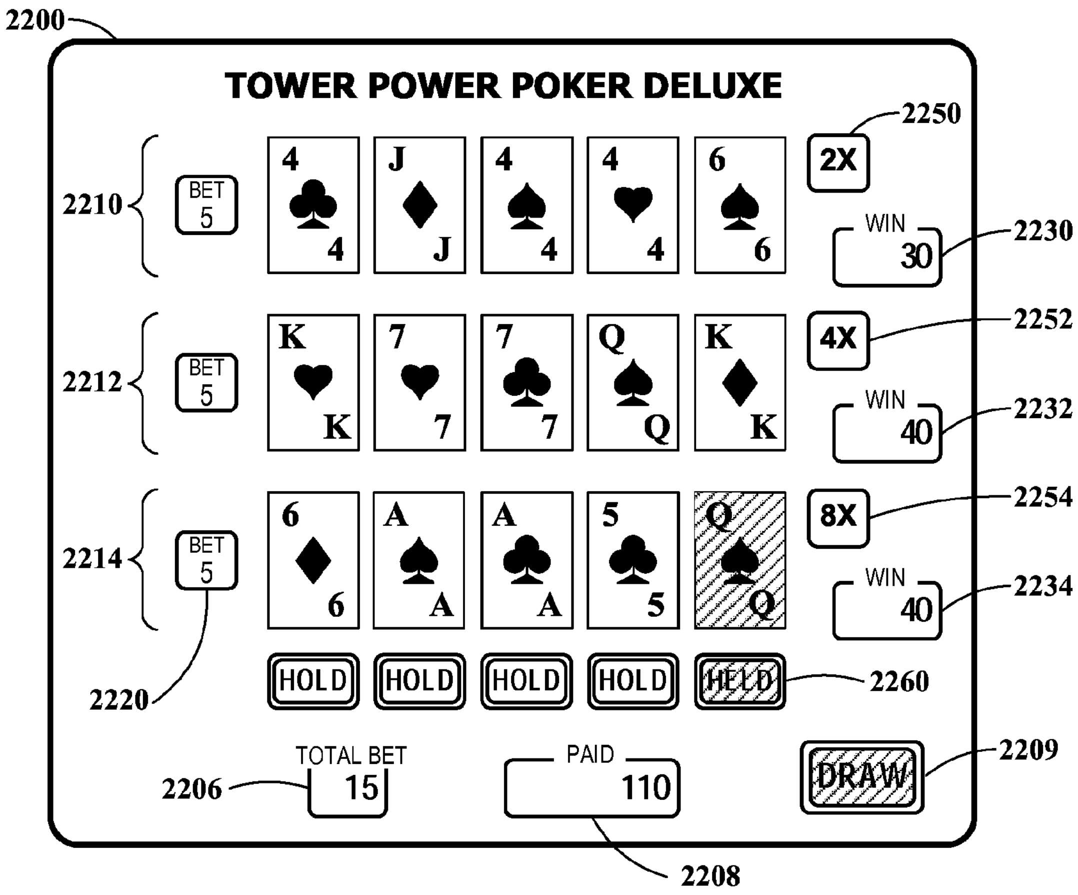
Figure 22F:
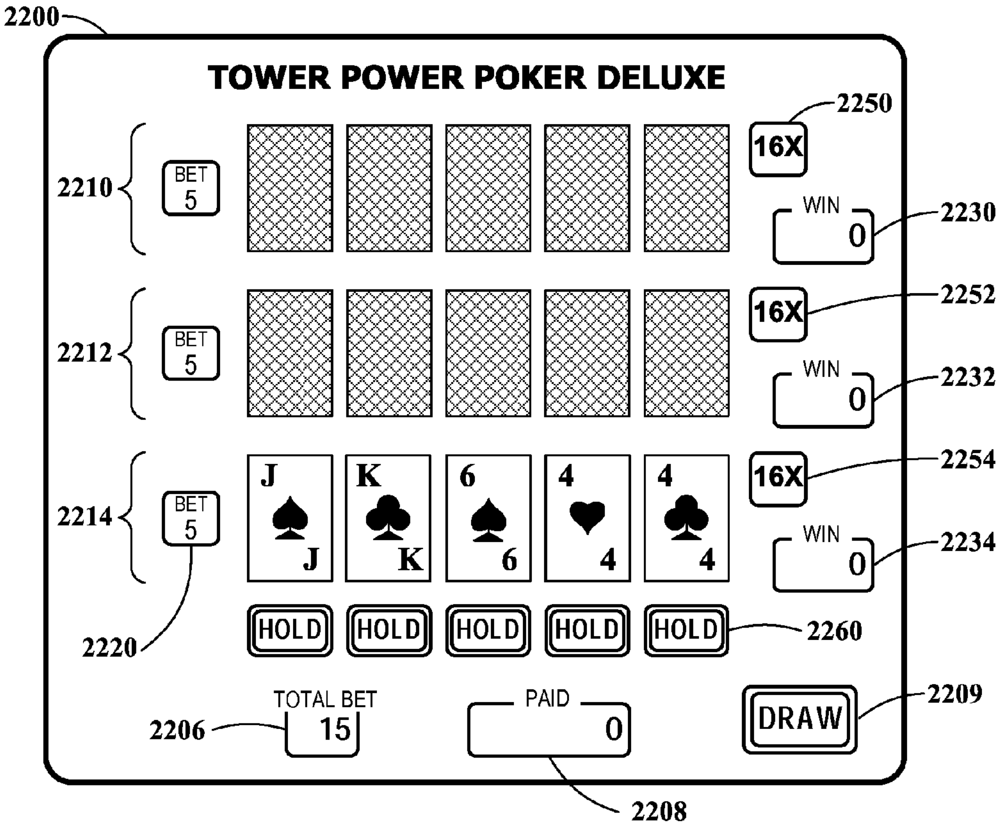

In FIG. 22E, the results of this next game are shown. Using similar methodology as described above, the first hand in the first stage 2210 resulted in win; thereby satisfying the predefined criterion and doubling the second and third game modifier values 2252, 2254 (to "4×" respectively). The second hand in the second game stage 2212 also resulted in a win, which further doubled the third game modifier 2254 again for the third game stage 2214 from "4×" to "8×". The third hand in the third or last game stage 2214 also resulted in a winning hand; thereby meeting the predefined criterion and doubling all of the game modifiers for the game stages in the subsequent game. Hence, as shown in FIG. 22F, the first, second, and third game modifier indicators show that the initial game modifiers are set at "16×".

Figure 22G:
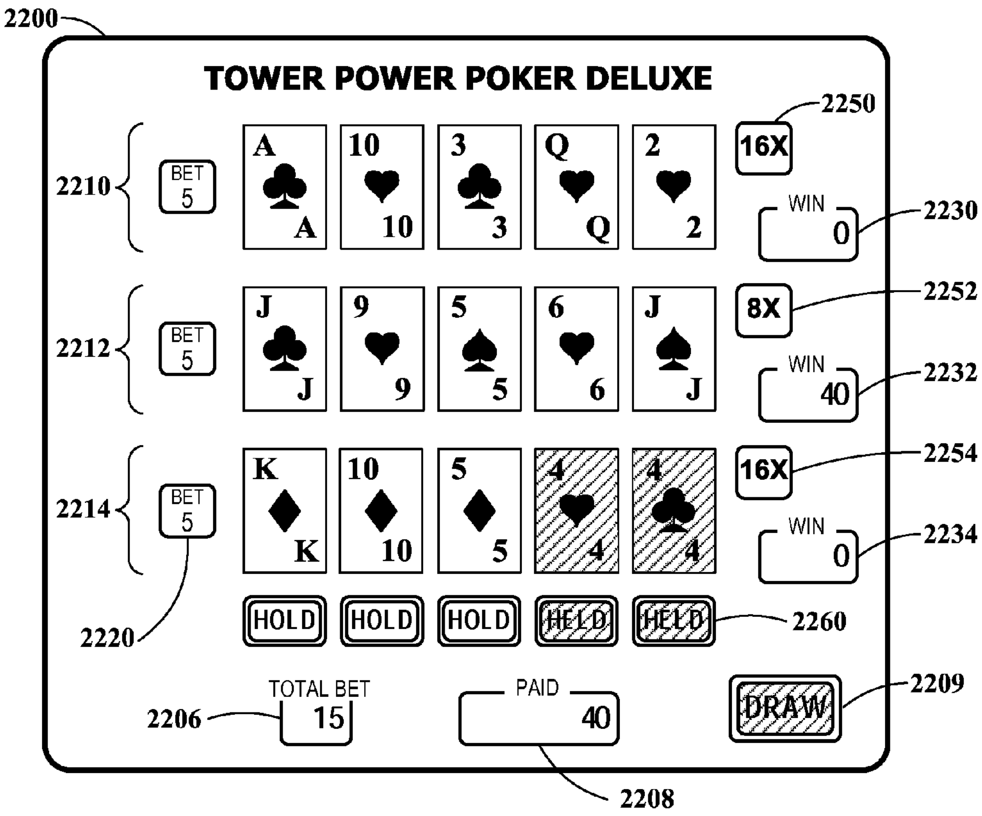
Figure 22H:
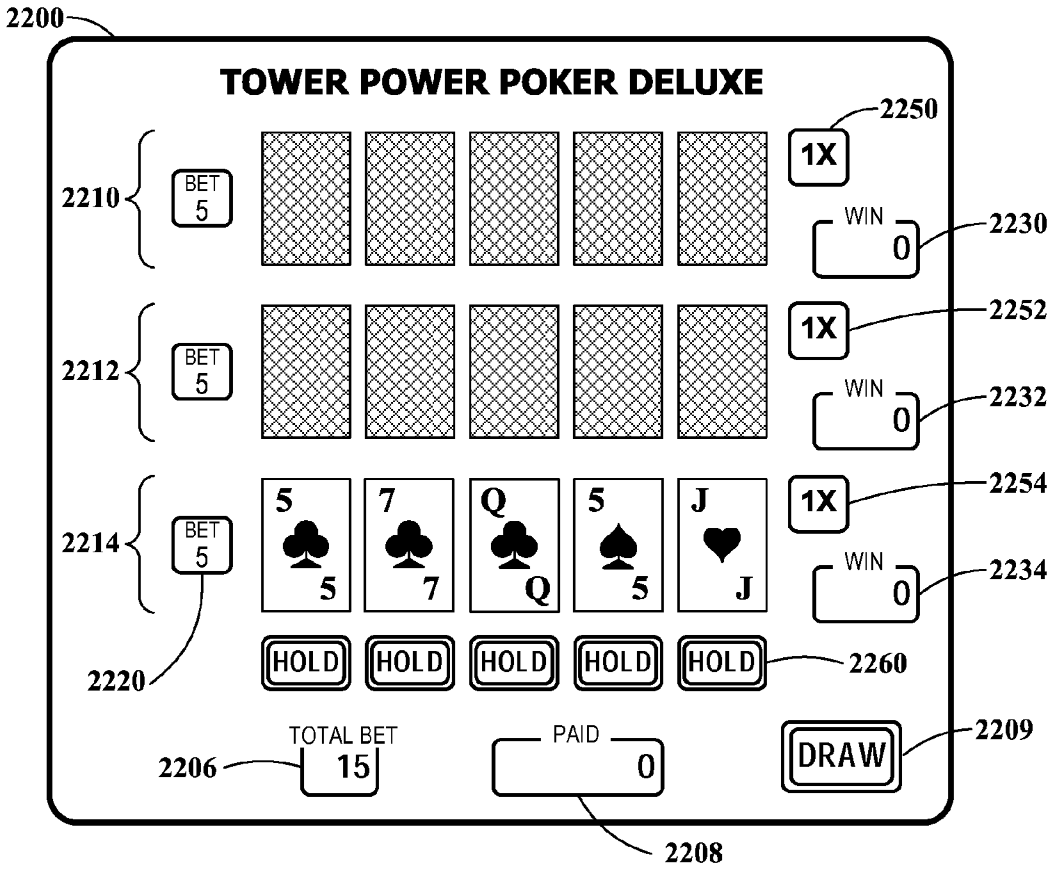

Referring to FIG. 22G, the results of the next game are shown. Again, using similar methodology as described above, the first hand in the first stage 2210 resulted in a losing hand. Since this hand did not meet the predefined criterion, the game modifier for the subsequent game stage is reduced by half; here, from "16×" to "8×". The second hand in the second game stage, however, resulted in a winning hand; thus meeting the predefined criterion and doubling the third game modifier from "8×" to "16×". The third hand 2214, however, did not result in a winning hand. In this embodiment, since the third or last hand 2214 did not satisfy the predefined criterion, the game modifiers for the next game are reset to "1×", as shown in FIG. 22H. If the third hand had resulted in a win (i.e., satisfying the predefined criterion) the game modifiers for the subsequent hand would have been initially set to "32×". In some embodiments, the multipliers used as game stage modifiers may be capped on each end. That is, the modifier may be set so that it is never less than "1×" and never more than "256×". In other embodiments, different caps or no caps may be used for multipliers or any other type of game modifiers.

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

The invention claimed is:

1. A method of operating a gaming device having a game display, a processor, and a player input device, the method comprising:

receiving a wager to play a first poker game on the gaming device, the first poker game including a first game stage and a separate second game stage, where the first and second game stages are associated with a first multiplier and a second multiplier, respectively;

displaying a first poker hand in the first game stage on the game display of the gaming device;

displaying a second poker hand in the second game stage on the game display of the gaming device;

evaluating the first and second poker hands to determine prizes associated with the first and second poker hands, using the processor;

awarding any determined prizes from the first and second poker hands;

determining, with the processor, if the first poker hand or second poker hand satisfies a predefined criterion;

altering the second multiplier associated with the second game stage for use in a second poker game when the first poker hand of the first poker game satisfies the predefined criterion, using the processor; and altering the first multiplier associated with the first game stage for use in a second poker game when the second poker hand of the first poker game satisfies the predefined criterion, using the processor.

2. The method of claim 1, wherein the first multiplier and second multipliers are altered by incrementing a value of the multipliers.

3. The method of claim 1, wherein the first and second multipliers are altered by a random function.

4. The method of claim 1, wherein the predefined criterion is a poker hand associated with an award according to a game paytable.

5. The method of claim 1, further comprising automatically allocating a first portion of the received wager on the first poker hand and a second portion of the received wager on the second poker hand.

6. The method of claim 1, wherein the first poker hand is positioned substantially vertically on the game display relative to the second poker hand.

7. A method of operating a gaming device having a game display, a processor, and a player input device, the method comprising:

receiving a wager to play a first multi-stage game on the gaming device;

displaying an outcome of a first stage of the first multi-stage game on the game display;

determining, with the processor, prizes associated with the first stage of the first multi-stage game;

displaying an outcome of a second stage of the first multi-stage game on the game display while the outcome of the first stage is simultaneously shown;

determining, with the processor, prizes associated with the second stage of the first multi-stage game;

awarding any determined prizes from the outcome of the first stage and second stage of the first multi-stage game;

modifying an aspect of a second stage for a second multi-stage game on the gaming device when the outcome of the first stage of the first multi-stage game meets a first predefined criterion, using the processor; and modifying an aspect of a first stage for the second multi-stage game on the gaming device when the outcome of the second stage of the first multi-stage game meets a second predefined criterion, using the processor.

8. The method of claim 7, wherein modifying an aspect of the first or second stage of the second multi-stage game includes altering a value of a multiplier used to multiply any prizes associated with the respective first or second stage of the second multi-stage game.

9. The method of claim 7, wherein modifying an aspect of the first or second stage of the second multi-stage game includes:

selecting a bonus award value; and adding the selected bonus award value to any prizes associated with the respective first or second stage of the second multi-stage game.

10. The method of claim 7, wherein modifying an aspect of the first or second stage of the second multi-stage game includes presenting an additional game element that is usable in the respective first or second stage of the second multi-stage game to substitute or improve a received game element.

11. The method of claim 7, wherein displaying an outcome of a first stage of the multi-stage game includes displaying a multi-reel slot game.

12. The method of claim 7, wherein displaying an outcome of a first stage of the multi-stage game includes displaying a stud poker game.

13. The method of claim 7, wherein displaying an outcome of a second stage of the multi-stage game includes:

displaying an initial dealt poker hand;

receiving player inputs to keep the initial dealt poker hand, or to hold and draw cards; and displaying a final poker hand.

14. The method of claim 7, further comprising:

receiving a wager to play the second multi-stage game on the gaming device;

displaying an outcome of a first stage of the second multi-stage game;

determining prizes associated with the first stage as modified of the second multi-stage game;

displaying an outcome of a second stage of the second multi-stage game while the outcome of the first stage is simultaneously shown;

determining prizes associated with the second stage as modified of the second multi-stage game;

awarding any determined prizes from the outcome of the first stage and second stage of the second multi-stage game.

15. A gaming device comprising:

a display configured to display game events to a player of the gaming device;

a player input device configured to receive inputs from a player; and a processor configured to:

receiving a wager to play a first multi-stage game on the gaming device, displaying an outcome of a first stage of the first multi-stage game, determining prizes associated with the first stage of the first multi-stage game, displaying an outcome of a second stage of the first multi-stage game while the outcome of the first stage is simultaneously shown, determining prizes associated with the second stage of the first multi-stage game, awarding any determined prizes from the outcome of the first stage and modified second stage of the multi-stage game, modifying an aspect of a second stage for a second multi-stage game on the gaming device when the outcome of the first stage of the first multi-stage game meets a predefined criterion, and modifying an aspect of a first stage for the second multi-stage game on the gaming device when the outcome of the second stage of the first multi-stage game meets a second predefined criterion.

16. The gaming device of claim 15, wherein the display includes a first game area configured to display a first plurality of game stages a second game area configured to display a second plurality of game stages, where the first game stages of the first and second multi-stage games are respectively displayed in the first game area, and the second game stages of the first and second multi-stage games are respectively displayed in the second game area.

17. The gaming device of claim 16, wherein at least one of the first plurality of game stages is positionally related to at least one of the second plurality of game stages.

* * * * *